(12) United States Patent
Takenaka

(10) Patent No.: US 8,467,922 B2
(45) Date of Patent: Jun. 18, 2013

(54) CONTROL DEVICE OF INVERTED PENDULUM TYPE VEHICLE

(75) Inventor: Toru Takenaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 265 days.

(21) Appl. No.: 12/889,566

(22) Filed: Sep. 24, 2010

(65) Prior Publication Data

US 2011/0071714 A1    Mar. 24, 2011

(30) Foreign Application Priority Data

Sep. 24, 2009 (JP) ................. 2009-219810

(51) Int. Cl.
*B62M 6/45* (2010.01)
*B62D 61/00* (2006.01)
*B60L 9/00* (2006.01)

(52) U.S. Cl.
USPC ............ 701/22; 701/124; 180/21; 180/205.1; 180/65.1

(58) Field of Classification Search
USPC ................. 180/21, 205.1, 252, 218, 65.1, 10, 180/206.1, 206.2, 206.3; 701/22, 1, 124, 701/70; 482/4, 63; 472/21, 25, 27
See application file for complete search history.

(56) References Cited

U.S. PATENT DOCUMENTS

| | | | | |
|---|---|---|---|---|
| 3,399,742 A | * | 9/1968 | Malick | 180/21 |
| 3,948,333 A | * | 4/1976 | van Lent | 180/21 |
| 4,109,741 A | * | 8/1978 | Gabriel | 180/21 |
| 4,413,693 A | * | 11/1983 | Derby | 180/343 |
| 4,861,053 A | * | 8/1989 | Yeomans, Jr. | 280/205 |
| 7,178,614 B2 | * | 2/2007 | Ishii | 180/7.1 |
| 2007/0158117 A1 | * | 7/2007 | Alexander | 180/21 |
| 2010/0038960 A1 | | 2/2010 | Takenaka et al. | |
| 2010/0096905 A1 | | 4/2010 | Takenaka et al. | |
| 2011/0056757 A1 | * | 3/2011 | Polutnik | 180/65.51 |
| 2011/0166713 A1 | * | 7/2011 | Tsuji et al. | 700/279 |
| 2012/0217072 A1 | * | 8/2012 | Hoffmann et al. | 180/21 |

FOREIGN PATENT DOCUMENTS

| | | |
|---|---|---|
| JP | 4-201793 | 7/1992 |
| JP | 3070015 B2 | 5/2000 |
| JP | 3070015 B2 | 7/2000 |
| WO | 2008-132778 A1 | 11/2008 |
| WO | 2008-132779 A1 | 11/2008 |

* cited by examiner

*Primary Examiner* — Christine Behncke
(74) *Attorney, Agent, or Firm* — Carrier Blackman & Associates, P.C.; Joseph P. Carrier; William D. Blackman

(57) ABSTRACT

A control device of an inverted pendulum type vehicle comprising: a drive unit driving a vehicle movable on a floor surface in all directions comprising a first direction and a second direction, the first direction being orthogonal to the second direction; a base body comprising a payload supporting part receiving a load of the drive unit and a passenger; and a control unit controlling the drive unit so that an inverted pendulum control is performed with respect to a vehicle system center-of-gravity point, wherein the inverted pendulum type vehicle comprises a periodic moving unit being comprised in the base body and receiving a predetermined periodic movement by the passenger, and a periodic detector detecting a period of the periodic moving unit; and the control unit controls the drive unit according to the period of the periodic moving unit.

8 Claims, 27 Drawing Sheets

US 8,467,922 B2

CONTROL DEVICE OF INVERTED PENDULUM TYPE VEHICLE

BACKGROUND OF THE INVENTION

The present application claims priority on Japanese Patent Application No. 2009-219810, filed Sep. 24, 2009, the content of which is incorporated herein by reference.

FIELD OF THE INVENTION

The present invention relates to a control device of an inverted pendulum type vehicle, which can move in all directions on a floor surface.

DESCRIPTION OF THE RELATED ART

An omnidirectional vehicle (an inverted pendulum type vehicle) which can move in all directions (i.e., all directions in two dimensional space) on a floor surface has been suggested by the applicant, for example, in PCT International Publication No. WO 08/132778 (hereinafter referred to as "Patent Document 1") and in PCT International Publication No. WO 08/132779 (hereinafter referred to as "Patent Document 2"). According to the inverted pendulum type vehicle described in Patent Documents 1 and 2, a drive unit, which can move in all directions on a floor surface while contacting the floor surface and is spherically shaped, wheel shaped, or a crawler shaped, and an actuator device comprising an electric motor and the like driving the drive unit are assembled to a base body of a vehicle. This vehicle moves over the floor surface by driving the drive unit with an actuator device.

Further, a technology controlling a moving operation of this type of inverted pendulum type vehicle is suggested by the applicant, for example, in Japanese Patent No. 3070015 (hereinafter referred to as "Patent Document 3"). According to this technology, a base body of a vehicle is provided on a spherical drive unit so that the base body can freely tilt in a fore-and-aft and lateral directions. Further, by measuring the tilt angle of the base body, and by controlling the torque of an electric motor driving the drive unit so that this tilt angle is maintained to be a predetermined angle, the vehicle is moved according to tilting movement of the base body.

Incidentally, when a control operation is performed on the inverted pendulum type vehicle described in Patent Documents 1, 2, and 3, regarding a conventional omnidirectional moving vehicle (inverted pendulum type vehicle) a target velocity was determined based on a movement of a center-of-gravity point of a user or [[a]] an operation input by a joystick. However, there is a problem in that it takes time to become used to the operation of the vehicle.

SUMMARY OF THE INVENTION

The present invention is made considering the problems described above. Accordingly, an object of the present invention is to provide an inverted pendulum type vehicle which can be easily operated by the passenger (rider). At the same time, another object of the present invention is to provide a control device of an inverted pendulum type vehicle which can enhance the comfort level of the passenger when the control operation of the vehicle is performed.

(1) Namely, a control device of an inverted pendulum type vehicle according to an aspect of the present invention comprises: a drive unit driving a vehicle movable on a floor surface in all directions comprising a first direction and a second direction; a base body comprising a payload supporting part receiving a load of the drive unit and a passenger; and a control unit controlling the drive unit so that an inverted pendulum control is performed with respect to a vehicle system center-of-gravity point. The first direction is orthogonal to the second direction. Further, the vehicle system center-of-gravity point is an overall center-of-gravity point of the vehicle and the passenger. Here, the inverted pendulum type vehicle comprises a periodic moving unit, being comprised in the base body and receiving a predetermined periodic movement by the passenger, and a periodic detector detecting a period of the periodic moving unit. Moreover, the control unit controls the drive unit according to the period of the periodic moving unit.

Incidentally, according to the present invention, the drive unit being "movable in all directions comprising a first direction and a second direction" refers to the direction of the velocity vector of the drive unit at each instant seen from an axial direction being orthogonal in the first direction and the second direction may be equal to a direction in an optional or variable angle around the axial direction due to the driving of the drive unit. Here, the axial direction is a direction generally perpendicular to the orthogonal direction, or a direction perpendicular to the floor surface. Further, the term "orthogonal" or "perpendicular" according to the present invention need not refer to bisecting at strictly a right angle. Therefore, a deviation from a strictly right angle is possible as long as the gist of the present invention is not deviated.

Further, according to the present invention, the term "floor" is not limited to a floor in the generic sense (such as a floor inside a house), and includes, for example, an outdoor ground surface or a street surface. According to (1) above, a periodic movement unit (such as a pedal), into which the passenger inputs a predetermined periodic movement, is provided to the base body. Also provided is a periodic detector which detects the rotational velocity of the rotational movement unit. Further, the control unit, which drives the movement unit, controls the movement unit based on the cycle of the periodic movement unit.

As a result, according to (1) above, it is possible to provide an omnidirectional vehicle (inverted pendulum type vehicle) which has enhanced operability. For example, it is possible to maintain a stability in the posture in the fore-and-aft and lateral directions while moving forward and using the rotation of the pedal to adjust the velocity in the fore-and-aft direction.

According to (1) above, when a payload supporting part of the passenger is provided to the base body of the vehicle, it is preferable that the fore-and-aft direction of the passenger riding in the payload supporting part is set as the first direction, and that the velocity in the fore-and-aft direction can be adjusted by the passenger operating the pedal. (see (2) below)

(2) Thus, a control device of an inverted pendulum type vehicle according to an aspect of the present invention comprises: a drive unit driving a vehicle movable on a floor surface in all directions comprising a first direction and a second direction; a base body comprising a payload supporting part receiving a load of the drive unit and a passenger; and a control unit controlling the drive unit so that an inverted pendulum control is performed with respect to a vehicle system center-of-gravity point. The first direction is orthogonal to the second direction. The vehicle system center-of-gravity point is an overall center-of-gravity point of the vehicle and the passenger. Here, the inverted pendulum type vehicle comprises a pedal, being comprised in the base body and is rotated by a rowing movement of the passenger's foot, and a pedal rotational velocity detector detecting a rotational velocity of the pedal. Moreover, the control unit controls the drive unit according to the rotational velocity of the pedal.

According to (2) above, a pedal is provided on the base body. The passenger operates the pedal by stomping on the pedal with his or her foot. Also provided is a pedal rotational velocity detector, which detects the rotational velocity of the pedal. Further, the control unit, which drives the drive unit, controls the drive unit based on the rotational velocity of the pedal.

Therefore, according to (2) above, it is possible to provide an omnidirectional vehicle (inverted pendulum type vehicle) which has enhanced operability. For example, it is possible to maintain a stability in the posture in the fore-and-aft and lateral directions while moving forward and using the rotation of the pedal to adjust the velocity in the fore-and-aft direction.

According to (2) above, when a payload supporting part of the passenger is provided to the base body of the vehicle, it is preferable that the fore-and-aft direction of the passenger riding in the payload supporting part is set as the first direction, and that the velocity in the fore-and-aft direction can be adjusted by the passenger operating the pedal. (see (3) below)

(3) Thus, the control device of the inverted pendulum type vehicle may be configured as follows: the control unit controls a target center-of-gravity point velocity according to the rotational velocity of the pedal, the target center-of-gravity point velocity being a target value of a velocity of the vehicle system center-of-gravity point in the first direction. As a result, it is possible to maintain a stability in the posture in the fore-and-aft and lateral directions while moving forward and using the rotation of the pedal to adjust the velocity in the fore-and-aft direction.

Further, according to (2) and (3) above, when the passenger operates the pedal, it is preferable that the heaviness of the pedal change according to the actual perception of the passenger (see (4) below). Here, the actual perception of the passenger refers to how the passenger perceives the heaviness of the load with respect to a condition of the road on which the vehicle is running. For example, the pedal may feel heavy when the vehicle is running up a hill, while the pedal may feel light when the vehicle is running on a flat ground.

(4) Thus, the control device of the inverted pendulum type vehicle may be configured as follows: the control device of the inverted pendulum type vehicle further comprises a pedal electric motor, being driven and rotated by the pedal; and a pedal torque control unit applying a brake torque to the pedal electric motor. Here, the pedal torque control unit controls the brake torque of the pedal electric motor according to a signal of a torque electric current of an electric motor driving the drive unit.

As a result, the heaviness of the pedal may change based on the actual perception of the passenger when, for example, the vehicle is running up a hill. As described above, the actual perception of the passenger refers to how the passenger perceives the heaviness of the load with respect to the condition of the road on which the vehicle is running. In this way, it is possible to enhance the comfort level of the passenger when he or she is operating the movement of the vehicle. In addition, the battery may be charged by the regenerative energy obtained by turning the pedal.

Further, according to (2) and (3) above, it is preferable to change the brake torque of the electric motor according to the electric voltage of the battery (see (5) below).

(5) Thus, the control device of the inverted pendulum type vehicle may be configured as follows: the control device of the inverted pendulum type vehicle further comprises a pedal electric motor, being driven and rotated by the pedal; and a pedal torque control unit applying a brake torque to the pedal electric motor. Here, the pedal torque control unit controls the brake torque of the pedal electric motor according to an electric voltage of a battery supplying electric power to an electric motor driving the drive unit.

As a result, the brake torque of the pedal may be altered according to, for example, the electric voltage of the battery. In this way, the battery is prevented from being overcharged.

Further, according to (2) and (3) above, when the target center-of-gravity point velocity is set according to the rotational velocity of the pedal, it is preferable to change the velocity according to the load torque of the electric motor driving the moving body by, for example, decreasing the velocity in an up-hill while increasing the velocity on a flat ground with respect to a same rotational velocity of the pedal, so that the electric motor is prevented from becoming overloaded (see (6) below).

(6) Thus, the control device of the inverted pendulum type vehicle may be configured as follows: when the control unit sets the target center-of-gravity point velocity of the vehicle system center-of-gravity point in the first direction according to a rotational velocity of the pedal, the control unit variably sets the target center-of-gravity point velocity according to an operating condition of an electric motor driving the drive unit.

As a result, when the vehicle is running up a hill, for example, it is possible to reduce the velocity in the fore-and-aft direction, which is set according to the rotational velocity of the pedal. In this way, it is possible to prevent the electric motor, which drives the drive unit, from being overloaded. Further, it is possible to imitate the automatic switching operation of the shift transmission gear, thereby enhancing the comfort level of the passenger with which he or she operates the vehicle with the pedal.

DETAILED DESCRIPTION OF THE PREFERRED EMBODIMENTS

[Explanation of a Basic Configuration and Movement of an Inverted Pendulum Type Vehicle to which the Present Invention is Applied]

Figure 1:
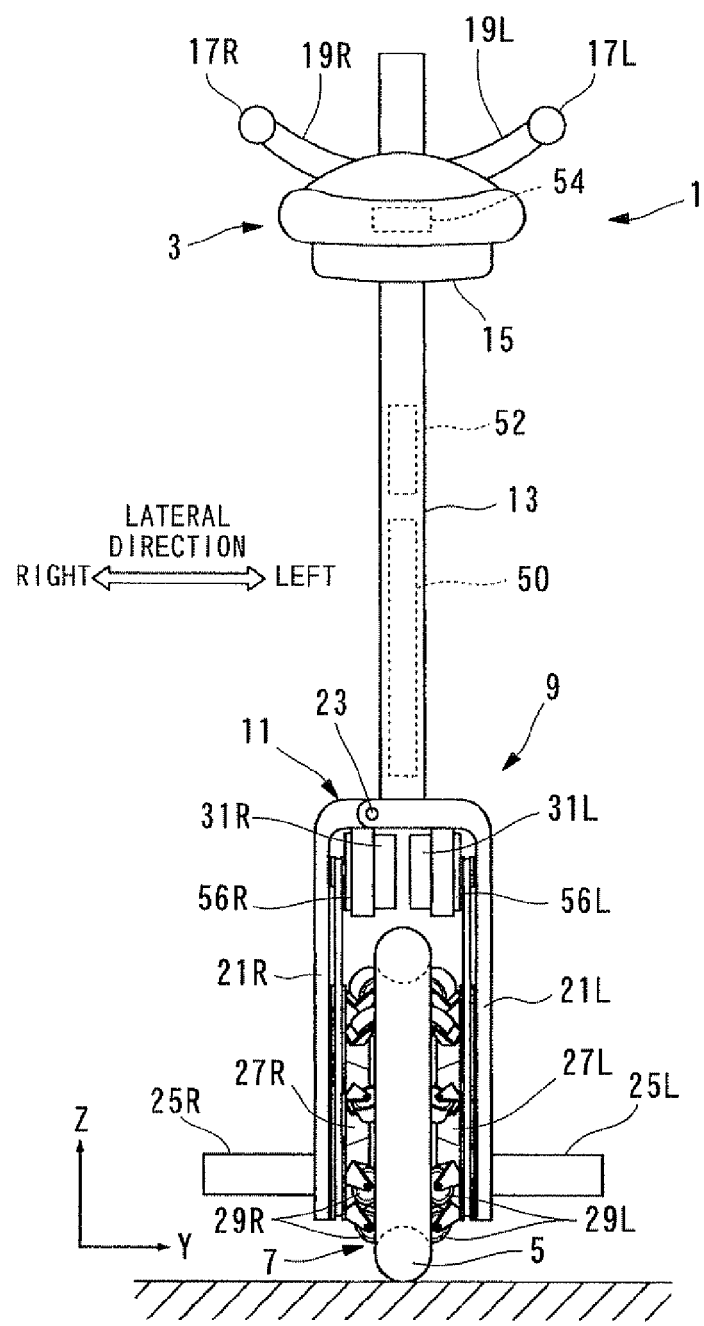
FIG. 1 is a frontal view of an inverted pendulum type vehicle according to an embodiment of the present invention.

First, an explanation of a basic configuration and movement of an omnidirectional vehicle (inverted pendulum type vehicle) to which the present invention is applied is provided below. Incidentally, the control device of the inverted pendulum type vehicle according to the present invention is configured so that an inverted pendulum type vehicle 1 shown in FIG. 1 is a basic component, and a pedal is added to this inverted pendulum type vehicle 1. The passenger stomps this pedal with his or her foot. As a result, it is possible to provide a control device of an inverted pendulum type vehicle with an enhanced operability by the passenger.

FIG. 1 is a diagram showing a basic configuration of the inverted pendulum type vehicle. FIG. 1 shows a configuration of an inverted pendulum type vehicle without a pedal which is to be stomped with the passenger's foot. First, a configuration of an inverted pendulum type vehicle 1 according to the present embodiment is described with reference to FIGS. 1-6.

Figure 2:
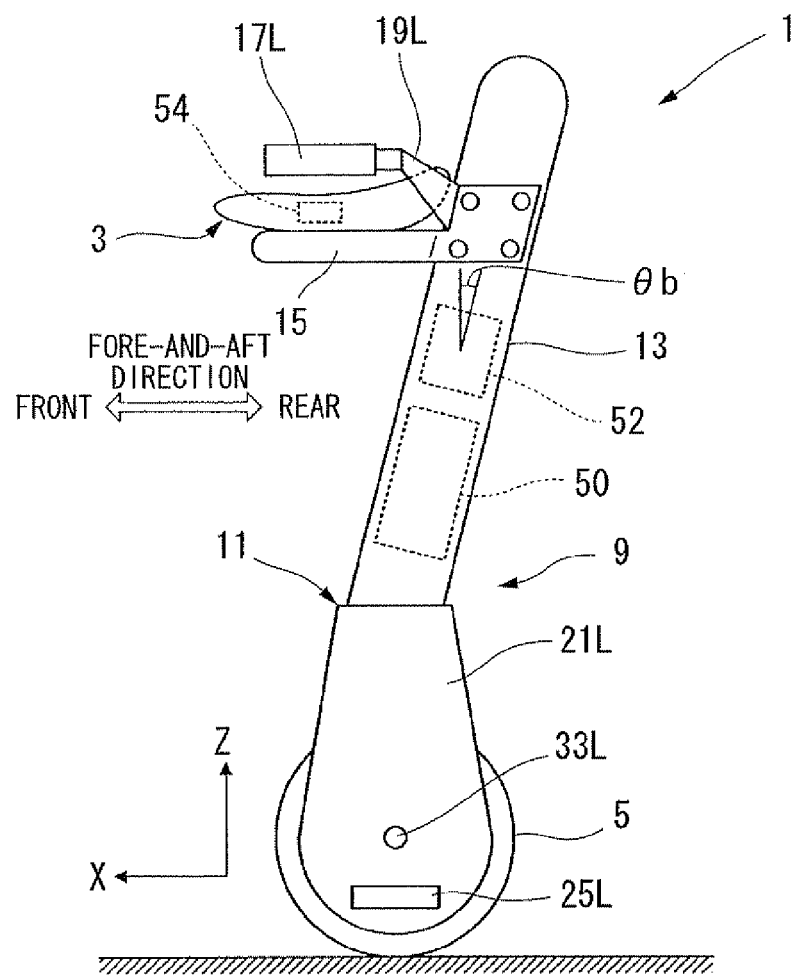
FIG. 2 is a side view of an inverted pendulum type vehicle according to an embodiment of the present invention.

As shown in FIGS. 1 and 2, the inverted pendulum type vehicle 1 comprises a seat (payload supporting part) 3 of an occupant, who may also be a driver, a drive unit 5, which can move in all directions (i.e., all directions in two dimensional space including the fore-and-aft direction and a lateral direction) on a floor surface while contacting the floor surface, an actuator 7 which supplies to the drive unit 5, a power for driving the drive unit 5, a base body 9 assembled with the seat 3, the wheel assembly 5, and the actuator 7.

Here, the "fore-and-aft direction" and the "lateral direction" respectively refer to a direction which is equal to or approximately matches the fore-and-aft direction and the lateral direction of an upper body of an occupant riding in a standard posture in the seat (payload supporting part) 3. Incidentally, a "standard posture" refers to a posture which can be estimated based on a configuration of the payload supporting part 3. This "standard posture" is such that the axis of the upper body of the occupant is aligned roughly in an upper-lower direction. Further, the upper body of the occupant is not twisted and the like.

Here, in FIG. 1, the "fore-and-aft direction" and the "lateral direction" respectively refer to a direction perpendicular to the paper and a lateral direction of the paper. In FIG. 2, the "fore-and-aft direction" and the "lateral direction" respectively refer to a lateral direction of the paper and a direction perpendicular to the paper. Further in the description regarding the inverted pendulum type vehicle 1, a suffix "R" or a suffix "L" are appended to a reference numeral. The suffix "R" is used to refer to a component or a concept corresponding to a right side of the vehicle 1. The suffix "L" is used to refer to a component or a concept corresponding to a left side of the vehicle 1.

The base body 9 comprises a lower part frame 11, which is assembled to the drive unit 5 and the actuating unit 7, and a supporting frame 13, which is provided to extend upwards from an upper end of the lower part frame 11.

A seat frame 15 is fixed to an upper part of the supporting frame 13. The seat frame 15 protrudes towards the front from the supporting frame 13. In addition, a seat 3 is provided on the seat frame 15. An occupant sits on the seat 3. According to the present embodiment, this seat 3 is the riding unit of the occupant. Therefore, the inverted pendulum type vehicle 1 (hereinafter may also be referred simply as a "vehicle 1") according to the present embodiment moves over a floor surface while the occupant is seated on the seat 3.

In addition, a grip 17R and a grip 17L are placed on the left and right portions of the seat 3. The occupant seated on the seat 3 holds on to the grips 17R, or 17L, if necessary. Each of these grips 17R, 17L fixed respectively on a tip part of a bracket 19R, and a bracket 19L, which extend from the supporting frame 13 (or the seat frame 15).

The lower part frame 11 comprises a pair of cover members 21R and 21L. Each of the cover members 21R and 21L are placed to face one another in a two-pronged form while being separated in a lateral direction. The upper part of these cover members 21R and 21L (i.e., a branching portion of the two-pronged form) are connected via a hinge shaft 23 comprising a shaft center in the fore-and-aft direction. One of the cover members 21R and 21L can move around the hinge shaft 23 relative to the other one of the cover members. In this case, the cover members 21R and 21L are biased towards a direction by a spring (not diagramed) in a direction in which that the lower end portion of the cover members 21R and 21L (i.e., a tip portion of the two-pronged form) narrows towards one another.

Further, a step 25R at an external surface portion of each of the cover members 21R and 21L, a step 25R, on which the right foot of the occupant seated on the seat 3 is placed, and a step 25L, on which the left foot of the occupant is placed, are provided so as to protrude respectively towards the right and the left directions.

The drive unit 5 and the actuator 7 are placed between the cover members 21R, 21L of the lower part frame 11. A configuration of the drive unit 5 and the actuator 7 are described with reference to FIGS. 3-6.

According to the present embodiment, the drive unit 5 is a wheel assembly being a ring-shaped component comprising a rubber elastic material. The cross section of the drive unit 5 is approximately a circle. This drive unit 5 (hereinafter may also be referred to as a wheel assembly 5) can rotate around a center C1 of the circular cross section as indicated in arrow Y1 in FIGS. 5 and 6 due to the elastic deformation of the wheel assembly 5. In particular, the wheel assembly 5 rotates around a circumferential line which passes through the center C1 of the circular cross section and becomes concentric with the shaft core of the wheel assembly 5.

This wheel assembly 5 is placed between the cover members 21R and 21L while the shaft center C2 (a shaft center C perpendicular to the diameter direction of the wheel assembly 5 in general) faces the lateral direction. In addition, the wheel assembly 5 contacts the floor surface with the lower end part of the outer peripheral surface of the wheel assembly 5.

Figure 5:
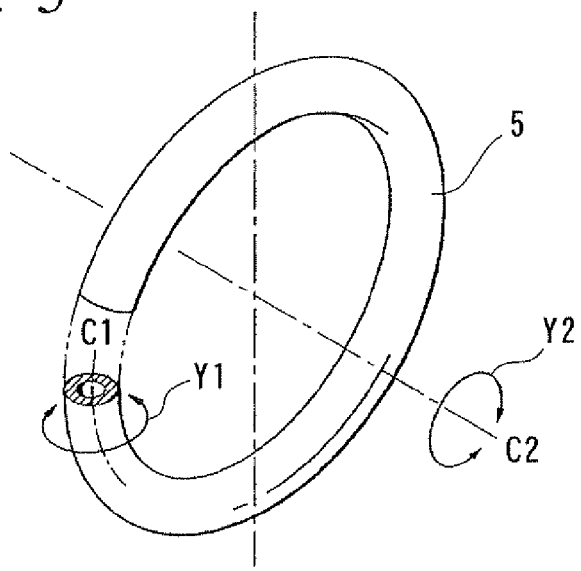
FIG. 5 is a perspective view of a drive unit (wheel assembly) of an inverted pendulum type vehicle according to an embodiment of the present invention.

Further, the wheel assembly 5 may perform a movement rotating around the shaft center C2 of the wheel assembly 5 as indicated in arrow Y2 in FIG. 5 (a movement rolling around the floor surface), and a movement rotating around the shaft center C1 of the cross section of the wheel assembly 5. As a result, the wheel assembly 5 may move in all directions on the floor surface by a combination of these rotating movements.

The actuator 7 comprises a free roller 29R and a rotating part 27R, provided between the wheel assembly 5 and the right cover member 21R, a free roller 29L and a rotating part 27L, provided between the wheel assembly 5 and the left cover member 21L, an electric motor 31R placed as an actuator above the rotating part 27R and the free roller 29R, and an electric motor 31L placed as an actuator above the rotating part 27L and the free roller 29L.

A housing of each of the electric motors 31R and 31L is attached respectively to the cover members 21R and 21L. Although not diagrammed, the power source (capacitor) of the electric motors 31R, 31L is provided on appropriate places on the base body 9 such as on the supporting frame 13 and the like.

The rotation member 27R is rotatably supported by the cover member 21R via the supporting axis 33R comprising a shaft center in the lateral direction. Similarly, the rotation member 27L is rotatably supported by the cover member 21L via the supporting axis 33L comprising a shaft center in the lateral direction. In this case, rotational shaft center of the rotation member 27R (the shaft center of the supporting axis 33R) and a rotational shaft center of the rotation member 27L (the shaft center of the supporting axis 33L) are coaxial.

Figure 3:
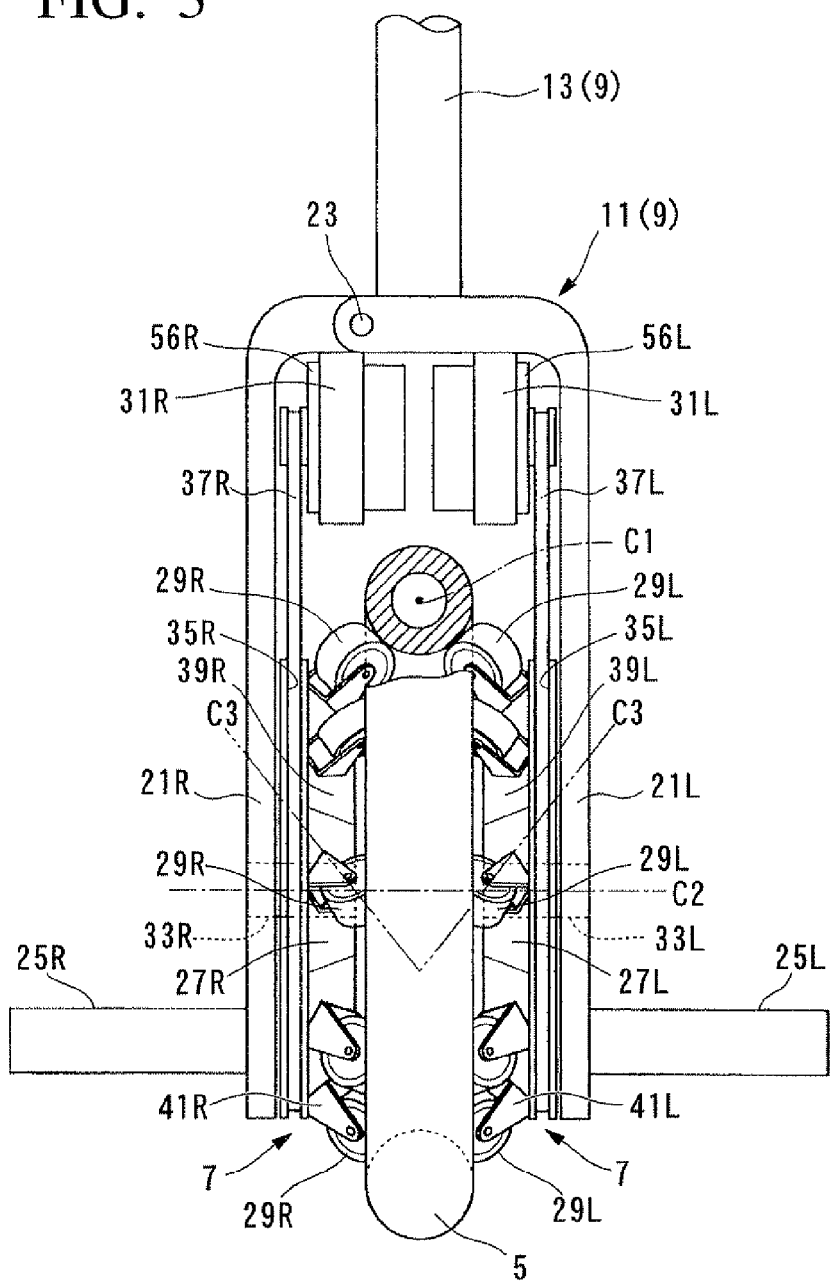
FIG. 3 is an expanded view of a lower portion of an inverted pendulum type vehicle according to an embodiment of the present invention.
Figure 4:
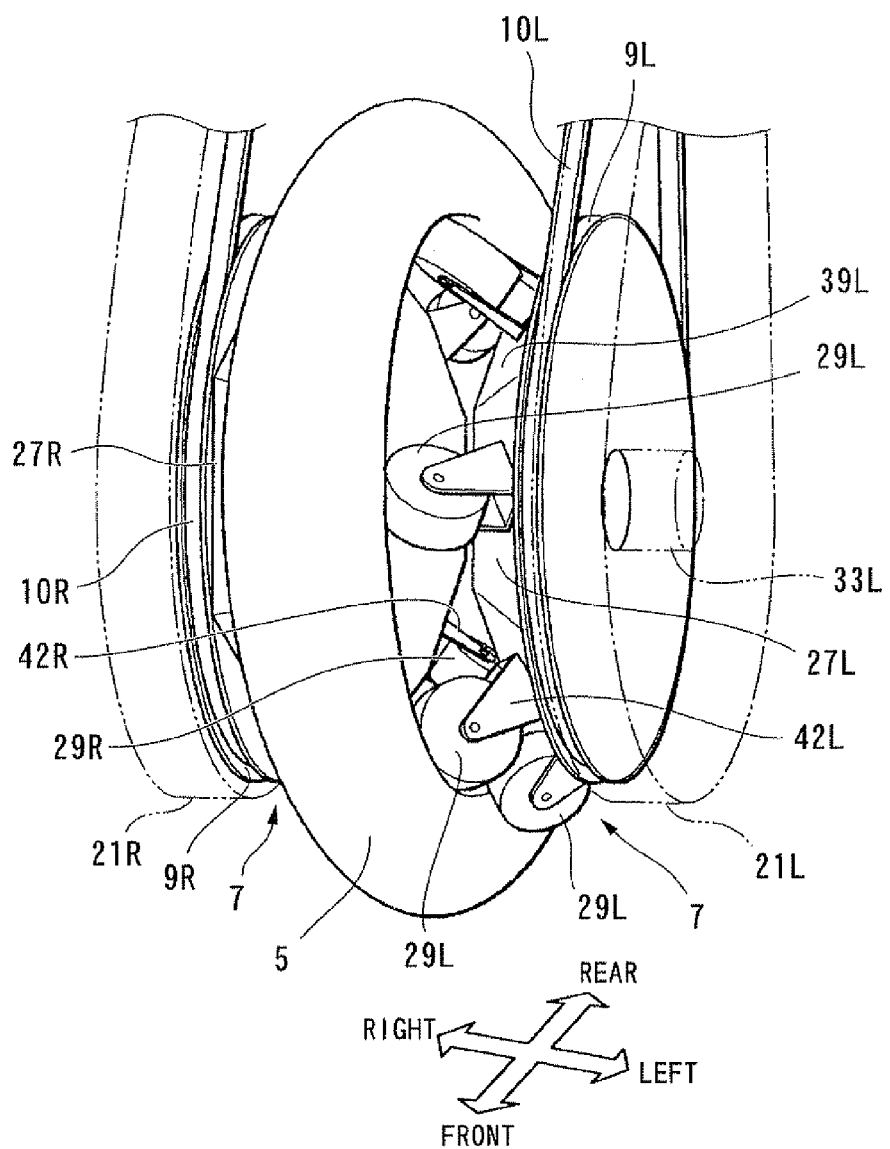
FIG. 4 is a perspective view of a lower portion of an inverted pendulum type vehicle according to an embodiment of the present invention.

The rotation members 27R, 27L are connected respectively to the output axis of the electric motors 31R, 31L via a power transmission mechanism comprising a decelerating mechanism. The rotation members 27R, 27L are rotated by a power (torque) transmitted by each of the electric motors 31R, 31L. Examples of the power transmission mechanism include a pulley-type/belt-type device. In other words, as shown in FIGS. 3 and 4, the rotation member 27R is connected to the output axis of the electric motor 31R via the pulley 35R and the belt 37R. Similarly, the rotation member 27L is connected to the output axis of the electric motor 31L via the pulley 35L and the belt 37L.

Further, the power transmission mechanism may, for example, be a device comprising a sprocket and a linking chain, or, a device comprising a plurality of gears. Further, for instance, the electric motors 31R and 31L may be placed so as to face the rotation members 27R and 27L respectively, so that the output axis of each of the electric motors 31R and 31L is coaxial with the rotation members 27R and 27L respectively. In addition, the output axis of each of the electric motors 31R, 31L may be connected to the rotation members 27R, 27L respectively, via a decelerating device such as a planetary gear drive and the like.

Each of the rotation members 27R and 27L are configured to be the same shape as a circular cone, the diameter of which decreases towards the side of the wheel assembly 5. The outer peripheral surface of the rotation members 27R and 27L are the tapered outer peripheral surfaces 39R and 39L respectively.

A plurality of free rollers 29R are aligned around the tapered outer peripheral surface 39R of the rotation member 27R. Here, the plurality of free rollers 29R are aligned at equal intervals along the circumference of a circle which is coaxial with the rotation member 27R. Further, these free rollers 29R are attached respectively to the tapered outer peripheral surface 39R via the bracket 41R. Moreover, the free rollers 29R are rotatably supported by the bracket 41R.

Similarly, a plurality of free rollers 29L are aligned around the tapered outer peripheral surface 39L of the rotation member 27L. Here, the plurality of free rollers 29L are aligned at equal intervals along the circumference of a circle which is coaxial with the rotation member 27L. Further, these free rollers 29L are attached respectively to the tapered outer peripheral surface 39L via the bracket 41L. Moreover, the free rollers 29L are rotatably supported by the bracket 41L. The number of free rollers 29L is equal to the number of free rollers 29R.

The wheel assembly 5 is placed coaxial with the rotation member 27R and 27L so as to be sandwiched between the free roller 29R at the rotation member 27R side and the free roller 29L at the rotation member 27L side.

Figure 6:
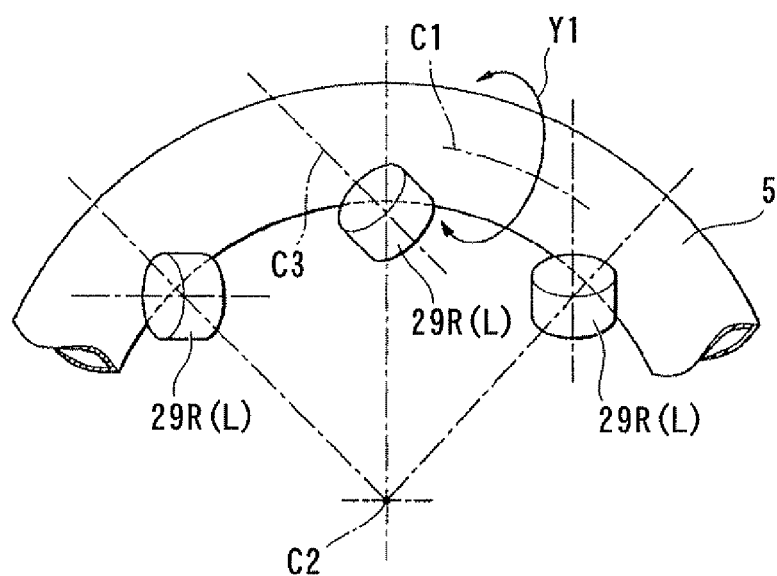
FIG. 6 is a view showing a relative position of a drive unit (wheel assembly) of an inverted pendulum type vehicle and a free roller according to an embodiment of the present invention.

In this case, as shown in FIGS. 1 and 6, the shaft center C3 of each of the free rollers 29R and 29L is tilted with respect to the shaft center C2 of the wheel assembly 5. At the same time, the shaft center C3 is placed so as to be tilted with respect to the diameter direction of the wheel assembly 5. Here, the "diameter direction" refers to a radial direction connecting the shaft center C2 and each of the free rollers 29R, 29L, viewing the wheel assembly 5 from a direction of the shaft center C2 of the wheel assembly 5. Further, in this position, the outer peripheral surface of each of the free rollers 29R, 29L are pressed against the inner peripheral surface of the wheel assembly 5 in a diagonal direction.

In more general terms, the free roller 29R at the right side is pressed against the inner peripheral surface of the wheel assembly 5 so that, when the rotation member 27R is driven to rotate around the shaft center C2, a frictional force element in a peripheral direction of the shaft center C2, and a frictional force element in a peripheral direction of the center C1 of the cross section of the wheel assembly 5, may be applied to the wheel assembly 5 at a surface at which the free roller 29R contacts the wheel assembly 5. Here, the frictional force element in the peripheral direction of the shaft center C2 refers to a frictional force element in a direction of a tangential line of an inner circumference of the wheel assembly 5. In addition, the frictional force element in a peripheral direction of the center C1 refers to a frictional force element in a direction of a tangential line of a circular cross section of the wheel assembly 5. The free roller 29L at the left side is configured in a similar manner.

As described above, the cover members 21R and 21L are biased towards a direction by a spring (not diagramed) in a direction in which that the lower end portion of the cover members 21R and 21L (i.e., a tip portion of the two-pronged form) narrows towards one another. Due to this biasing force, the wheel assembly 5 is held between the free roller 29R at the right side and the free roller 29L at the left side. At the same time, the condition of the free rollers 29R and 29L being pressed against the wheel assembly 5 is maintained. In particular, the condition in which frictional force may be applied between each of the free rollers 29R, 29L and the wheel assembly 5.

According to the vehicle 1 configured as described above, when the rotation members 27R, 27L are driven to rotate in the same direction at a same velocity by the electric motors 31R and 31L, the wheel assembly 5 rotates around the shaft center C2 in the same direction as the rotation member 27R, 27L. Therefore, the wheel assembly 5 rolls in a fore-and-aft direction on the floor surface. Thus, the entire vehicle 1 moves in a fore-and-aft direction. Incidentally, in this case, the wheel assembly 5 does not rotate around the center C1 of the lateral cross section.

Further, when the rotation members 27R, 27L are driven to rotate in directions opposite to one another and at a same speed, the wheel assembly 5 rotates around the center C1 of the lateral cross section. As a result, the wheel assembly 5 moves in a direction of the shaft center C2 (i.e., the lateral direction). Further, the entire vehicle 1 moves in the lateral direction. In this case, the wheel assembly 5 does not rotate around the shaft center C2.

Further, when the rotation members 27R, 27L are driven in different velocities in the same direction or in opposite directions, the vehicle wheel 5 rotates around the shaft center C2, and, at the same time, rotates round the center C1 of the lateral cross section of the vehicle wheel 5.

At this time, due to the combination of these rotational movements, the wheel assembly 5 moves in a direction tilted with respect to the fore-and-aft direction and a lateral direction. Moreover, the entire vehicle 1 moves in the same direction as the wheel assembly 5. The direction in which the wheel assembly 5 moves in this case varies depending on the difference between a rotational velocity of the rotation members 27R, 27L. Here, the rotational velocity refers to a rotational velocity vector such that the polarity is defined based on the rotational direction.

Since the moving operation of the wheel assembly 5 is conducted as described above, the velocity with which the vehicle 1 moves and the direction in which the vehicle 1 moves may be controlled by controlling the rotational velocity of each of the electrically operated motors 31R and 31L, and by controlling the rotational velocity of the rotation members 27R and 27L.

Next, a configuration for the moving operation of the vehicle 1 shown in FIG. 1 is described. In the following description, an xyz coordinate system is envisioned comprising the x axis, referring to the horizontal axis in the fore-and-aft direction, the y axis, referring to the horizontal axis in the lateral direction, and the z axis, referring to the orthogonal axis, as shown in FIGS. 1 and 2. The fore-and-aft direction may also be referred to as the x axis direction. The lateral direction may also be referred to as the y axis direction.

First, a moving operation of the vehicle 1 is described below in general terms. When an occupant who sits on the seat 3 tilts his or her upper body, the base body 9 and the seat 3 tilts towards the direction that the occupant's upper body was tilted. In particular, the tilting of the occupant's upper body refers to a displacement of the position of the center-of-gravity point of a combination of the occupant and the vehicle 1 projected on a horizontal plane. Further, at this time, the moving operation of the wheel assembly 5 is controlled so that the vehicle 1 moves in a direction in which the base body 9 is tilted. For example, when the occupant tilts his or her upper body forward, and also tilts the base body 9 and the seat 3 forward, the moving operation of the wheel assembly 5 is controlled so that the vehicle 1 moves forward.

In other words, according to the inverted pendulum type vehicle shown in FIG. 1, the motion of the occupant moving his or her upper body and tilting the base body 9 along with the seat 3 is considered to be a basic maneuvering operation with respect to the vehicle 1. This motion is referred to as an operation request of the vehicle 1. According to this maneuvering operation, the moving operation of the wheel assembly 5 is controlled via the actuator 7.

Here, according to the inverted pendulum type vehicle 1 based on the present embodiment, a surface at which the wheel assembly 5 contacts the floor surface is a surface at which the entire vehicle 1 contacts the floor surface. This surface at which the wheel assembly 5 contacts the floor surface is a single local region and has a small area (i.e., size) compared to a region obtained by projecting the vehicle 1 and the occupant riding the vehicle 1 in their entirety to the floor surface. A floor reaction force applies only on this single local region. Therefore, in order to prevent the base body 9 from tilting and falling down, it is necessary to move the wheel assembly 5 so that the center-of-gravity point of the occupant and the vehicle 1 in their entirety is positioned approximately right above the surface at which the wheel assembly 5 touches the ground.

Therefore, according to the inverted pendulum type vehicle 1, a target position is referred to as a position of the base body 9 under a condition in which the center-of-gravity point of the occupant and the vehicle 1 in their entirety is positioned approximately right above the center point of the wheel assembly 5 (i.e. the center point along the shaft center C2). In more accurate terms, the center-of-gravity point of the occupant and the vehicle 1 in their entirety is positioned approximately right above the surface at which the wheel assembly 5 contacts the ground. The moving operation of the wheel assembly 5 is controlled so that the actual position of the base body 9 converges with the target position.

Further, when the vehicle 1 is started to move forward and the like, and when the vehicle 1 receives a propulsion force due to the actuator 7 along with an additional external force such as a propulsion force provided by the occupant kicking the floor with his or her foot when necessary in order to increase the velocity at which the vehicle 1 moves, the moving operation of the wheel assembly 5 is controlled so that the velocity of the vehicle 1 increases along with the application of the propulsion force and an additional external force. In more precise terms, the moving operation of the wheel assembly is controlled so that the velocity of the center-of-gravity point of the occupant and the vehicle 1 in their entirety increases. Here, the additional external force provided by the occupant is a propulsion force due to the frictional force created by the back side of the occupant's foot and the floor.

Incidentally, in a condition in which the additional external force is not provided as a propulsion force, the moving operation of the wheel assembly 5 is controlled so that the velocity of the vehicle 1 is once retained at a certain velocity, the velocity of the vehicle 1 then decreases, and the vehicle 1 comes to a halt.

Further, in a condition in which the occupant is not riding the vehicle 1, a target position is referred to as a position of the base body 9 such that the center-of-gravity point of the vehicle 1 in its singular form is positioned approximately right above the center point of the wheel assembly 5 (i.e., the center point of the shaft center C2). In more precise terms, this center-of-gravity point is positioned approximately right above the surface at which the wheel assembly 5 contacts the floor. The moving operation of the wheel assembly 5 is controlled so that the actual posture of the base body 9 converges to the target position, and that the vehicle 1 may stand on its own without the base body 9 tilting.

According to the inverted pendulum type vehicle 1, in order to control the movement of the vehicle 1 as described above, the vehicle 1 comprises a control unit 50, a tilting sensor 52, a load sensor 54, and a rotary encoder 56R, 56L at appropriate places, as indicated in FIGS. 1 and 2. The control unit 50 comprises an electric circuit unit comprising, for example, a micro computer and a drive circuit unit of the electric motor 31R, 31L. The tilting sensor 52 measures a tilt angle θb with respect to an orthogonal direction (gravitational direction) of a predetermined component of the base body 9. The tilting sensor 52 also measures a rate of change of the tilt angle (=dθb/dt). The load sensor 54 detects whether or not an occupant is boarding the vehicle 1. The rotary encoder 56R, 56L acts as an angle sensor to detect a rotational angle and a rotational angular velocity of an output axis of each of the electric motors 31R and 31L.

In this case, the control unit 50 and the tilting sensor 52 are, for example, assembled to the supporting frame 13 in a condition such that the control unit 50 and the tilting sensor 52 are contained inside the supporting frame 13 of the base body 9. In addition, the load sensor 54 is embedded in the seat 3. Further, each of the rotary encoders 56R and 56L are integrated respectively with the electrically motors 31R and 31L. In addition, each of the rotary encoders 56R and 56L may be integrated respectively with the rotating parts 27R and 27L.

In more detail, the tilting sensor 52 comprises a rate sensor (angular velocity sensor) such as an acceleration sensor and a gyro sensor and the like. The tilting sensor 52 outputs the detection signal of these sensors to the control unit 50. In addition, the control unit 50 carries out a predetermined a predetermined measurement and computation procedure based on an output by the acceleration sensor and the rate sensor of the tilting sensor 52. The predetermined measurement and computation procedure may be a known computation. In this way, the control unit 50 computes a measured value of a tilt angle θb of the component equipped with the tilting sensor 52 with respect to an orthogonal direction and a measured value of a tilting angular velocity θbwdot, which is a rate of change, i.e., a differential of the tilt angle θb. According to the present embodiment, the component equipped with the tilting sensor 52 is the supporting frame 13.

In this case, the measured tilt angle θb (hereinafter, may be referred to as a base body tilt angle θb) each comprises an element θb_x in the y axis rotational direction (the pitch direction) and an element θb_y in the x axis rotational direction (the rolling direction). Similarly, the measured tilting angular velocity θbdot (hereinafter, may be referred to as a base body tilting angular velocity θbdot) also comprises an element θbdot_x (=dθb_x/dt) in the y axis rotational direction (the pitch direction) and an element θbdot_y (=dθb_y/dt) in the x axis rotational direction (the rolling direction).

Further, in the description of the inverted pendulum type vehicle 1, a variable representing a quantity of a movement condition comprising an element in the x axis direction and in the y axis direction or a direction rotating around each of the axes such as the base body tilt angle θb is used. In addition, a variable representing a coefficient and the like relating to the quantity of a movement condition is used. When each element of these variables are expressed separately, a subscript "_x" or "_y" are appended to the reference numeral indicating these variables.

In this case, for variables concerning a translational movement, such as a translational velocity and the like, a subscript "_x" is appended to an element in the x axis direction, while a subscript "_y" is appended to an element in the y axis direction.

Meanwhile, for variables concerning a rotational movement such as an angle, a rotational velocity, i.e., an angular velocity, and an angular acceleration, a subscript "_x" is appended to an element in the y axis direction, while a subscript "_y" is appended to an element in the x axis direction, as a matter of convenience, in order to make the subscripts consistent with the subscripts of the variables concerning a translational movement.

Furthermore, when a variable is represented as a pair of elements in the x axis direction and in the y axis direction, or as a pair of elements rotating around the y axis and around the x axis, a subscript "_xy" is appended to the reference numeral indicating these variables. For example, when the base body tilt angle θb is represented as a pair of an element θb_x around the y axis and an element θb_y around the x axis, the subscript "_xy" is used as follows: "base body tilt angle θb_xy."

The load sensor 54 is embedded in the seat 3 so that, when the occupant sits on the seat 3, the load sensor 54 receives a load due to the weight of the occupant. Thus, the load sensor 54 outputs to the control unit 50, a detection signal according to the load. Further, the control unit 50 determines whether or not the occupant is riding the vehicle 1 based on a measured value of a load represented by an output of this load sensor 54.

By the way, instead of the load sensor 54, a switch type sensor may be used such that the sensor is turned on when the occupant sits on the seat 3.

The rotary encoder 56R generates a pulse signal every time the output axis of the electric motor 31R rotates by a predetermined angle. Thus, the rotary encoder 56R outputs the pulse signal to the control unit 50. Further, the control unit 50 measures the rotational angle of the output axis of the electric motor 53R based on the pulse signal. Further, the control unit 50 measures the temporal rate of change, i.e., the differential of the measured value of the rotational angle as a rotational angular velocity of the electric motor 53R. The rotary encoder 56L at the side of the electric motor 31L is configured in a similar manner as well.

The control unit 50 determines a velocity command, which is a target value of the rotational angular velocity of each of the electric motors 31R and 31L by executing a predetermined computation procedure using the above measured values. The control unit 50 performs a feedback control of the rotational angular velocity of each of the electric motors 31R and 31L according to the velocity command.

Further, the relation between the rotational velocity of the output axis of the electric motor 31R and the rotational velocity of the rotating part 27R is a proportional relation according to a certain value of a deceleration ratio between the output axis and the rotation member 27R.

In the following description, the rotational angular velocity of the electric motor 31R refers to a rotational angular velocity of the rotation member 27R. Similarly, the rotational angular velocity of the electric motor 31L refers to a rotational angular velocity of the rotation member 27L.

Hereinafter, a controlling process of the control unit 50 is further described in detail.

Figure 7:
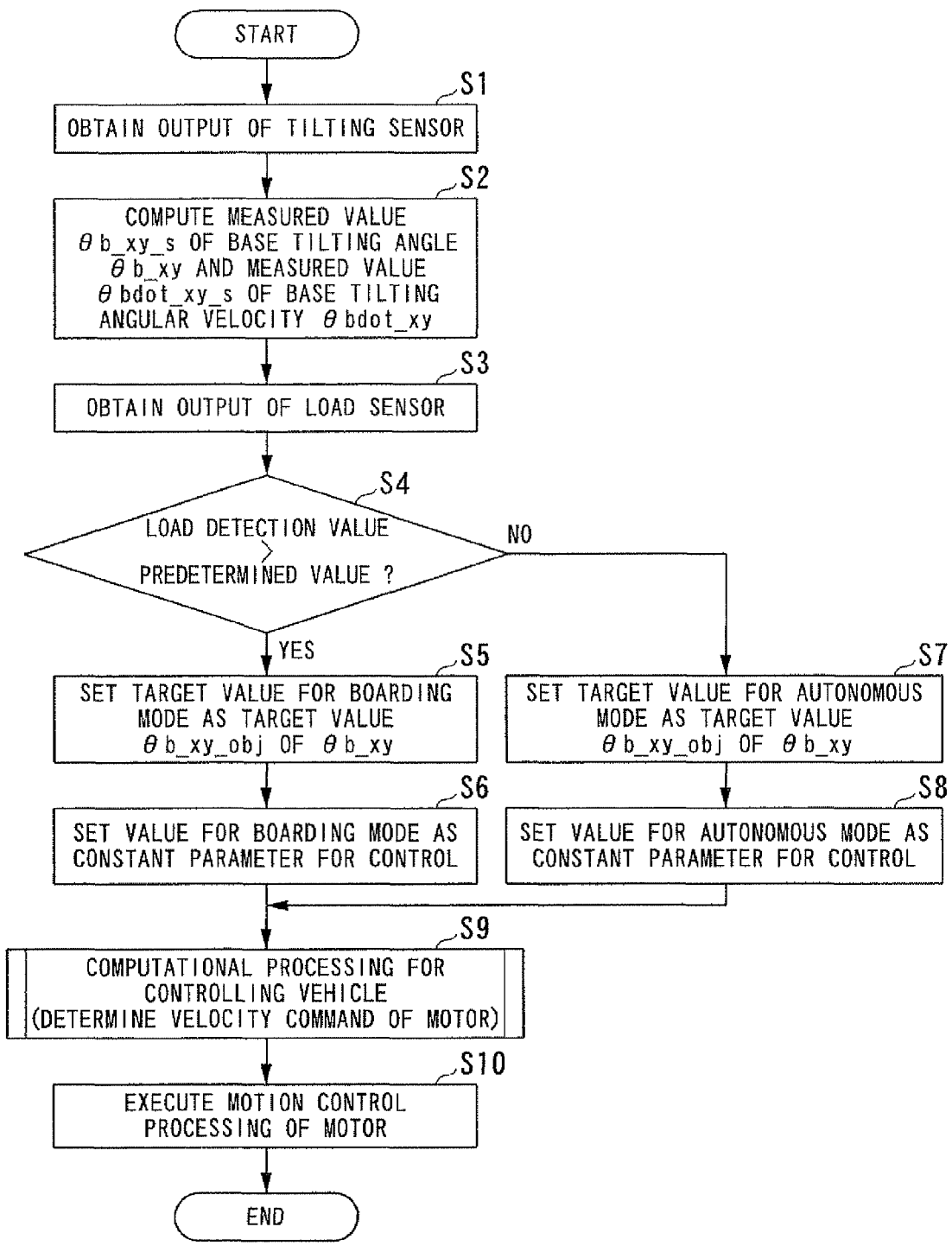
FIG. 7 is a flowchart showing a processing of a control unit of an inverted pendulum type vehicle according to an embodiment of the present invention.

The control unit 50 executes a procedure indicated in the flowchart shown in FIG. 7, at a predetermined control processing period. Here, the procedure indicated in the flowchart is referred to as a main routine processing.

First, in step S1, the control unit 50 obtains an output from the tilting sensor 52.

Next, the procedure moves on to step S2. In step S2, the control unit 50 computes a measured value θb_xy_s of the base body tilt angle θb and the measured value θbdot_xy_s of the base body tilting angular velocity θbdot based on an output obtained from the tilting sensor 52.

In the following description, when a measured value (a measured value or an estimated value) of an actual value of a variable representing a quantity of a condition such as the measured value θb_xy_s is referenced, a subscript "_s" is appended to the reference numeral of the variable.

In step S3, after the control unit 50 obtains an output of the load sensor 54, the control unit 50 performs a determination processing of the step S4. In this determination processing, the control unit 50 determines whether or not the occupant is riding the vehicle 1, i.e., whether or not the occupant is seated on the seat 3, based on whether or not a load observed value obtained by an output of the load sensor 54 is greater than a predetermined value.

Further, when the determination result of step S4 is in the positive, the control unit 50 performs a processing in step S5 in which the target value θb_xy_obj of the base body tilt angle θb is set. In addition, when the determination result of step S4 is in the positive, the control unit 50 performs a processing in step S6 in which a value of a constant parameter for controlling the movement of the vehicle 1 is set. An example of the constant parameter includes a basic value for each type of gain and the like.

In step S5, the control unit 50 sets a predetermined target value for a boarding mode as a target value θb_xy_obj of the base body tilt angle θb.

Here, a "boarding mode" refers to an operating mode of the vehicle 1 in a condition in which the occupant is riding the vehicle 1. The target value θb_xy_obj for this boarding mode is predetermined so as to be equal to or approximately equal to the measured value θb_xy_s of the base body tilt angle θb measured based on an output by the tilting sensor 52 in a position of the base body 9 in which a center-of-gravity point of the vehicle 1 and an occupant seated on the seat 3 in their entirety is located approximately right above the surface at which the wheel assembly 5 contacts the floor surface. Hereinafter, the center-of-gravity point of the vehicle 1 and an occupant seated on the seat 3 in their entirety is referred to as a "vehicle/occupant integrated center-of-gravity point."

Further, in step S6, the control unit 50 sets a value of a constant parameter for controlling the motion of the vehicle 1 as a predetermined value for a boarding mode. Incidentally, the constant parameter includes hx, hy, Ki_b_x, Ki_b_x, Ki_a_y, Ki_b_y (i=1, 2, 3) and the like.

Meanwhile, when the determination result of step S4 is in the negative, the control unit 50 performs a processing in S7 in which the target value θb_xy_obj of the base body tilt angle θb_xy is set. In addition, when the determination result of step S4 is in the negative, the control unit 50 performs a processing in S8 in which the value of the constant parameter for controlling the movement of the vehicle 1 is set.

In step S7, the control unit 50 sets a predetermined target value for an autonomous mode as a target value θb_xy_obj of the tilt angle θb.

Here, an "autonomous mode" refers to a moving mode of the vehicle 1 in a condition in which the occupant is not riding the vehicle 1. The target value θb_xy_obj for the autonomous mode is predetermined so as to be equal to or approximately equal to the measured value θb_xy_s of the base body tilt angle θb measured based on an output by the tilting sensor 52 in a position of the base body 9 in which a center-of-gravity point of the vehicle 1 in its single form is located approximately right above the surface at which the wheel assembly 5 contacts the floor surface. Hereinafter, a center-of-gravity point of the vehicle 1 in its single form is referred to as a "singular vehicle body center-of-gravity point." In general, the target value θb_xy_obj for the autonomous mode is different from the target value θb_xy_obj for the boarding mode.

Further, in step S8, the control unit 50 sets a predetermined value for an autonomous mode as a value of a constant parameter for controlling the movement of the vehicle 1. The value of the constant parameter for the autonomous mode is different from the value of the constant parameter for the boarding mode.

The value of the constant parameter is differed in the boarding mode and in the autonomous mode, because the characteristics of how the movement of the vehicle 1 responds to a control input are different in the boarding mode and in the autonomous mode, since the height of the center-of-gravity point and the total mass and the like are different in the boarding mode and in the autonomous mode.

According to the processing performed in steps S4-S8, the target value θb_xy_obj of the base body tilt angle θb_xy and the value of the constant parameter is different for each movement mode, i.e., the boarding mode and the autonomous mode.

Incidentally, the processing in steps S5 and S6, or the processing in steps S7 and S8 need not be performed for every cycle of the control processing, and may be only performed when there is a change in the determination result of step S4.

Incidentally, in both the boarding mode and the autonomous mode, the target value of the component θbdot_x in a direction around the y axis and the target value of the element θbdot_y in a direction around the x axis of the base body tilting angular velocity θbdot are both "0." Therefore, it is not necessary to set the target value of the base body tilting angular velocity θbdot_xy.

As described above, after executing the processing in steps S5 and S6, or the processing in steps S7 and S8, the control unit 50 then moves on to step S9. In step S9, the velocity commands of each of the electric motors 31R, 31L are determined by executing the computational processing for controlling the vehicle. This computational processing for controlling the vehicle is described later.

Next, the processing moves on to step S10. In step S10, the control unit 50 executes the control operation of the electric motors 31R and 31L according to the velocity command determined in step S9. In this control operation, the control unit 50 determines the target value of the output torque of the electric motor 31R so that a difference between a velocity command of the electric motor 31R determined in step S9 and the measured value of the rotational velocity of the electric motor 31R measured based on the output of the rotary encoder 56R is converged to "0." The target value of the output torque may also be referred to as the target torque. Furthermore, the control unit 50 controls the electric current supplied to the electric motor 31R so that the output torque of the target torque is outputted to the electric motor 31R. The movement control of the left electric motor 31L is configured in a similar manner.

Heretofore, an overall control processing executed by the control unit 50 has been described.

Next, the computational processing for controlling the vehicle executed in step S9 is described in detail.

Incidentally, in the following description, the vehicle/occupant integrated center-of-gravity point in the boarding mode and the singular vehicle body center-of-gravity point in the autonomous mode are collectively referred to as the "vehicle system center of gravity." When the operating mode of the vehicle 1 is the boarding mode, the vehicle system center of gravity refers to the vehicle/occupant integrated center-of-gravity point. When the operating mode of the vehicle 1 is the autonomous mode, the vehicle system center of gravity refers to the singular vehicle body center-of-gravity point.

Further, in the following description regarding a value determined or renewed by the control unit 50 in each period of control processing, a value determined in the current, most recent period of control processing may be referred to as the current value. Meanwhile, a value determined in the period immediately prior to the current period of control processing may be referred to as the previous value. Further, when a value is referred to without specifying whether the value is a current value or a previous value, the value is meant to be a current value.

Further, regarding the velocity and acceleration in the x axis direction, the frontal direction is considered to be a positive direction. Regarding the velocity and acceleration in the y axis direction, the left direction is regarded as the positive direction.

Figure 8:
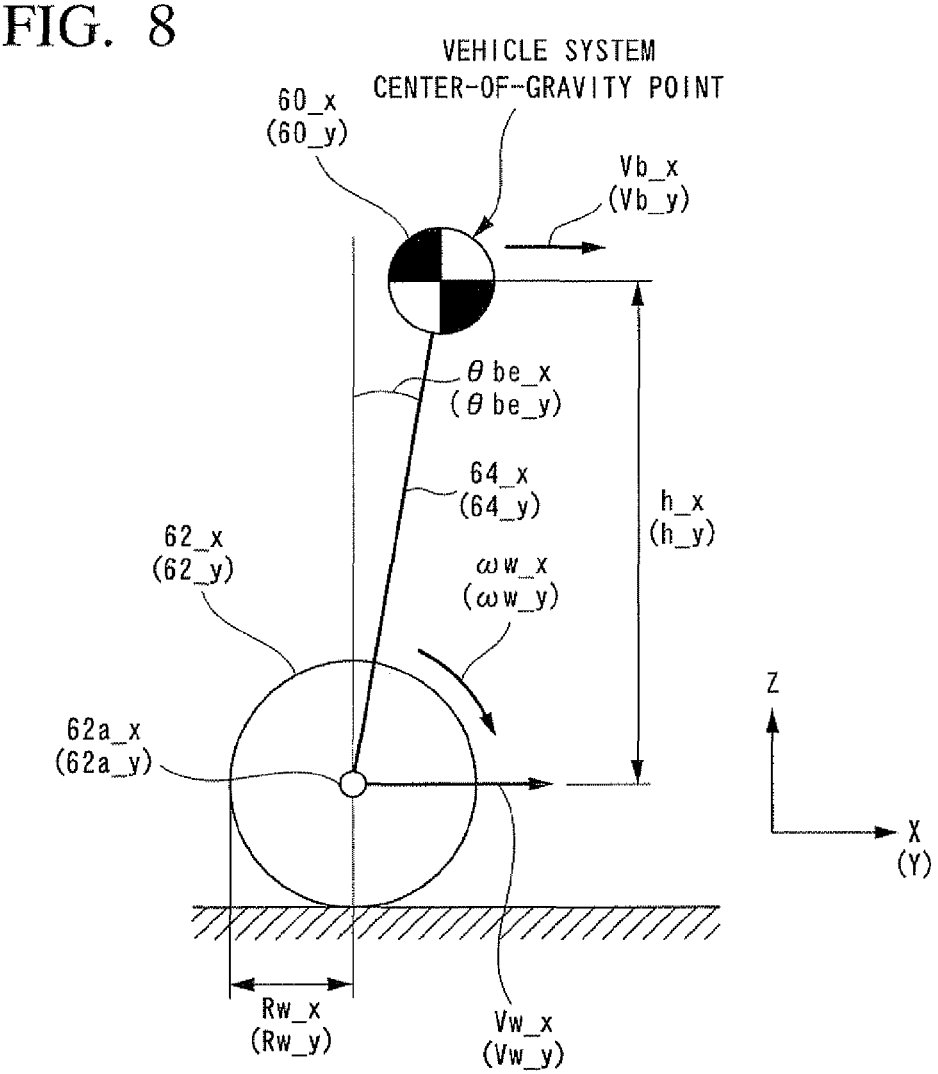
FIG. 8 is a diagram showing an inverted pendulum type model representing dynamic behavior of an inverted pendulum type vehicle according to an embodiment of the present invention.

Furthermore, the computational processing for controlling the vehicle is executed in step S9 under the assumption that a dynamic movement of the vehicle system center of gravity is represented approximately as a behavior of the inverted pendulum model as shown in FIG. 8. In particular, the dynamic movement of the center-of-gravity point refers to a movement viewed by projecting from a y axis direction to the xz surface which is perpendicular to the y axis, and also refers to a movement viewed by projecting from an x axis direction to the yz surface which is perpendicular to the x axis. Furthermore, the behavior of the inverted pendulum model mentioned above refers to a dynamic movement of the inverted pendulum.

Further, in FIG. 8, a reference numeral without a parenthesis is a reference numeral corresponding to an inverted pendulum model seen from a y axis direction. Meanwhile, a reference numeral with a parenthesis is a reference numeral corresponding to an inverted pendulum model seen from the x axis direction.

In this case, an inverted pendulum model representing a behavior seen from a y axis direction comprises a mass point 60_x positioned at the vehicle system center of gravity and an imaginary wheel 62_x. Here, the imaginary wheel 62_x comprises a rotating axis 62a_x parallel to the y axis direction. The imaginary wheel 62_x and can rotate freely over a floor surface. Further, the mass point 60_x is supported by the rotating axis 62a_x of the imaginary wheel 62_x via a rod 64_x shaped like a straight line. In addition, the mass point 60_x may swing freely around the rotating axis 62a_x, with the rotating axis 62a_x being the fulcrum point.

According to this inverted pendulum model, the movement of the mass point 60_x corresponds to the movement of the vehicle system center of gravity seen from a y axis direction. In addition, the tilt angle θbe_x of the rod 64_x with respect to the orthogonal direction is equal to a difference θbe_x_s (=θb_x_s−θb_x_obj) between a measured value of a base body tilt angle θb_y_s and a target value of a base body tilt angle θb_x_obj in the direction around the y axis. Further, a rate of change (=dθbe_x/dt) of the tilt angle θbe_x of the rod 64_x equals the measured value θbdot_x_s of the base body tilting angular velocity around the y axis. Further, the velocity Vw_x of the imaginary wheel 62_x (the translational velocity in the x axis direction) is equal to the velocity of the wheel assembly 5 of the vehicle 1 in the x axis direction.

Similarly, the inverted pendulum model representing a movement seen from the x axis direction (see reference numeral in FIG. 8 with parenthesis) comprises a mass point 60_y located at the vehicle system center of gravity and an imaginary wheel 62_y, which comprises a rotational axis 62a_y parallel in the x axis direction and can roll around freely on a floor surface. Further, the mass point 60_y is supported by the rotational axis 62a_y of the imaginary wheel 62_y via a linear rod 64_y. Furthermore, the mass point 60_y may freely wobble around the rotational axis 62a_y, with the rotational axis 62a_y being a fulcrum point.

According to this inverted pendulum model, the movement of the mass point 60_y corresponds to the movement of the vehicle system center of gravity seen from an x axis direction. In addition, the tilt angle θbe_y of the rod 64_y with respect to the orthogonal direction is equal to a difference θbe_y_s (=θb_y_s−θb_y_obj) between a measured value of a base body tilt angle θb_y_s and a target value of a base body tilt angle θb_y_obj in the direction around the x axis. Further, a rate of change (=dθbe_y/dt) of the tilt angle θbe_y of the rod 64_y equals the measured value θbdot_y_s of the base body tilting angular velocity around the x axis. Further, the velocity Vw_y of the imaginary wheel 62_y (the translational velocity in the y axis direction) is equal to the velocity of the wheel assembly 5 of the vehicle 1 in the y axis direction.

Furthermore, the imaginary wheels 62_x and 62_y each have a predetermined radius of Rw_x and Rw_y.

Furthermore, the rotational angular velocity ωw_x and ωw_y of each of the imaginary wheels 62_x and 62_y, and a rotational angular velocity ω_R and ω_L of each of the electric motors 31R and 31L (in more precise terms, the rotational angular velocity ω_R and ω_L of the rotation members 27R and 27L) satisfy the following equations 01a and 01b.

$$\omega w\_x = (\omega\_R + \omega\_L)/2 \qquad \text{(Equation 01a)}$$

$$\omega w\_y = C \cdot (\omega\_R - \omega\_L)/2 \qquad \text{(Equation 01b)}$$

Incidentally, "C" in the equation 01b refers to a predetermined constant which depends on a mechanical relationship and a slippage between the free roller 29R, 29L and the wheel assembly 5.

Here, the dynamics of the inverted pendulum model shown in FIG. 8 is represented by the following equations 03x and 03y. Incidentally, the equation 03x is an equation representing the dynamics of the inverted pendulum model seen from a y axis direction. The equation 03y is an equation representing the dynamics of the inverted pendulum model seen from an x axis direction.

$$d^2\theta be\_x/dt^2 = \alpha\_x \cdot \theta be\_x + \beta\_x \cdot \omega wdot\_x \qquad \text{(Equation 03x)}$$

$$d^2\theta be\_y/dt^2 = \alpha\_y \cdot \theta be\_y - \beta\_y \cdot \omega wdot\_y \qquad \text{(Equation 03y)}$$

tilt angle θbe_x: tilt angle of the rod 64_x with respect to the orthogonal direction Here, the ωwdot_x in equation 03x represents a rotational angular acceleration of the imaginary wheel 62_x, i.e., the first differential of the rotational angular velocity ωw_x. In addition, α_x represents a coefficient depending on the mass and the height h_x of the mass point 60_x. β_x is a coefficient depending on the inertia (the moment of inertia) of the imaginary wheel 62_x and the radius Rw_x. The above description also applies to ωwdot_y, α_y, and β_y in equation 03y.

As indicated in equations 03x and 03y, the movement of the mass points 60_x and 60_y of the inverted pendulum is prescribed depending on the rotational angular acceleration ωwdot_x of the imaginary wheel 62_x, and the rotational angular acceleration ωwdot_y of the imaginary wheel 62_y.

Therefore, the rotational angular acceleration ωwdot_x of the imaginary wheel 62_x is used as the manipulated variable (control input) for controlling the movement of the vehicle system center of gravity seen from the y axis direction. At the same time, the rotational angular acceleration ωwdot_y of the imaginary wheel 62_y is used as the manipulated variable (control input) for controlling the movement of the vehicle system center of gravity seen from the x axis direction.

Heretofore, a computational processing for controlling the vehicle, executed in step S9, is described in general. The control unit 50 determines an imaginary wheel rotational angular acceleration commands ωwdot_x_cmd and ωwdot_y_cmd, which are command values (target values) of the rotational angular acceleration ωwdot_x and ωwdot_y as an manipulated variable, so that the movement of the mass point 60_x seen from the x axis direction and the movement of the mass point 60_y seen from the y axis direction becomes a movement corresponding to a predetermined movement of the vehicle system center of gravity.

Furthermore, the control unit 50 determines a value obtained by integrating each of the imaginary wheel rotational angular acceleration commands ωwdot_x_cmd and ωwdot_y_cmd as the imaginary wheel rotational angular velocity commands ωw_x_cmd and ωw_y_cmd, which are the command values (target values) of the rotational angular velocity ωw_x and ωw_y of each of the imaginary wheels 62_x and 62_y.

In addition, the control unit 50 regards the velocity (=Rw_x·ωw_x_cmd) of the imaginary wheel 62_x corresponding to the imaginary wheel rotational angular velocity command ωw_x_cmd as the target velocity of the wheel assembly 5 of the vehicle 1 in the x axis direction. The control unit 50 also regards the velocity (=Rw_y·ωw_y_cmd) of the imaginary wheel 62_y corresponding to the imaginary wheel rotational angular velocity command ωw_y_cmd as the target velocity of the wheel assembly 5 of the vehicle 1 in the y direction. The control unit 50 determines the velocity commands ω_R_cmd and ω_L_cmd of respectively the electric motors 31R and 31L so as to reach these target velocities.

Further, the imaginary wheel rotational angular acceleration commands ωwdot_x_cmd and ωwdot_y_cmd, being an manipulated variable (control input), is determined by adding up three operational components as indicated in Equations 07x and 07y described later.

Figure 9:
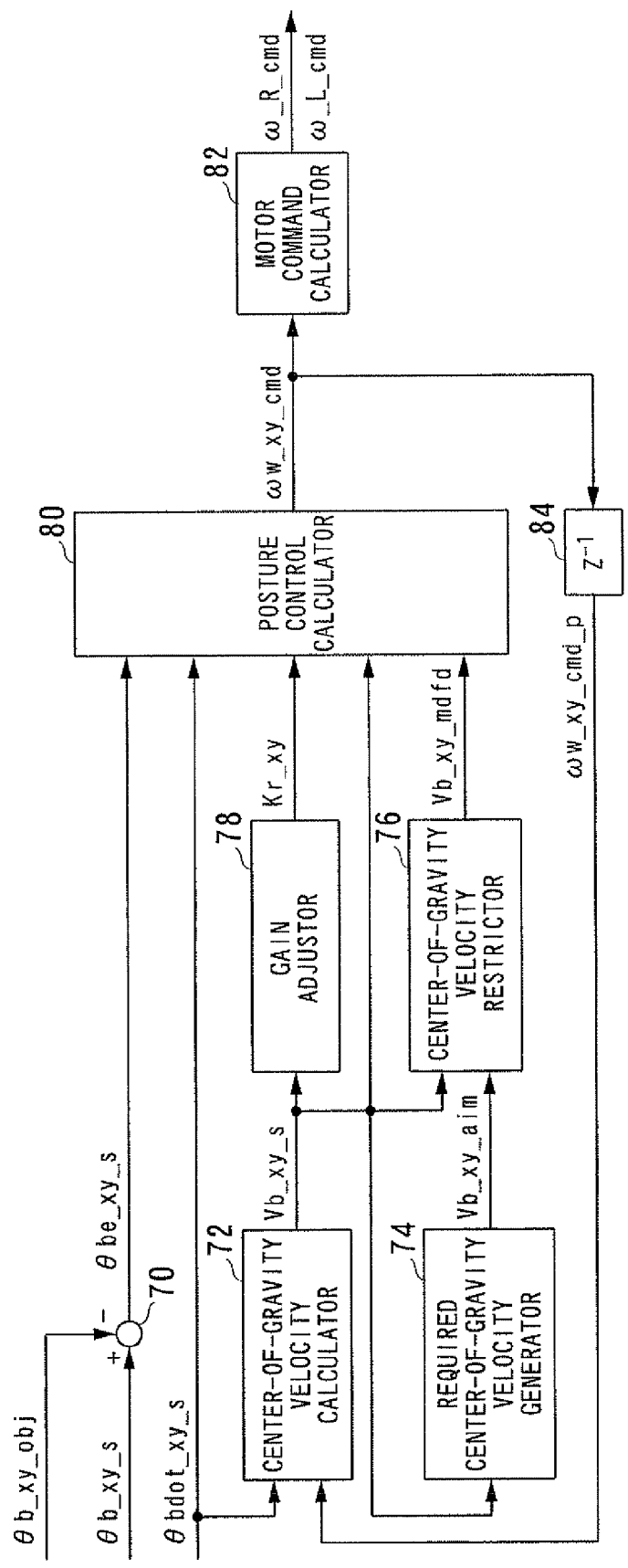
FIG. 9 is a block diagram showing a processing of step S9 shown in FIG. 7.

As described above, the control unit 50 comprises the feature represented in the block diagrams shown in FIG. 9 in order to execute the computational processing for controlling the vehicle in step S9.

In other words, the control unit 50 comprises an error calculator 70, a center-of-gravity velocity calculator 72, a required center-of-gravity point velocity generator 74, a center-of-gravity point velocity restrictor 76, and a gain adjustor 78. The error calculator 70 computes the base body tilt angle deviation observed value θbe_xy_s, which is a deviation between the base body tilt angle observed value θb_xy_s and the base body tilt angle target value θb_xy_obj. The center-of-gravity velocity calculator 72 computes a center-of-gravity point velocity estimate value Vb_xy_s as a observed value of the center-of-gravity point velocity Vb_xy, which is the velocity of the vehicle system center of gravity. The required center-of-gravity point velocity generator 74 generates a required center-of-gravity point velocity V_xy_aim as a required value of the center-of-gravity point velocity Vb_xy, which is estimated to be required according to the driving operation of the vehicle 1 by the occupant and the like (i.e., an operation adding an impellent force to the vehicle 1). The center-of-gravity point velocity restrictor 76 determines the target center-of-gravity point velocity for control Vb_xy_mdfd as a target value of the center-of-gravity point velocity Vb_xy based on the estimated center-of-gravity velocity value Vb_xy_s and the required center-of-gravity point velocity V_xy_aim taking into consideration the limitations according to the tolerable range of the rotational angular velocity of the electric motors 31R and 31L. The gain adjustor 78 determines a gain adjustment parameter Kr_xy to adjust the value of the gain coefficient of the equations 07x, 07y.

The control unit 50 further comprises a posture control calculator 80 and a motor command calculator 82. The posture control calculator 80 computes the imaginary wheel rotational angular velocity command ωw_xy_cmd. The motor command calculator 82 converts the imaginary wheel rotational angular velocity command ωw_xy_cmd into a pair of right side velocity command ω_R_cmd of the electric motor 31R (the command value of the rotational angular velocity) and a left side velocity command ω_L_cmd of the electric motor 31L (the command value of the rotational angular velocity).

Incidentally, the reference numeral 84 in FIG. 9 indicates a delay element imputing an imaginary wheel rotational angular velocity command ωw_xy_cmd computed by the posture control calculator 80 for each control processing cycle. In each control processing cycle, the delay element 84 outputs the previous value ωw_xy_cmd_p of the imaginary wheel rotational angular velocity command ωw_xy_cmd.

Each of these operations are performed by each of the processors in the computational processing for controlling the vehicle in step S9.

In other words, the control unit 50 first executes a processing of the error calculator 70 and the center-of-gravity velocity calculator 72.

The error calculator 70 receives an input of the base body tilt angle observed value θb_xy_s (θb_x_s and θb_y_s) computed in the step S2. The error calculator 70 also receives an input of the target value θb_xy_obj (θb_x_obj and θby_obj) set in steps S5 or step S7. Further, the error calculator 70 computes the base body tilt angle deviation observed value θbe_x_s in the direction around the y axis by subtracting θb_x_obj from θb_x_s (=θb_x_s−θb_x_obj). At the same time, the error calculator 70 computes the base body tilt angle deviation observed value θbe_y_s in the direction around the x axis by subtracting θb_y_obj from θby_s (=θby_s−θb_y_obj).

In addition, the processing of the error calculator 70 may be executed before the computational processing for controlling the vehicle performed in step S9. For example, the processing by the error calculator 70 may be executed during the processing of steps S5 or S7.

The center-of-gravity velocity calculator 72 receives an input of the current value of the base body tilting angular velocity observed value θbdot_xy_s (θbdot_x_s and θbdot_y_s) computed in step S2. In addition, the center-of-gravity velocity calculator 72 receives an input of the previous value ωw_xy_cmd_p (ωw_x_cmd_p and ωw_y_cmd_p) of the imaginary wheel velocity command ωw_xy_cmd from the delay element 84. In addition, the center-of-gravity velocity calculator 72 computes the center-of-gravity point velocity estimation value Vb_xy_s (Vb_x_s and Vb_y_s) from these inputs according to a predetermined arithmetic equation based on the inverted pendulum model.

In detail, the center-of-gravity velocity calculator 72 computes each of Vb_x_s and Vb_y_s according to the following equations 05x and 05y.

$$Vb\_x\_s = Rw\_x \cdot \omega w\_x\_cmd\_p + h\_x \cdot \theta bdot\_x\_s \qquad (05x)$$

$$Vb\_y\_s = Rw\_y \cdot \omega w\_y\_cmd\_p + h\_y \cdot \theta bdot\_y\_s \qquad (05y)$$

In these equations 05x and 05y, Rw_x and Rw_y each represent the radius of the wheels 62_x and 62_y, and are predetermined values. Further, h_x and h_y each represent the height of the mass points 60_x and 60_y of the inverted pendulum model. In this case, the height of the vehicle system center of gravity is maintained at an approximately constant level. Here, predetermined values are used for h_x and h_y. Thus, the heights h_x and h_y are included in the constant parameter, the value of which is set in steps S6 or S8.

The first term of the right side of the equation 05x is a moving velocity of the imaginary wheel 62_x in the x axis direction, corresponding to the previous value ωw_x_cmd_p of the velocity command of the imaginary wheel 62_x. This velocity corresponds to the current value of the actual velocity of the wheel assembly 5 in the x axis direction. Further, the second term of the right side of the equation 05x corresponds to the current value of the velocity of the vehicle system center of gravity in the x axis direction (the relative velocity with respect to the wheel assembly 5) due to the base body 9 tilting in the direction around the y axis in a tilting angular velocity of θbdot_x_s. These characteristics apply to equation 05y as well.

Further, a pair of observed values (current values) of the rotational angular velocity for each of the electric motors 31R and 31L measured based on the output of the rotary encoder 56R and 56L may be converted to a pair of rotational angular velocities for each of the imaginary wheels 62_x and 62_y. These rotational angular velocities may be used instead of ωw_x_cmd_p and ωw_y_cmd_p in equations 05x and 05y. However, in terms of eliminating the influence of noise included in the observed value of the rotational angular velocity, it is more preferable to use the target values ωw_x_cmd_p and ωw_y_cmd_p.

Next, the control unit 50 executes the processing in the required center-of-gravity point velocity generator 74 and the gain adjustor 78. In this case, the required center-of-gravity point velocity generator 74 and the gain adjustor 78 each receives an input of the center-of-gravity point velocity estimation value Vb_xy_s (Vb_x_s and Vb_y_s) computed as described above in the center-of-gravity velocity calculator 72.

Further, when the operation mode of the vehicle 1 is in a boarding mode, the required center-of-gravity point velocity generator 74 determines the required center-of-gravity point velocity V_xy_aim (V_x_aim, V_y_aim) based on the inputted center-of-gravity point velocity estimation value Vb_xy_s (Vb_x_s and Vb_y_s). Details of the computation are described later. Incidentally, according to the present embodiment, when the operation mode of the vehicle 1 is in an autonomous mode, the required center-of-gravity point velocity generator 74 sets the required center-of-gravity point velocity V_x_aim and V_y_aim to zero.

Further, the gain adjustor 78 determines the gain adjustment parameter Kr_xy (Kr_x and Kr_y) based on the inputted center-of-gravity point velocity estimation value Vb_xy_s (Vb_x_s and Vb_y_s).

The processing by the gain adjustor 78 is described below with reference to FIGS. 10 and 11.

Figure 10:
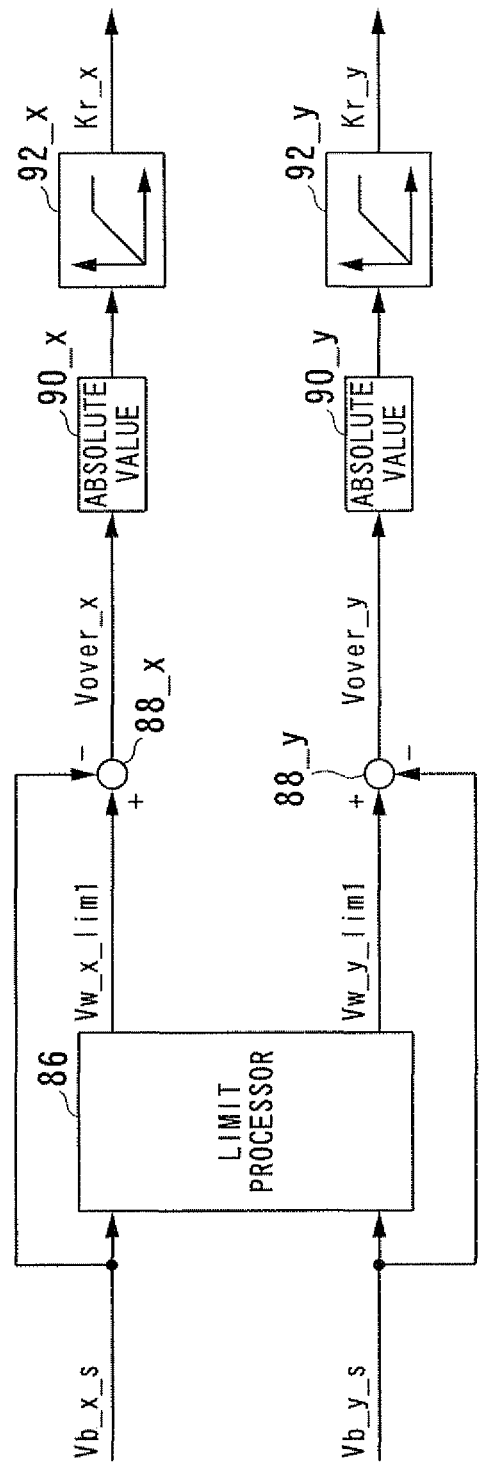
FIG. 10 is a block diagram showing a processing of a gain adjustor shown in FIG. 9.
Figure 11:
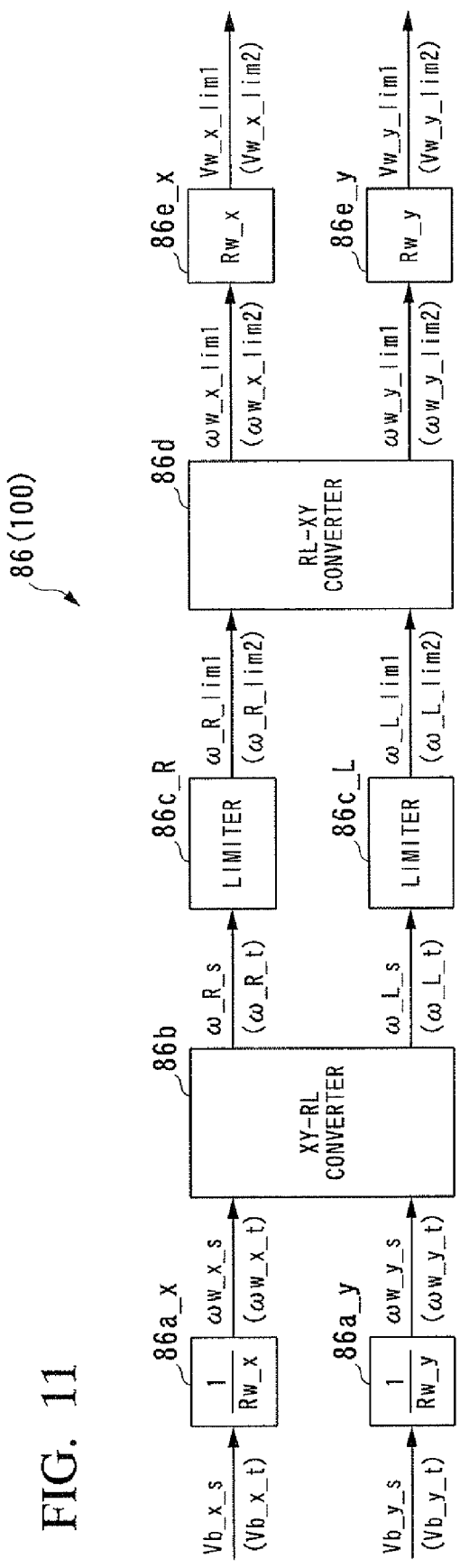
FIG. 11 is a block diagram showing a processing of a limiting processor shown in FIG. 10 (or a limiting processor shown in FIG. 12).

As shown in FIG. 10, the gain adjustor 78 enters the imputed center-of-gravity point velocity estimation values Vb_x_s and Vb_y_s to the limiting processor 86. This limiting processor 86 generates the output values Vw_x_lim1 and Vw_y_lim1 by adding a limitation according to the tolerable range of the rotational angular velocity of each of the electrically operated motors 31R and 31L to the center-of-gravity point velocity estimation value Vb_x_s and Vb_y_s. The output value Vw_x_lim1 indicates the value after the limitation imposed on the velocity Vw_x of the imaginary wheel 62_x in the x axis direction. The output value Vx_y_lim1 indicates the value after the limitation is imposed on the velocity Vw_y of the imaginary wheel 62_y in the y axis direction.

The processing by the limiting processor 86 is described in further detail with reference to FIG. 11. The parenthesized reference numerals in FIG. 11 represent a processing of the limiting processor 100 of the center-of-gravity point velocity restrictor 76, and may be ignored in the description concerning the procedure executed by the limiting processor 86.

The limiting processor 86 first enters the center-of-gravity point velocity estimation values Vb_x_s and Vb_y_s to the processors 86a_x and 86a_y. The processor 86a_x divides Vb_x_s with the radius Rw_x of the imaginary wheel 62_x, and computes the rotational angular velocity ωw_x_s of the imaginary wheel 62_x, in a case assuming that the moving velocity of the imaginary wheel 62_x in the x axis direction is matched with Vb_x_s. Similarly, the processor 86a_y computes the rotational angular velocity ωw_y_s (=Vb_y_s/Rw_y) of the imaginary wheel 62_y, in a case assuming that the moving velocity of the imaginary wheel 62_y in the y axis direction is matched with Vb_y_s.

Next, the limiting processor 86 converts the pair ωw_x_s and ωw_y_s into a pair of rotational angular velocity ω_R_s of the electric motor 31R and the rotational angular velocity ω_L_s of the electric motor 31L, via the XY-RL converter 86b.

This conversion is performed by solving the simultaneous equation of the unknowns ω_R_s and ω_L_s obtained by replacing the variables ωw_x, ωw_y, ω_R, and ω_L in the equations 01a and 01b into ωw_x_s, w_y_s, ω_R_s, and ω_L_s.

Next, the limiting processor 86 inputs the output values ω_R_s and ω_L_s of the XY-RL converter 86b respectively into the limiters 86c_R and 86c_L. At this time, when ω_R_s is within a tolerable range for the right motor comprising a predetermined upper limit (>0) and a lower limit (<0), the limiter 86c_R outputs ω_R_s directly as the output value ω_R_lim1. Meanwhile, when ω_R_s is outside of the tolerable range for the right motor, the limiter 86c_R outputs either one of the boundary values (the upper limit or the lower limit) of the tolerable range for the right motor closer to ω_R_s as the output value ω_R_lim1. As a result, the output value ω_R_lim1 of the limiter 86c_R is limited to a value within the tolerable range for the right motor.

Similarly, when ω_L_s is within a tolerable range for the left motor comprising a predetermined upper limit (>0) and a lower limit (<0), the limiter 86c_L outputs ω_L_s directly as the output value ω_L_lim1. Meanwhile, when ω_L_s is outside of the tolerable range for the left motor, the limiter 86c_L outputs either one of the boundary values (the upper limit or the lower limit) of the tolerable range for the left motor closer to ω_L_s as the output value ω_L_lim1. As a result, the output value ω_L_lim1 of the limiter 86c_L is limited to a value within the tolerable range for the left motor.

The tolerable range for the right motor is set in order to prevent the absolute value of the rotational angular velocity of the electric motor 31R at the right side from becoming too large, and to prevent the maximum value of the torque which can be outputted from the electric motor 31R from declining. This feature applies to the tolerable range for the left motor as well.

Next, the limiting processor 86 converts the pair of output values ω_R_lim1 and ω_L_lim1 of the limiters 86c_R and 86c_L to a pair of rotational angular velocity ωw_x_lim1 and ωw_y_lim1 of the imaginary wheels 62_x and 62_y through the RL-XY converter 86d.

This conversion is a reverse conversion process performed by the XY-RL converter 86b. This procedure is executed by solving the simultaneous equation of the unknowns ωw_x_lim1 and ωw_y_lim1 obtained by replacing the variables ωw_x, ωw_y, ω_R, and ω_L in the equations 01a and 01b into ωw_x_lim1, ωw_y_lim1, ω_R_lim1, and ω_L_lim1.

Next, the limiting processor 86 inputs the output values ωw_x_lim1 and ωw_y_lim1 from the RL-XY converter 86d into the processors 86e_x and 86e_y. The processor 86e_x multiplies ωw_x_lim1 with the radius Rw_x of the imaginary wheel 62_x, and thereby converts ωw_x_lim1 into the velocity Vw_y_lim1 of the imaginary wheel 62_x. Similarly, the processor 86e_y converts ωw_y_lim1 into the velocity Vw_y_lim1 (=ωw_y_lim1·Rw_y) of the imaginary wheel 62_y.

As a result of the processing executed by the limiting processor 86, when the velocity Vw_x of the imaginary wheel 62_x in the x axis direction and the velocity Vw_y of the imaginary wheel 62_y in the y axis direction are assumed to be respectively matched with the center-of-gravity point velocity estimation values Vb_x_s and Vb_y_s (i.e., when the velocity of the wheel assembly 5 in the x axis direction and the y direction is respectively matched with Vb_x_s and Vb_y_s), and when the rotational angular velocities ω_R_s and ω_L_s of the electric motors 31R and 31L necessary to attain the velocities are both within a tolerable range, the pair of output values Vw_y_lim1 and Vw_y_lim1 respectively matching Vb_x_s and Vb_y_s are outputted by the limiting processor 86.

Meanwhile, when both or either one of the rotational angular velocities ω_R_s and ω_L_s of the electric motors 31R and 31L is outside the tolerable range, both or either one of the rotational angular velocities is confined to be included in the tolerable range. Under this limitation, the pair of velocities Vw_x_lim1 and Vw_y_lim1 in the x axis direction and the y axis direction corresponding to the pair of rotational angular velocities ω_R_lim1 and ω_L_lim1 of the electric motors 31R and 31L is outputted from the limiting processor 86.

Therefore, under the compulsory, necessary condition that each of the rotational angular velocities of the electric motors 31R and 31L corresponding to the pair of output values Vw_x_lim1 and Vw_y_lim1 is not outside of the tolerable range, the limiting processor 86 generates a pair of output values Vw_x_lim1 and Vw_y_lim1 so that each of the output values Vw_x_lim1 and Vw_y_lim1 is matched respectively with Vb_x_s and Vb_y_s to the extent possible under the above necessary condition.

Returning to the description concerning FIG. 10, the gain adjustor 78 executes the processing of the calculators 88_x and 88_y. The calculator 88_x receives an input of the center-of-gravity point velocity estimation value Vb_x_s in the x axis direction and the output value Vw_x_lim1 of the limiting processor 86. Further, the calculator 88_x computes a value Vover_x by subtracting Vb_x_s from Vw_x_lim1 and outputs the value Vover_x. Further, the calculator 88_y receives an input of the center-of-gravity point velocity estimation value Vb_y_s in the y axis direction and the output value Vw_y_lim1 of the limiting processor 86. Further, the calculator 88_y computes a value Vover_y by subtracting Vb_y_s from Vw_y_lim1, and outputs the value Vover_y.

In this case, when the output values Vw_x_lim1 and Vw_y_lim1 were not compulsorily limited in the limiting processor 86, the following equations hold: Vw_x_lim1=Vb_x_s, Vw_y_lim1=Vb_y_s Therefore, the output values Vover_x and Vover_y of each of the computational units 88_x and 88_y both becomes zero.

On the other hand, when the output values Vw_y_lim1 and Vw_y_lim1 of the limiting processor 86 are generated by imposing a compulsory limitation on the input values Vb_x_s and Vb_y_s, the corrected value (=Vw_x_lim1−Vb_x_s) of Vw_x_lim1 with respect to Vb_x_s and the corrected value (=Vw_y_lim1−Vb_y_s) of Vw_y_lim1 with respect to Vb_y_s are outputted by the calculators 88_x and 88_y.

Next, the gain adjustor 78 runs the output value Vover_x of the calculator 88_x through the processors 90_x and 92_x in order. In this way, the gain adjustor 78 determines the gain adjusting parameter Kr_x. Further, the gain adjustor 78 determines the gain adjusting parameter Kr_y by running the output value Vover_y of the calculator 88_y through the processors 90_y and 92_y in order. Further, the gain adjusting parameters Kr_x and Kr_y are both values between 0 and 1.

The processor 90_x computes the absolute value of the inputted Vover_x, and outputs the absolute value. Further, the processor 92_x generates Kr_x so that the output value Kr_x increases monotonically with respect to the inputted value |Vover_x| and so that Kr_x has a saturation characteristic. According to this saturation characteristic, when the input value becomes large to a certain degree, the change in the output value with respect to the increase in the input value becomes equal to or close to zero.

In this case, when the input value |Vover_x| is less than or equal to a predetermined value, the processor 92_x outputs the value obtained by multiplying the input value |Vover_x| with a predetermined proportionality coefficient as Kr_x. Further, when the input value |Vover_x| is greater than a predetermined value, the processor 92_x outputs "1" as Kr_x. Further, the proportionality coefficient is set so that, when |Vover_x| matches with a predetermined value, the product of |Vover_x| and the proportionality coefficient equals 1.

Further, the procedure performed by the processors 90_y and 92_y is similar to the procedure performed by the processors 90_x and 92_x as described above.

According to the procedure performed by the gain adjustor 78, when a compulsory limitation is not imposed on the output values Vw_y_lim1 and Vw_y_lim1 by the limiting processor 86, the gain adjusting parameters Kr_x and Kr_y are both set to zero. In other words, when the rotational angular velocity of each of the electric motors 31R and 31L fall within the tolerable range under a condition in which the electric motors 31R and 31L are driven so that the velocity Vw_x and Vw_y of the wheel assembly 5 in the x axis direction and the y axis direction match the center-of-gravity point velocity estimation values Vb_x_s and Vb_y_s, the gain adjusting parameters Kr_x and Kr_y are both set to zero.

Meanwhile, when the output values Vw_y_lim1 and Vw_y_lim1 of the limiting processor 86 is generated by imposing a compulsory limitation on the input values Vb_x_s and Vb_y_s, the values of the gain adjusting parameters Kr_x and Kr_y are determined according to the absolute values of the correction amount Vover_x and Vover_y. In other words, when either one of the rotational angular velocities of the electric motors 31R and 31L falls outside of the tolerable range (i.e., when the absolute value of either one of the rotational angular velocity becomes too high) under a condition in which the electric motors 31R and 31L are driven so that the velocity Vw_x and Vw_y of the wheel assembly 5 in the x axis direction and the y axis direction match the center-of-gravity point velocity estimation values Vb_x_s and Vb_y_s, the values of the gain adjusting parameters Kr_x and Kr_y are determined according to the absolute values of the correction amount Vover_x and Vover_y. In this case, Kr_x is determined so that the value of Kr_x increases as the absolute value of the corrected value Vx_over increases, with "1" being the upper limit. This characteristic applies to Kr_y as well.

Returning to the description regarding FIG. 9, the control unit 50 performs the procedure of the center-of-gravity point velocity restrictor 76 after performing the procedure of the center-of-gravity velocity calculator 72 and the required center-of-gravity point velocity generator 74 as described earlier.

The center-of-gravity point velocity restrictor 76 receives an input of the center-of-gravity point velocity estimation value Vb_xy_s (Vb_x_s and Vb_y_s) computed by the center-of-gravity velocity calculator 72 and the required center-of-gravity point velocity V_xy_aim (V_x_aim and V_y_aim) determined in the required center-of-gravity point velocity generator 74. The center-of-gravity point velocity restrictor 76 uses these input values, and carries out the procedure shown in the block diagram in FIG. 12, thereby determining the target center-of-gravity point velocity for control V_xy_mdfd (V_x_mdfd and V_y_mdfd).

In particular, the center-of-gravity point velocity restrictor 76 first executes the procedure of the steady-state error calculator 94__x and 94__y.

In this case, the steady-state error calculator 94__x receives an input of the center-of-gravity point velocity estimation value Vb_x_s in the x axis direction. At the same time, the steady-state error calculator 94__x receives an input of the previous value Vb_x_mdfd_p of the target center-of-gravity point velocity for control Vb_x_mdfd in the x axis direction via the delay element 96__x. In addition, the steady-state error calculator 94__x first inputs Vb_x_s to the proportional-differential compensation element (PD compensation element) 94a__x. This proportional-differential compensation element 94a__x is a compensation element such that the transfer function is expressed by 1+Kd·S. The proportional-differential compensation element 94a__x adds the inputted Vb_x_s along with a value obtained by multiplying a predetermined coefficient Kd with the differential (temporal rate of change) of Vb_x_s, and outputs sum obtained by the addition.

Next, the steady-state error calculator 94__x computes, via the calculator 94b__x, a value obtained by subtracting the inputted Vb_x_mdfd_p from the output value of the steady-state error calculator 94__x. Then, the steady-state error calculator 94__x inputs the output value of the calculator 94b__x to the low pass filter 94c__x comprising a phase compensation feature. This low pass filter 94c__x is a filter such that the transfer function is represented by (1+Tg2·S)/(1+Tg1·S). Furthermore, the steady-state error calculator 94__x outputs the output value Vb_x_prd of the low pass filter 94c__x.

Furthermore, the center-of-gravity point velocity estimation value Vb_y_s in the y axis direction is inputted to the steady-state error calculator 94__y. At the same time, the previous value Vb_y_mdfd_p of the target center-of-gravity point velocity for control Vb_y_mdfd in the y axis direction is inputted via the delay element 96__y.

Moreover, similar to the steady-state error calculator 94__x described above, the steady-state error calculator 94__y performs, in series, the processing of the proportional-differential compensation element 94a__y, the calculator 94b__y, and the low pass filter 94c__y. In this way, the steady-state error calculator 94__y outputs the output value Vb_y_prd of the low pass filter 94c__y.

Here, the output value Vb_x_prd of the steady-state error calculator 94__x refers to a steady state differential of the to-be-converged value of the future center-of-gravity point velocity estimation value in the x axis direction with respect to the target center-of-gravity point velocity for control Vb_x_mdfd, estimated by the current condition of the movement of the vehicle system center of gravity seen from the y axis direction (i.e., the condition of the movement of the mass point 60__x of the inverted pendulum model seen from the y axis direction). At the same time, the output value Vb_y_prd of the steady-state error calculator 94__y refers to a steady state differential of the to-be-converged value of the future center-of-gravity point velocity estimation value in the y axis direction with respect to the target center-of-gravity point velocity for control Vb_y_mdfd, estimated by the current condition of the movement of the vehicle system center of gravity seen from the x axis direction (i.e., the condition of the movement of the mass point 60__y of the inverted pendulum model seen from the x axis direction). Hereinafter, the output values Vb_x_prd and Vb_y_prd of the steady-state error calculators 94__x and 94__y are called the center-of-gravity point velocity steady state deviation estimation value.

The center-of-gravity point velocity limiting unit 76 performs the process of the steady-state error calculators 94__x and 94__y as described above. Then, the center-of-gravity point velocity limiting unit 76 performs a procedure adding the required center-of-gravity point velocity Vb_x_aim to the output value Vb_x_prd of the steady-state error calculator 94__x by the calculator 98__x. The center-of-gravity point velocity limiting unit 76 performs a procedure adding the required center-of-gravity point velocity Vb_y_aim to the output value Vb_y_prd of the steady-state error calculator 94__y by the calculator 98__y.

Therefore, the output value Vb_x_t of the calculator 98__x becomes a velocity obtained by adding the required center-of-gravity point velocity Vb_x_aim in the x axis direction to the center if gravity velocity steady state deviation estimation value Vb_x_prd in the x axis direction. Similarly, the output value Vb_y_t of the calculator 98__y becomes a velocity obtained by adding the required center-of-gravity point velocity Vb_y_aim in the y axis direction to the center if gravity velocity steady state deviation estimation value Vb_y_prd in the x axis direction.

Further, when the operation mode of the vehicle 1 is in an autonomous mode and the like, and the required center-of-gravity point velocity Vb_x_aim in the x axis direction is zero, the center-of-gravity point velocity steady state deviation estimation value Vb_x_prd in the x axis direction becomes the output value Vb_x_t of the calculator 98__x. Similarly, when the required center-of-gravity point velocity Vb_y_aim in the y axis direction becomes zero, the center-of-gravity point velocity steady state deviation estimation value Vb_y_prd in the y axis direction becomes the output value Vb_y_t of the calculator 98__y.

Next, the center-of-gravity point velocity restrictor 76 enters the output values Vb_x_t and Vb_y_t of the calculators 98__x and 98__y to the limiting processor 100. The procedure executed by the limiting processor 100 is the same as the procedure executed by the limiting processor 86 of the gain adjustor 78. In this case, as indicated by the parenthesized reference numerals shown in FIG. 11, only the input value and the output value of each processors of the limiting processor 100 differs from the limiting processor 86.

In particular, according to the limiting processor 100, the processors 86a__x and 86a__y each computes the rotational angular velocities ωw_x_t and ωw_y_t of the imaginary wheels 62__x and 62__y in a case in which the velocities Vw_x and Vw_y of the imaginary wheels 62__x and 62__y are matched with Vb_x_t and Vb_y_t. In addition, the pair of rotational angular velocities ωw_x_t and ωw_y_t are converted to a pair of rotational angular velocities ω_R_t and ω_L_t of the electric motors 31R and 31L by the XY-RL converter 86b.

Further, these rotational angular velocities ω_R_t and ω_L_t are respectively limited to a value within a tolerable range for the right motor and a value within a tolerable range for the left motor, due to the limiters 86c_R and 86c_L. Further, the values ω_R_lim2 and ω_L_lim2 obtained after this limitation process are converted to the rotational angular velocities ωw_x_lim2 and ωw_y_lim2 of the imaginary wheels 62_x and 62_y by the RL-XY converter 86d.

Next, the velocities Vw_x_lim2 and Vw_y_lim2 of each of the imaginary wheels 62_x and 62_y corresponding to each of the rotational angular velocities ωw_x_lim2 and ωw_y_lim2 are computed respectively by the processors 86e_x and 86e_y. These velocities Vw_x_lim2 and Vw_y_lim2 are outputted by the limiting processor 100.

Due to the procedure executed by the limiting processor 100, in a manner similar to the limiting processor 86, under the compulsory, necessary condition that each of the rotational angular velocities of the electric motors 31R and 31L corresponding to the pair of output values Vw_x_lim2 and Vw_y_lim2 is not outside of the tolerable range, the limiting processor 100 generates a pair of output values Vw_x_lim2 and Vw_y_lim2 so that each of the output values Vw_x_lim2 and Vw_y_lim2 is matched respectively with Vb_x_t and Vb_y_t to the extent possible under the above necessary condition.

Incidentally, each of the tolerable range for the right motor and the left motor regarding the limiting processor 100 need not be the same as each of the tolerable range for the right motor and the left motor regarding the limiting processor 86. Different tolerable ranges may be set for the limiting processors 86 and 100.

Figure 12:
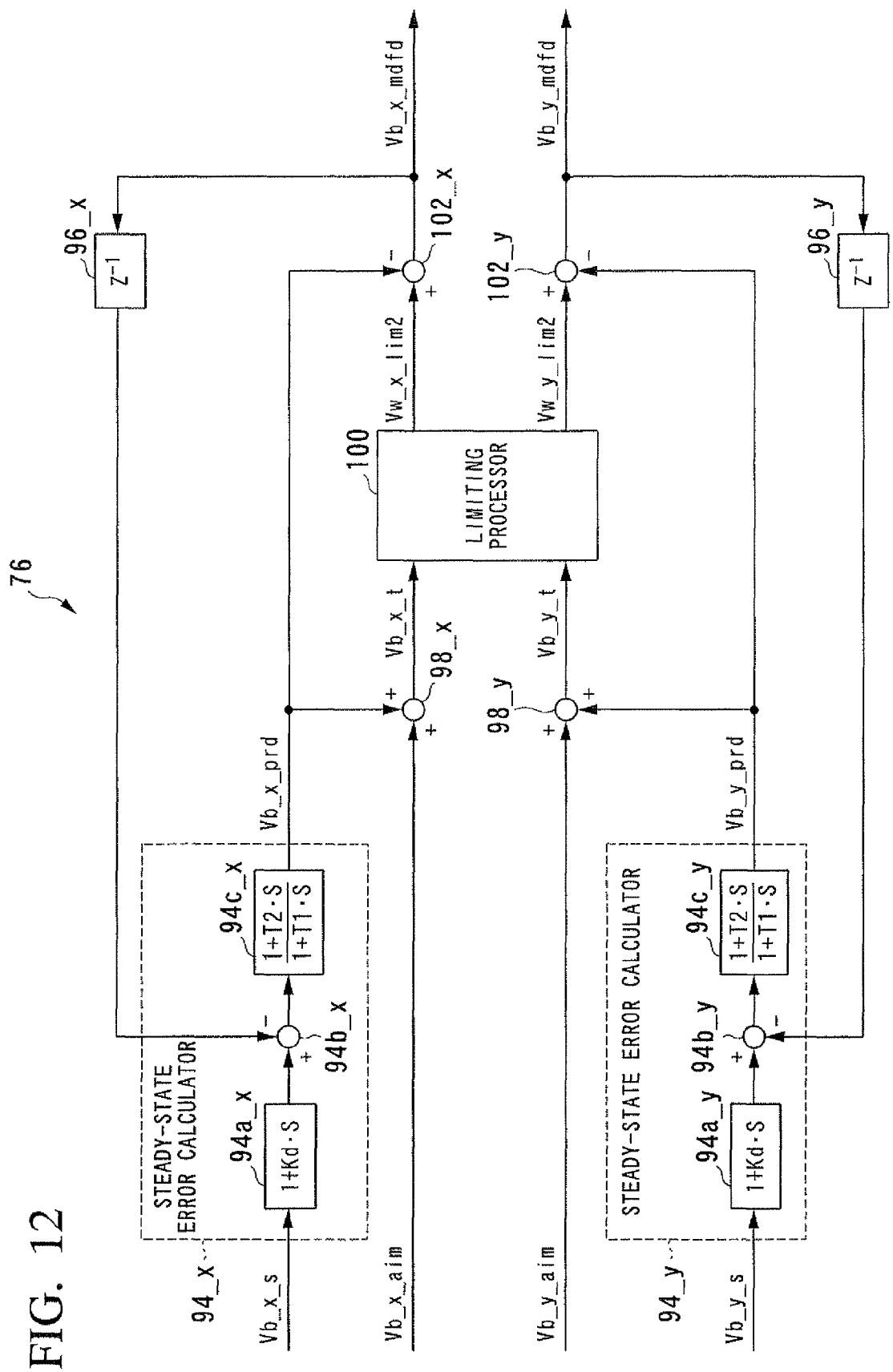
FIG. 12 is a block diagram showing a processing of a center-of-gravity point velocity restrictor 76 shown in FIG. 9.

Returning to the description of FIG. 12, the center-of-gravity point velocity restrictor 76 computes the target center-of-gravity point velocities for control Vb_x_mdfd and Vb_y_mdfd, by performing the procedure of the calculators 102_x and 102_y. In this case, the calculator 102_x computes the target center-of-gravity point velocity for control Vb_x_mdfd in the x axis direction as a value obtained by subtracting the center-of-gravity point velocity steady state deviation estimation value Vb_x_prd in the x axis direction from the output value Vw_x_lim2 of the limiting processor 100. Similarly, the calculator 102_y computes the target center-of-gravity point velocity for control Vb_y_mdfd in the y axis direction as a value obtained by subtracting the center-of-gravity point velocity steady state deviation estimation value Vb_y_prd in the y axis direction from the output value Vw_y_lim2 of the limiting processor 100.

When a compulsory limitation is not imposed on the output values V_x_lim2 and V_y_lim2 by the limiting processor 100, the target center-of-gravity point velocity for control Vb_x_mdfd and Vb_y_mdfd determined as described above is set to be equal to the required center-of-gravity point velocity Vb_x_aim and Vb_y_aim. In other words, when the rotational angular velocity of each of the electric motors 31R and 31L fall within the tolerable range under a condition in which the electric motors 31R and 31L are driven so that the velocity of the wheel assembly 5 in the x axis direction and the y axis direction matches the output value Vb_x_t of the calculator 98_x and the output value Vb_y_t of the calculator 98_y, the target center-of-gravity point velocity for control Vb_x_mdfd and Vb_y_mdfd is set to be equal to the required center-of-gravity point velocity Vb_x_aim and Vb_y_aim.

Incidentally, in this case, when the required center-of-gravity point velocity Vb_x_aim in the x axis direction equals zero, the target center-of-gravity point velocity for control Vb_x_mdfd in the x axis direction also equals zero as well. Further, when the required center-of-gravity point velocity Vb_y_aim in the y axis direction equals zero, the target center-of-gravity point velocity for control Vb_y_mdfd in the y axis direction also equals zero as well.

Meanwhile, when the output values Vw_x_lim2 and Vw_y_lim2 of the limiting processor 100 is generated by imposing a compulsory limitation on the input values Vb_x_t and Vb_y_t, the target center-of-gravity point velocity for control Vb_x_mdfd in the x axis direction is determined to be a value obtained by correcting the required center-of-gravity point velocity Vb_x_aim by a correction amount of the output value Vw_x_lim2 of the limiting processor 100 with respect to the input value Vb_x_t (=Vw_x_lim2−Vb_x_t). Thus, the value is obtained by adding the correction amount to Vb_x_aim. In other words, when either one of the rotational angular velocities of the electric motors 31R and 31L falls outside of the tolerable range (i.e., when the absolute value of either one of the rotational angular velocity becomes too high) under a condition in which the electric motors 31R and 31L are driven so that the velocity of the wheel assembly 5 in the x axis direction and the y axis direction matches the output value Vb_x_t of the calculator 98_x and the output value Vb_y_t of the calculator 98_y, the target center-of-gravity point velocity for control Vb_x_mdfd in the x axis direction is determined to be a value obtained by correcting the required center-of-gravity point velocity Vb_x_aim by the correction amount described above.

Further, regarding the y axis direction, the target center-of-gravity point velocity for control Vb_y_mdfd in the y axis direction is determined to be a value obtained by correcting the required center-of-gravity point velocity Vb_y_aim by a correction amount of the output value Vw_y_lim2 of the limiting processor 100 with respect to the input value Vb_y_t (=Vw_y_lim2−Vb_y_t). Thus, the value is obtained by adding the correction amount to Vb_y_aim.

In this case, regarding the velocity in the x axis direction for example, when the required center-of-gravity point velocity Vb_x_aim is not zero, the target center-of-gravity point velocity for control Vb_x_mdfd either approaches zero to a greater extent compared to the required center-of-gravity point velocity Vb_x_aim, or becomes a velocity facing the opposite direction with respect to the required center-of-gravity point velocity Vb_x_aim. Further, when the required center-of-gravity point velocity Vb_x_aim equals zero, the target center-of-gravity point velocity for control Vb_x_mdfd becomes a velocity facing the opposite direction with respect to the center-of-gravity point velocity steady state deviation estimation value Vb_x_prd in the x axis direction outputted by the steady-state error calculator 94_x. These characteristics apply to the velocity in the y axis direction.

The center-of-gravity point velocity limiting unit 76 executes the procedure as described above.

Returning to the description regarding FIG. 9, the control unit 50 performs the procedure of the posture control calculator 80 after performing the procedure of the center-of-gravity velocity calculator 72, the center-of-gravity point velocity restrictor 76, the gain adjustor 78, and the error calculator 70 as described earlier.

The procedure of the posture control calculator 80 is described below with reference to FIG. 13. Incidentally, in FIG. 13, the reference numeral without a parenthesis relates to a procedure determining the imaginary wheel rotational angular velocity command ωw_x_cmd, which is a target value of the rotational angular velocity of the imaginary wheel 62_x rolling in the x axis direction. The parenthesized reference numeral relates to a procedure determining the imaginary wheel rotational angular velocity command ωw_y_cmd, which is a target value of a rotational angular velocity of the imaginary wheel 62_y rolling in the y axis direction.

The posture control calculator 80 receives an input of the base body tilt angle deviation observed value θbe_xy_s computed by the deviation calculator 70, the base body tilting angular velocity observed value θbdot_xy_s computed in step S2, a center-of-gravity point velocity estimation value Vb_xy_s computed by the center-of-gravity velocity calculator 72, the target center-of-gravity point velocity Vb_xy_cmd computed by the center-of-gravity point velocity restrictor 76, and the gain adjusting parameter Kr_xy computed by the gain adjustor 78.

The posture control calculator 80 first uses these input values to compute the imaginary wheel rotational angular acceleration command ωwdot_xy_cmd based on the following equations 07x and 07y.

$$\omega\text{wdot}\_x\_cmd = K1\_x \cdot \theta be\_x\_s + K2\_x \cdot \theta bdot\_x\_s + K3\_x \cdot (Vb\_x\_s - Vb\_x\_mdfd) \quad \text{(equation 07x)}$$

$$\omega\text{wdot}\_y\_cmd = K1\_y \cdot \theta be\_y\_s + K2\_y \cdot \theta bdot\_y\_s + K3\_y \cdot (Vb\_y\_s - Vb\_i\_mdfd) \quad \text{(equation 07y)}$$

Therefore, the imaginary wheel rotational angular acceleration command ωwdot_x_cmd and the imaginary wheel rotational angular acceleration command ωwdot_y_cmd are both determined by adding up three elements of an operational amount (the three terms in the right side of the equations 07x and 07y). The imaginary wheel rotational angular acceleration command ωwdot_x_cmd is an operational amount (control input) for controlling the movement of the mass point 60_x of the inverted pendulum type model seen from the y axis direction (i.e., the movement of the vehicle system center of gravity seen from the y axis direction). The imaginary wheel rotational angular acceleration command ωwdot_y_cmd is an operational amount (control input) for controlling the movement of the mass point 60_y of the inverted pendulum type model seen from the x axis direction (i.e., the movement of the vehicle system center of gravity seen from the x axis direction).

In this case, the gain coefficients K1_x, K2_x, and K3_x relating to each element of the manipulated variable in the equation 07x is set variably according to the gain adjustment parameter Kr_x. The gain coefficients K1_y, K2_y, and K3_y relating to each element of the manipulated variable in equation 07y are set variably according to the gain adjustment parameter Kr_y. Hereinafter, each of the gain coefficients K1_x, K2_x, and K3_x in equation 07x may be referred to as the first gain coefficient K1_x, the second gain coefficient K2_x, and the third gain coefficient K3_x. This characteristic applies to the gain coefficients K1_y, K2_y, and K3_y in equation 07y as well.

Figure 13:
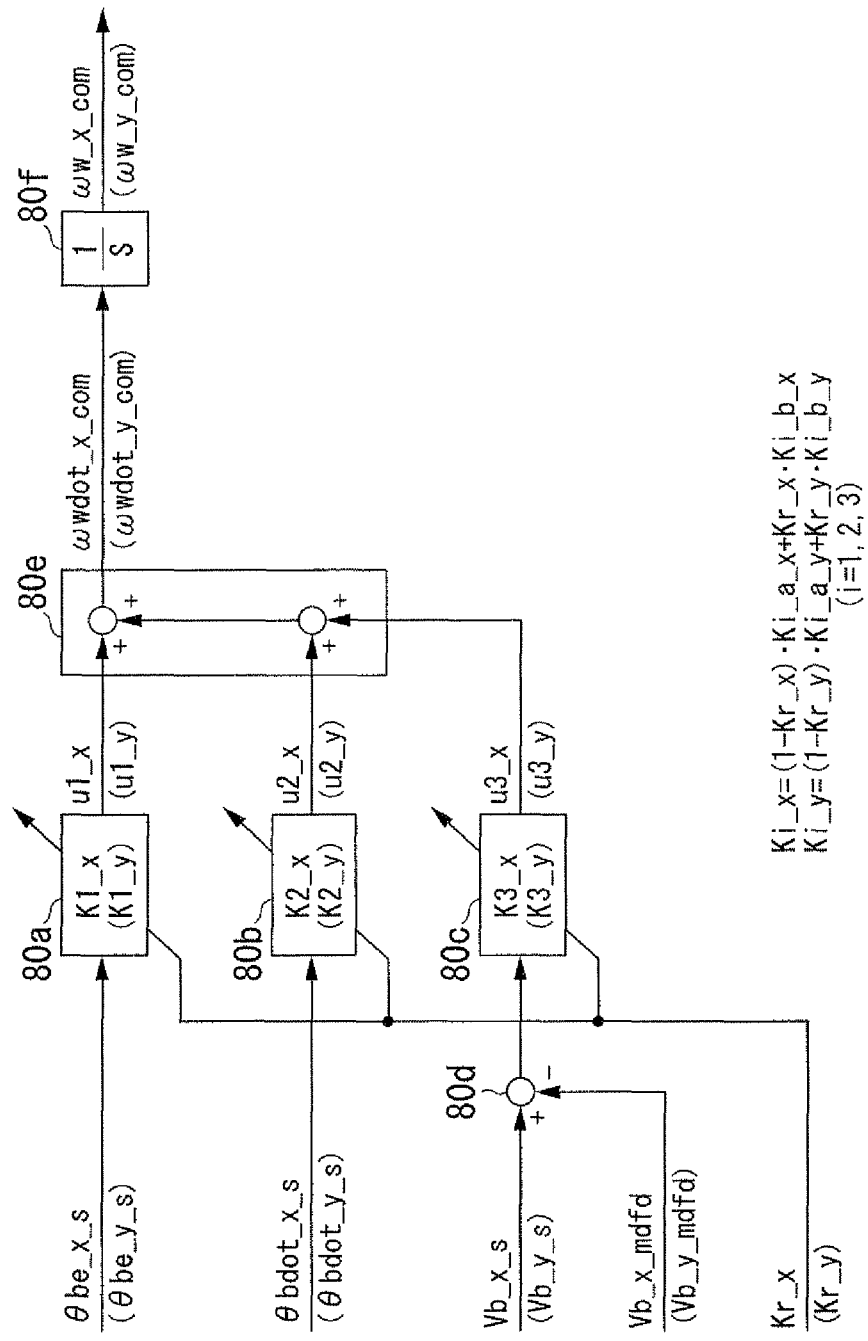
FIG. 13 is a block diagram showing a processing of a posture control calculator 80 shown in FIG. 9.

The i-th gain coefficient Ki_x (i=1, 2, 3) in equation 07x and the i-th gain coefficient Ki_y (i=1, 2, 3) in equation 07y are determined, as indicated in the comments shown in FIG. 13, according to the gain adjustment parameters Kr_x and Kr_y based on the following equations 09x and 09y.

$$Ki\_x = (1 - Kr\_x) \cdot Ki\_a\_x + Kr\_x \cdot Ki\_b\_x \quad \text{(equation 09x)}$$

$$Ki\_y = (1 - Kr\_y) \cdot Ki\_a\_y + Kr\_y \cdot Ki\_b\_y \quad \text{(equation 09y)}$$

(i=1, 2, 3)

Here, Ki_a_x and Ki_b_x in equation 09x are constant values predetermined as a gain coefficient value at the side of the minimum value of the i-th gain coefficient Ki_x (closer to the "0" side) and a gain coefficient value at the side of the maximum value of the i-th gain coefficient Ki_x (toward the side moving away from "0"). This characteristic applies to Ki_a_y and Ki_b_y in equation 09y.

Therefore, each of the i-th gain coefficient Ki_x (i=1, 2, 3) used in the equation 07x is determined as a weighted average of the constants Ki_a_x and Ki_b_x corresponding to each of the i-th gain coefficient Ki_x. Further, in this case, the weight on each of Ki_a_x and Ki_b_x is varied according to the gain adjustment parameter Kr_x. Therefore, in the case of Kr_x=0, Ki_x becomes equal to Ki_a_x. In the case of Kr_x=1, Ki_x becomes equal to Ki_b_x. Further, as Kr_x becomes closer to "1" from "0," the i-th gain coefficient Ki_x becomes closer to Ki_b_x from Ki_a_x.

Similarly, each of the i-th gain coefficient Ki_y (i=1, 2, 3) used in the equation 07y is determined as a weighted average of the constants Ki_a_y and Ki_b_y corresponding to each of the i-th gain coefficient Ki_y. Further, in this case, the weight on each of Ki_a_y and Ki_b_y is varied according to the gain adjustment parameter Kr_y. Therefore, in a case similar to Ki_x, as the value of Kr_y varies between "0" and "1," the value of the i-th gain coefficient Ki_y varies between Ki_a_y and Ki_b_y.

To supplement, the constant values Ki_a_x, Ki_b_x, Ki_a_y, and Ki_b_y (i=1, 2, 3) are included in the constant parameters whose values are determined in step S6 or S8.

The posture control calculator 80 performs the computation in the equation 07x using the first to third gain coefficients K1_x, K2_x, and K3_x determined as described above. In this way, the posture control calculator 80 computes the imaginary wheel rotational angular acceleration command ωwdot_x_cmd relating to the imaginary wheel 62_x rotating in the x axis direction.

In further detail, in reference to FIG. 13, the posture control calculator 80 computes the manipulated variable component u1_x and the manipulated variable component u2_x respectively in the processors 80a and 80b. The manipulated variable component u1_x is obtained by multiplying the first gain coefficient K1_x with the base body tilt angle deviation observed value θbe_x_s. The manipulated variable component u2_x is obtained by multiplying the base body tilting angular velocity observed value θbdot_x_s with the second gain coefficient K2_x. Furthermore, the posture control calculator 80 computes the deviation between the center-of-gravity point velocity estimation value Vb_x_s and the target center-of-gravity point velocity for control Vb_x_mdfd (=Vb_x_s−Vb_x_mdfd) at the calculator 80d. The posture control calculator 80 then computes the manipulated variable element u3_x at the processor 80c obtained by multiplying the deviation with the third gain coefficient K3_x. Further, the posture control calculator 80 computes the imaginary wheel rotational angular acceleration command ωwdot_x_cmd by adding up these manipulated variable components u1_x, u2_x, and u3_x at the calculator 80e.

Similarly, the posture control calculator 80 performs the computation of the equation 07y by using the first to third gain coefficients K1_y, K2_y, and K3_y determined as described above. In this way, the posture control calculator 80 computes the imaginary wheel rotational angular acceleration command ωwdot_y_cmd concerning the imaginary wheel 62_y rolling in the y axis direction.

In this case, the posture control calculator 80 computes the manipulated variable component u1_y and the manipulated variable component u2_y respectively in the processors 80a and 80b. The manipulated variable component u1_y is obtained by multiplying the first gain coefficient K1_y with the base body tilt angle deviation observed value θbe_y_s. The manipulated variable component u2_y is obtained by multiplying the base body tilting angular velocity observed value θbdot_y_s with the second gain coefficient K2_y. Furthermore, the posture control calculator 80 computes the deviation between the center-of-gravity point velocity estimation value Vb_y_s and the target center-of-gravity point velocity for control Vb_y_mdfd (=Vb_y_s−Vb_y_mdfd) at the calculator 80d. The posture control calculator 80 then computes the manipulated variable element u3_y at the processor 80c obtained by multiplying the deviation with the third gain coefficient K3_y. Further, the posture control calculator 80 computes the imaginary wheel rotational angular acceleration command ωwdot_x_cmd by adding up these manipulated variable components u1_y, u2_y, and u3_y at the calculator 80e.

Here, the first element (=the first manipulated variable component u1_x) and the second element (=the second manipulated variable component u2_x) of the right side of the equation 07x is a feedback manipulated variable element for converging the base body tilting angular deviation observed value θbe_x_s around the y axis direction to zero according to the PD law (proportional-differential law), being the feedback control law. In other words, the base body tilt angle observed value θb_x_s is converged to the target value θb_x_obj.

Further, the third element (=the third manipulated variable component u3_x) of the right side of the equation 07x is a feedback manipulated variable element for converging the deviation between the center-of-gravity point velocity estimation value Vb_x_s and the target center-of-gravity point velocity Vb_x_mdfd to zero according to the proportionality law being the feedback control law. In other words, Vb_x_s is converged to Vb_x_mdfd.

These characteristics apply to the first to third elements (the first to third manipulated variable components u1_y, u2_y, and u3_y) of the right side of the equation 07y as well.

As described above, the posture control calculator 80 computes the imaginary wheel rotational velocity commands ωw_x_cmd and ωw_y_cmd by first computing the imaginary wheel rotational angular acceleration commands ωwdot_x_cmd and ωwdot_y_cmd, then integrating ωwdot_x_cmd and ωwdot_y_cmd by the integrator 80f.

Above is a detailed description of the processing by the posture control calculator 80.

In particular, the imaginary wheel rotational angular acceleration command ωwdot_x_cmd may be computed based on an equation obtained by separating the third element of the right side of the equation 07x to the manipulated variable component according to Vb_x_s (=K3_x·Vb_x_s) and the manipulated variable component according to Vb_x_mdfd (=−K3_x·Vb_x_mdfd). Similarly, the imaginary wheel rotational angular acceleration command ωwdot_x_cmd may be computed by the equation obtained by separating the third element of the right side of the equation 07x to the manipulated variable component according to Vb_y_s (=K3_y·Vb_y_s) and the manipulated variable component according to Vb_y_mdfd (=−K3_y·Vb_y_mdfd).

Further, according to the inverted pendulum type vehicle 1, the rotational angular acceleration commands ωw_x_cmd and ωw_y_cmd of the imaginary wheel 62_x and 62_y was used as the operational amount (control input) for controlling the behavior of the vehicle system center of gravity. However, it is possible to use the driving torque of the imaginary wheels 62_x and 62_y or a translational force obtained by multiplying the driving torque with the radius Rw_x and Rw_y of the imaginary wheels 62_x and 62_y. Here, the translational force is the frictional force between the floor surface and the imaginary wheels 62_x and 62_y.

Returning to the description of FIG. 9, the control unit 50 next inputs the imaginary wheel rotational velocity commands ωw_x_cmd and ωw_y_cmd, determined at the posture control calculator 80 as described above, into the motor command calculator 82, and then executes the processing of this motor command calculator 82. In this way, the velocity command ω_R_cmd of the electric motor 31R and the velocity command ω_L_cmd of the electric motor 31L are determined The processing of this motor command calculator 82 is the same as the processing of the XY-RL converter 86b of the limiting processor 86 (see FIG. 11).

In particular, the motor command calculator 82 determines the velocity commands ω_R_cmd and ω_L_cmd of the electric motors 31R and 31L by solving the simultaneous equation of the unknowns ω_R_cmd and ω_L_cmd obtained by replacing the variables ωw_x, ωw_y, ω_R, and ω_L in the equations 01a and 01b into ωw_x_cmd, w_y_cmd, ω_R_cmd, and ω_L_cmd.

In this way, the computational processing for controlling the vehicle in step S9 is completed.

By executing the control computational process by the control unit 50 as described above, the imaginary wheel rotational angular acceleration command ωwdot_xy_cmd is determined as the operational amount (control input), so that, in both the boarding mode and the autonomous mode, the posture of the base body 9 is generally maintained so that both of the base body tilt angle deviation observed value θbe_x_s and Θbe_y_s are equal to zero (this posture is hereinafter referred to as the basic posture). In other words, ωwdot_xy_cmd is maintained so that the position of the vehicle system center of gravity (the vehicle/occupant integrated center-of-gravity point or the singular vehicle body center-of-gravity point) is placed approximately right above the surface at which the wheel assembly 5 contacts the ground surface. In more detail, the imaginary wheel rotational angular acceleration command ωwdot_xy_cmd is determined so that the posture of the base body 9 is maintained at the basic posture while the center-of-gravity point velocity estimation value Vb_xy_s as the velocity of the vehicle system center of gravity is converged to the target center-of-gravity point velocity for control Vb_xy_mdfd. Incidentally, the target center-of-gravity point velocity for control Vb_xy_mdfd is normally zero (as long as the occupant, etc. does not apply an additional impellent force on the vehicle 1 in the boarding mode). In this case, the imaginary wheel rotational angular acceleration command ωwdot_xy_cmd is determined so that the posture of the base body 9 is maintained at the basic posture, and that the vehicle system center of gravity is generally static.

Further, the rotational angular velocity of the electric motors 31R and 31L, obtained by converting the imaginary wheel rotational angular velocity command ωw_xy_cmd obtained by integrating each element of ωwdot_xy_cmd, is determined as the velocity commands ω_R_cmd and ω_L_cmd of the electric motors 31R and 31L. Further, according to this velocity commands ω_R_cmd and ω_L_cmd, the rotational velocity of each of the electric motors 31R and 31L is controlled. Furthermore, the velocity of the wheel assembly 5 in the x axis direction and the y axis direction is controlled so as to match respectively the moving velocity of the imaginary wheel 62_x corresponding to ωw_x_cmd, and the moving velocity of the imaginary wheel 62_y corresponding to ωw_y_cmd.

Therefore, for example, around the y axis direction, when the actual base tilt angle θb_x deviates so as to tilt forward with respect to the target value θb_x_obj, the wheel assembly 5 moves forward so as to cancel out the deviation (i.e., so as to converge θbe_y_s to zero). Similarly, when the actual θb_x deviates so as to tilt backward with respect to the target value θb_x_obj, the wheel assembly 5 moves backward so as to cancel out the deviation (i.e., so as to converge θbe_y_s to zero).

In addition, for example, around the x axis direction, when the actual base body tilt angle θb_y deviates so as to tilt toward the right with respect to the target value θb_y_obj, the wheel assembly 5 moves toward the right so as to cancel out the deviation (i.e., so as to converge θbe_y_s to zero). Similarly, when the actual θb_y deviates so as to tilt toward the left with respect to the target value θb_y_obj, the wheel assembly 5 moves toward the left so as to cancel out the deviation (i.e., so as to converge θbe_y_s to zero).

Further, when both of the base body tilt angles θb_x and θb_y deviates respectively from the target values θb_x_obj and θby_obj, the movement of the wheel assembly 5 in the front and back directions for canceling out the deviation in θb_x and the movement of the wheel assembly 5 in the left and right directions for cancelling out the deviation in θb_y are combined. The wheel assembly 5 moves in the synthetic direction of the x axis direction and the y axis direction. This synthetic direction refers to a direction tilting with respect to both the x axis direction and the y axis direction.

In this way, when the base body 9 tilts with respect to the base body, the wheel assembly 5 moves in a direction towards which the base body 9 is tilting. Therefore, when, in a boarding mode for example, the occupant tilts his or her upper body intentionally, the wheel assembly 5 moves in a direction in which the tilting occurs.

Incidentally, when the target center-of-gravity point velocity for control Vb_x_mdfd and Vb_y_mdfd equals zero, and when the posture of the base body 9 converges to the basic posture, the movement of the wheel assembly 5 also halts. In addition, for example, when the tilt angle θb_x of the base body 9 in a direction around the y axis is maintained at a constant angle tilting from the basic posture, the velocity of the wheel assembly 5 in the x axis direction converges to the constant velocity corresponding to the angle. This velocity comprises a certain steady state deviation with respect to the target center-of-gravity point velocity for control Vb_x_mdfd. This characteristic applies when the tilt angle θb_y of the base body 9 around the x axis direction is maintained at a certain angle tilting from the basic posture.

In addition, for instance, when both of the required center-of-gravity point velocities Vb_x_aim and Vb_y_aim generated by the required center-of-gravity point velocity generator 74 are zero, when the amount of tilting of the base body 9 from the basic posture 9 (the base body tilt angle deviation observed value θbe_x_s and θbe_y_s) becomes relatively large, and when one or both velocities of the wheel assembly 5 in the x axis direction or the y axis direction necessary to cancel out the tilting or to maintain that amount of tilting (these velocities respectively correspond to the center-of-gravity point velocity steady state deviation estimation value Vb_x_prd and Vb_y_prd shown in FIG. 12) becomes too large so that one or both of the rotational angular velocities of the electric motors 31R, 31L will exceed the tolerable range, a velocity (in particular, Vw_x_lim2−Vb_x_prd and Vw_y_lim2−Vb_y_prd) in a direction opposite to the velocity of the wheel assembly 5 will be determined as a target center-of-gravity point velocity for control Vb_x_mdfd and Vb_y_mdfd. Furthermore, the manipulated variable components u3_x and u3_y amount the manipulated variable components comprised in the control input are determined so that the center-of-gravity point velocity estimation value Vb_x_s and Vb_y_s are respectively converged to the target center-of-gravity point velocity for control Vb_x_mdfd and Vb_y_mdfd. As a result, the base body 9 is prevented from tilting too far from the basic posture. In addition, one or both of the rotational angular velocities of the electric motors 31R, 31L is prevented from being too large.

In addition, at the gain adjustor 78, when one or both of the center-of-gravity point velocity estimation value Vb_x_s and Vb_y_s becomes large, and when one or both velocities of the wheel assembly 5 in the x axis direction and the y axis direction necessary to cancel out the tilting of the base body 9 from the basic posture or to maintain that amount of tilting becomes too large so that one or both of the rotational angular velocities of the electric motors 31R, 31L will exceed the tolerable range, one or both of the gain adjustment parameter Kr_x and Kr_y comes closer to 1 from 0 as the amount of the rotational angular velocity exceeding the tolerable range becomes strikingly large (in particular, as the absolute value of the Vover_x and Vover_y shown in FIG. 10 becomes large).

In this case, each of the i-th gain coefficient Ki_x (i=1, 2, 3) computed by the equation 09x becomes closer to the constant Ki_b_x at the maximum side from the constant Ki_a_x at the minimum side, as Kr_x approaches 1. This characteristic applies to each of the i-th gain coefficients Ki_y (i=1, 2, 3) computed by the equation 09y.

Further, because the absolute value of the gain coefficient becomes large, the sensitivity of the manipulated variable (the imaginary wheel rotational angular acceleration commands ωwdot_x_cmd and ωwdot_y_cmd) with respect to the change in the tilting of the base body 9 becomes high. Therefore, when the amount of tilting from the basic posture of the base body 9 becomes large, the velocity of the wheel assembly 5 will be controlled in order to swiftly resolve the large tilting. Therefore, the large tilting of the base body 9 from the basic posture is strongly restrained. Further, one or both of the velocities of the wheel assembly 5 in the x axis direction or the y axis direction is prevented from becoming too large so as to make one or both of the rotational angular velocities of the electric motors 31R, 31L deviate from the tolerant range.

Further, in the boarding mode, when the required center-of-gravity point velocity generator 74 generates a required center-of-gravity point velocity Vb_x_aim, Vb_y_aim (a required center-of-gravity point velocity such that one or both of the gravity velocities Vb_x_aim and Vb_y_aim is not "0") according to a request based on the driving operation of the occupant, the required center-of-gravity point velocities Vb_x_aim, Vb_y_aim are determined respectively as the target center-of-gravity point velocity for control Vb_x_mdfd and Vb_y_mdfd, as long as one or both of the rotational angular velocities of the electric motors 31R, 31L does not become a large rotational angular velocity so as to exceed the tolerant range (in particular, as long as Vw_x_lim2 and Vw_y_lim2 indicated in FIG. 12 respectively matches Vb_x_t and Vb_y_t). Therefore, the velocity of the wheel assembly 5 is controlled so as to attain the required center-of-gravity point velocity Vb_x_aim and Vb_y_aim (i.e., so that the actual center-of-gravity point velocity approaches the required center-of-gravity point velocities Vb_x_aim and Vb_y_aim).

Next, the processing by the required center-of-gravity point velocity generator 74 is described, which was mentioned briefly earlier.

According to the present embodiment, the required center-of-gravity point velocity generator 74 sets the required center-of-gravity point velocity Vb_x_aim and Vb_y_aim to zero as described above.

Meanwhile, when the operation mode of the vehicle 1 is in a boarding mode, the required center-of-gravity point velocity generator 74 determines the required center-of-gravity point velocity Vb_x_aim and Vb_y_aim, according to the driving operation of the vehicle 1 by the occupant and the like (i.e., an operation applying an impellent force to the vehicle 1), which is estimated to be necessary by the driving operation.

Here, for example, when the vehicle 1 is starting, and when the occupant of vehicle 1 tries to actively increase the velocity of the vehicle 1 (the velocity of the vehicle system center of gravity), an impellent force is provided by the occupant kicking the floor with his or her foot in order to increase the velocity at which the vehicle 1 moves. This impellent force is due to the frictional force between the back side of the occupant's foot and the floor. Alternatively, for example, according to the request by the occupant of vehicle 1, an outside supporter and the like may add an impellent force to the vehicle 1 in order to increase the velocity of the vehicle 1.

In this case, the required center-of-gravity point velocity generator 74 determines whether or not a request for an acceleration has been made as a request to increase the velocity of vehicle 1 based on the temporal rate of change of the magnitude (absolute value) of the actual velocity vector of the vehicle system center of gravity (hereinafter referred to as the center-of-gravity point velocity vector ↑Vb). Accordingly, the required center-of-gravity point velocity generator 74 sequentially determines the required center-of-gravity point velocity vector ↑Vb_aim as a target value of ↑Vb. Here, the required center-of-gravity point velocity vector ↑Vb_aim is a velocity vector having two elements of the required center-of-gravity point velocity Vb_x_aim and Vb_y_aim.

Describing the procedure in general terms, when the request for acceleration occurs, the required center-of-gravity point velocity vector ↑Vb_aim is determined so as to increase the magnitude of the required center-of-gravity point velocity vector ↑Vb_aim until the acceleration request is met. Further, when the acceleration request is met, the required center-of-gravity point velocity vector ↑Vb_aim is determined so that the magnitude of the required center-of-gravity point velocity vector ↑Vb_aim is reduced in series. In this case, according to the present embodiment, the magnitude of the required center-of-gravity point velocity vector ↑Vb_aim is basically held constant for a predetermined amount of time after the request for acceleration is met. Then, the magnitude of the required center-of-gravity point velocity vector ↑Vb_aim is thereafter diminished continuously to zero. Incidentally, during this diminishing phase, the direction of the required center-of-gravity point velocity vector ↑Vb_aim approaches the x axis direction where appropriate.

The required center-of-gravity point velocity generator 74, performing the procedures described above, is described in detail below with reference to the flow chart FIG. 14-20.

Figure 14:
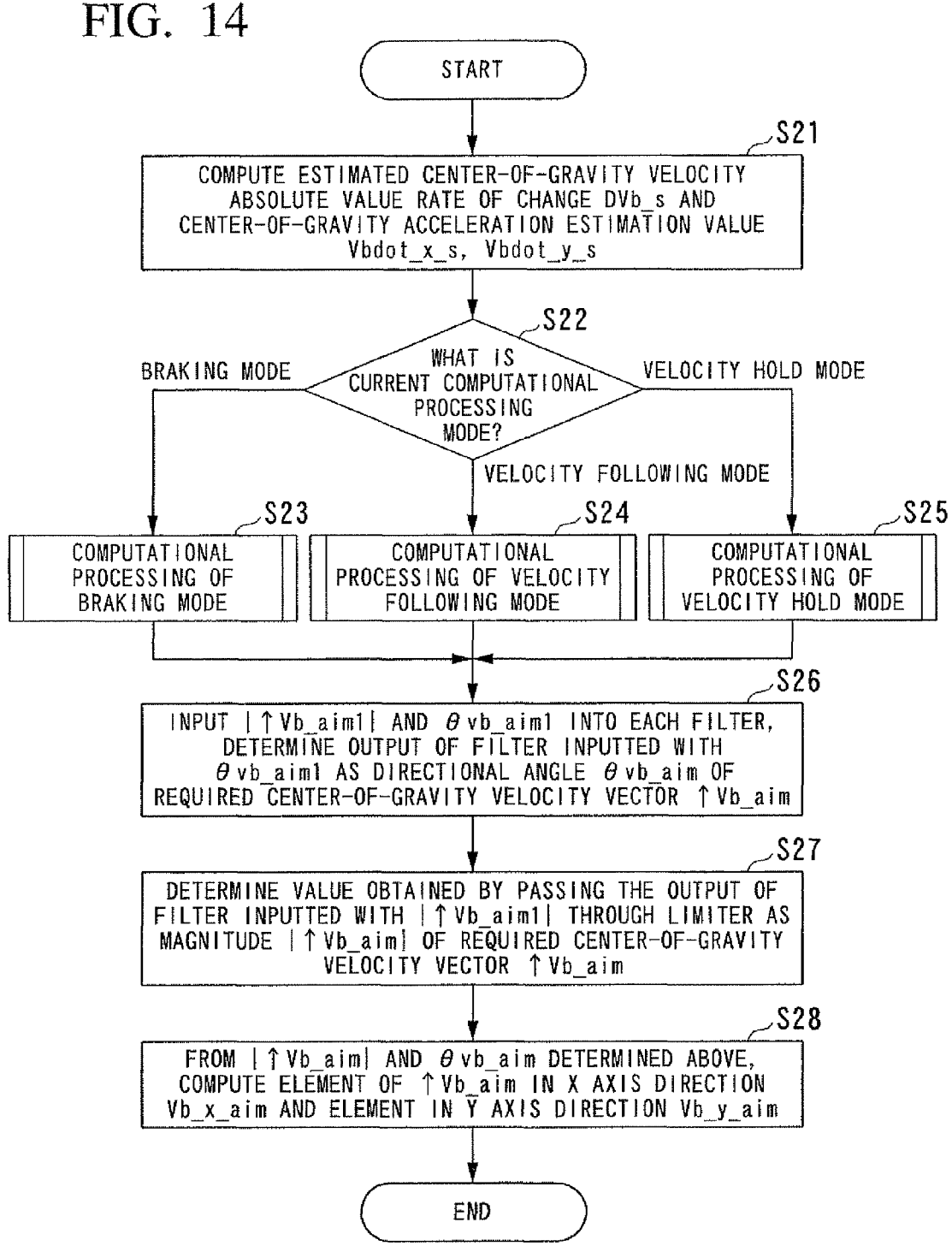
FIG. 14 is a flowchart showing a processing of a required center-of-gravity point velocity generator 74 shown in FIG. 9.

Referring to FIG. 14, the required center-of-gravity point velocity generator 74 first executes the procedure in step S21. According to this procedure, the required center-of-gravity point velocity generator 74 computes a temporal rate of change (differential value) DVb_s of the magnitude |↑Vb_s| $(=\mathrm{sqrt}(Vb\_x\_s^2+Vb\_y\_s^2))$ of the estimated center-of-gravity point velocity vector ↑Vb_s, which is a velocity vector having the inputted center-of-gravity point velocity estimation values Vb_x_s and Vb_y_s as two components (the observed value of the actual center-of-gravity point velocity vector ↑Vb). This DVb_s refers to the observed value of the temporal rate of change of the magnitude of the actual center-of-gravity point velocity vector ↑Vb (estimation value). Hereafter, DVb_s is referred to as the estimated center-of-gravity point velocity absolute value rate of change DVb_s. Incidentally, the notation sqrt( ) refers to a square root function.

Further, in step S21, the required center-of-gravity point velocity generator 74 computes a center-of-gravity point acceleration estimation value Vbdot_x_s and Vvdot_y_s, which is a temporal rate of change (differential value) of each of the center-of-gravity point velocity estimation values Vb_x_s and Vb_y_s which is inputted. Incidentally, the vector comprising the two elements Vbdot_x_s and Vbdot_y_s refers to an actual observed value of the acceleration vector of the center-of-gravity point of the vehicle system.

Next, moving on to step S22, the required center-of-gravity point velocity generator 74 determines which mode the current computational processing mode is for computing the required center-of-gravity point velocity Vb_x_aim.

Here, according to the present embodiment, the required center-of-gravity point velocity generator 74 determines the required center-of-gravity point velocity vector ↑Vb_aim, after determining the base value of the required center-of-gravity point velocity vector ↑Vb_aim (hereinafter may be referred to as the base body required center-of-gravity point velocity vector ↑Vb_aim1), so that the required center-of-gravity point velocity vector ↑Vb_aim follows the base required center-of-gravity point velocity vector ↑Vb_aim1 (i.e., so that the required center-of-gravity point velocity vector ↑Vb_aim steadily matches with the base required center-of-gravity point velocity vector ↑Vb_aim1).

The computation processing mode represents a type of procedure for determining the base required center-of-gravity point velocity vector ↑Vb_aim1. Further, according to the present embodiment, the computational processing mode includes three kinds of modes: the braking mode, the velocity following mode, and the velocity hold mode.

The braking mode is a mode such that the magnitude of the base required center-of-gravity point velocity vector ↑Vb_aim1 is diminished to "0," or the ↑Vb_aim1 is determined so as to keep the magnitude to zero. Further, the velocity following mode is a mode such that the base required center-of-gravity point velocity vector ↑Vb_aim1 is determined to follow the estimated center-of-gravity point velocity vector ↑Vb_s. Further, the velocity hold mode is a mode such that ↑Vb_aim1 is determined so as to keep the magnitude of the base required center-of-gravity point velocity vector ↑Vb_aim1.

Incidentally, the computational processing mode (initial computational processing mode) when the control unit 50 is initialized during a start up of the control unit 50 is the braking mode.

In the step S22 above, the required center-of-gravity point velocity generator 74 next performs the computational processing of step S23, the computational processing of step S24, and the computational processing of step S25 in respectively the cases in which the current computational processing mode is a braking mode, velocity following mode, and a velocity hold mode. In this way, the required center-of-gravity point velocity generator 74 determines the base required center-of-gravity point velocity vector ↑Vb_aim1.

The computational process corresponding to each mode is executed as follows.

Figure 15:
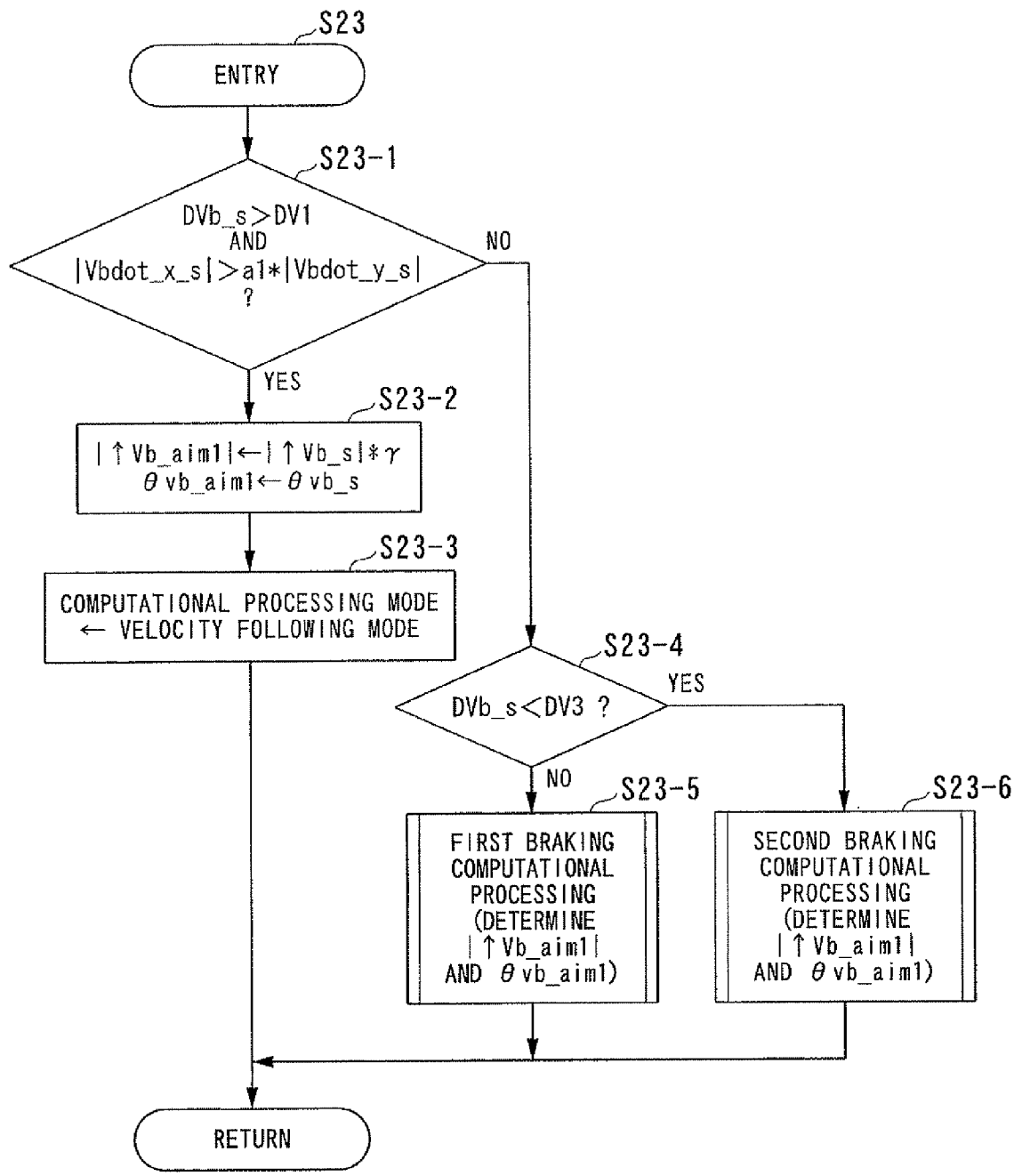
FIG. 15 is a flowchart showing a subroutine of a processing in step S23 shown in FIG. 14.

The computational process of the braking mode in the step S23 is executed as indicated in the flowchart of FIG. 15. In particular, regarding the center-of-gravity point acceleration estimation value Vbdot_x_s, Vbdot_y_s and the estimated center-of-gravity point velocity absolute value rate of change DVb_s computed in the step S21, the required center-of-gravity point velocity generator 74 first determines in the step 23-1 whether or not the conditions DVb_s>DV1 and |Vbdot_x_s|>a1*|Vbdot_y_s|. This decision process is a procedure determining whether or not there is an acceleration request to increase the velocity of the vehicle 1 in the approximately fore-and-aft direction of the vehicle.

Here, DV1 is a first threshold value DV1 (>0) of the predetermined positive value. Further, DVb_s>DV1 indicates that the actual magnitude |↑Vb| of the center-of-gravity point velocity vector ↑Vb is increasing at a greater temporal rate of change compared to the first threshold value.

In addition, a1 is a predetermined positive coefficient. Further, |Vbdot_x_s|>a1*|Vbdot_y_s| indicates that the actual acceleration vector of the vehicle system center of gravity comprises an element in the x axis direction which is not zero, and that the angle (=tan$^{-1}$(|Vbdot_y_s|/|Vbdot_x_s|) at the acute angle side with respect to the x axis direction of the acceleration vector is closer to "0" compared to a predetermined angle (=tan$^{-1}$(1/a1)). In this example, a1 is set to be, for instance, equal to "1" or a value close to "1."

Therefore, in a condition in which the determination result of the step S23-1 becomes positive, an occupant or an external supporter is performing a controlling action to increase the magnitude of the center-of-gravity point velocity vector ↑Vb in generally the fore-and-aft direction. This controlling action adds an impellent force to the vehicle 1 in generally the fore-and-aft direction.

When the determination result of the step S23-1 is negative, i.e., when there is no request to accelerate the vehicle 1 (i.e., the request to accelerate the vehicle 1 in generally the fore-and-aft direction), the required center-of-gravity point velocity generator 74 next executes the determination procedure in step S23-4.

In the determination procedure in step S23-4, the required center-of-gravity point velocity generator 74 determines whether or not the estimated center-of-gravity point velocity absolute value rate of change DVb_s computed in step S21 is less than a predetermined negative third threshold value DV3 (<0). According to this determination process, it is determined whether or not a request for deceleration has been made, i.e., whether the occupant of the vehicle 1 has actively tried to reduce the magnitude of the center-of-gravity point velocity vector ↑Vb. In this case, the determination result of step S23-4 becomes positive when the occupant of the vehicle 1 has intentionally placed his or her foot on the ground, thereby creating a frictional force in the braking direction of the vehicle 1 between the occupant's foot and the floor.

Further, when the determination result of step S23-4 is negative (i.e., when the request for deceleration has not occurred), the required center-of-gravity point velocity generator 74 executes a first braking computational process in step S23-5, thereby determining the magnitude |↑Vb_aim1| of the base required center-of-gravity point velocity vector ↑Vb_aim1 (hereinafter, referred to as the base required center-of-gravity point velocity vector absolute value |↑Vb_aim1|) and the directional angle θvb_aim1 (hereinafter referred to as the base required center-of-gravity point velocity vector directional angle θvb_aim1), thereby completing the processing shown in FIG. 15. In addition, when the determination result of the step S23-4 is positive (i.e., when a request for deceleration has occurred), the required center-of-gravity point velocity generator 74 executes a second braking computational processing in step S23-6, determines a base required center-of-gravity point velocity vector absolute value |↑Vb_aim1| and the base required center-of-gravity point velocity vector directional angle θvb_aim1, thereby completing the processing shown in FIG. 15.

Incidentally, according to the present embedment, the base required center-of-gravity point velocity vector directional angle θvb_aim1 is defined as an angle (−180°≦θvb_aim≦180°) satisfying sin(θvb_aim1)=Vb_x_aim1/|↑Vb_aim1|, cos(θvb_aim1)=Vb_y_aim1/|↑Vb_aim1|. When |↑Vb_aim|=0, it is assumed that θVb_aim=0°.

Figure 16:
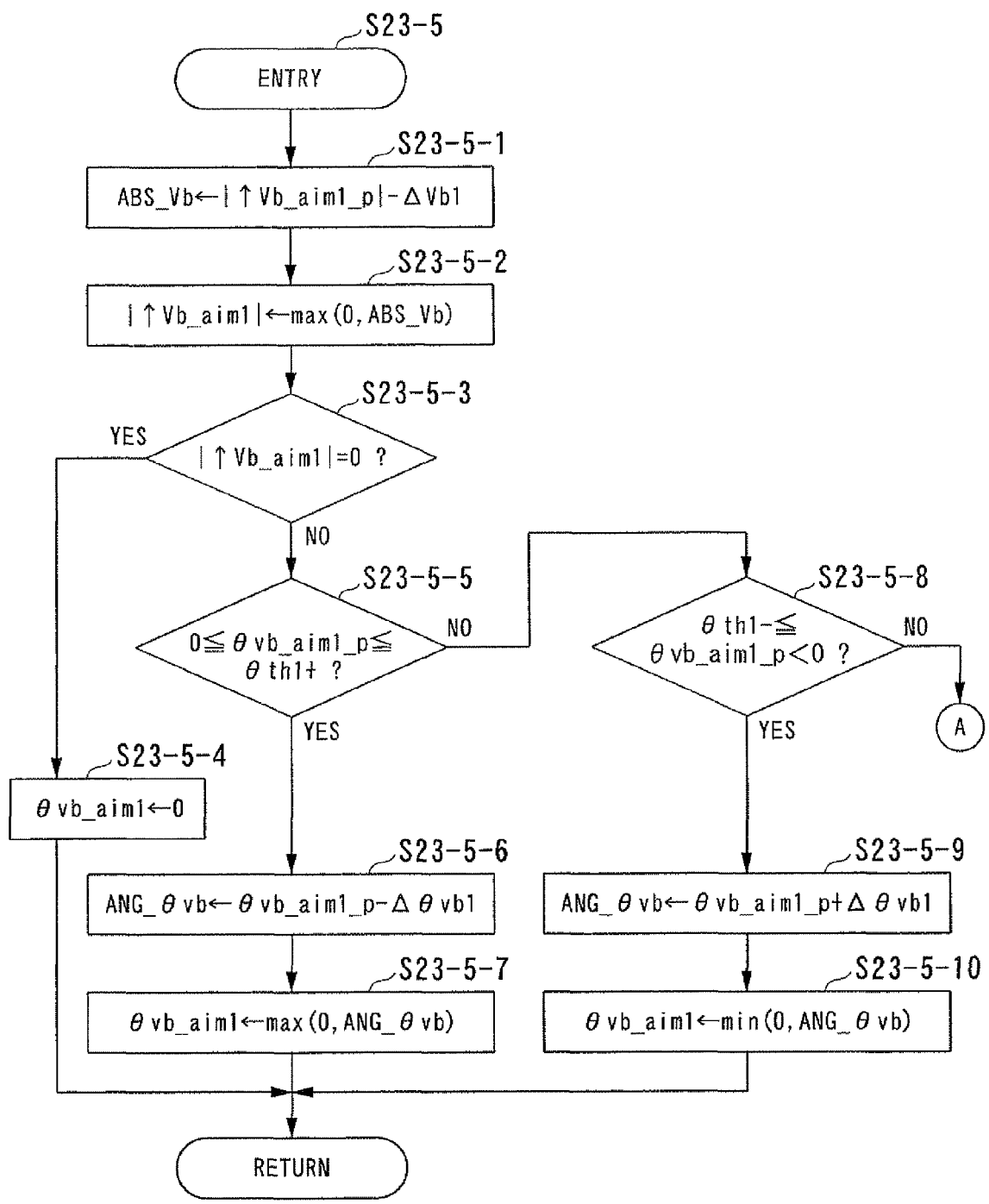
FIG. 16 is a flowchart showing a subroutine of a processing in step S23-5 shown in FIG. 15.
Figure 17:
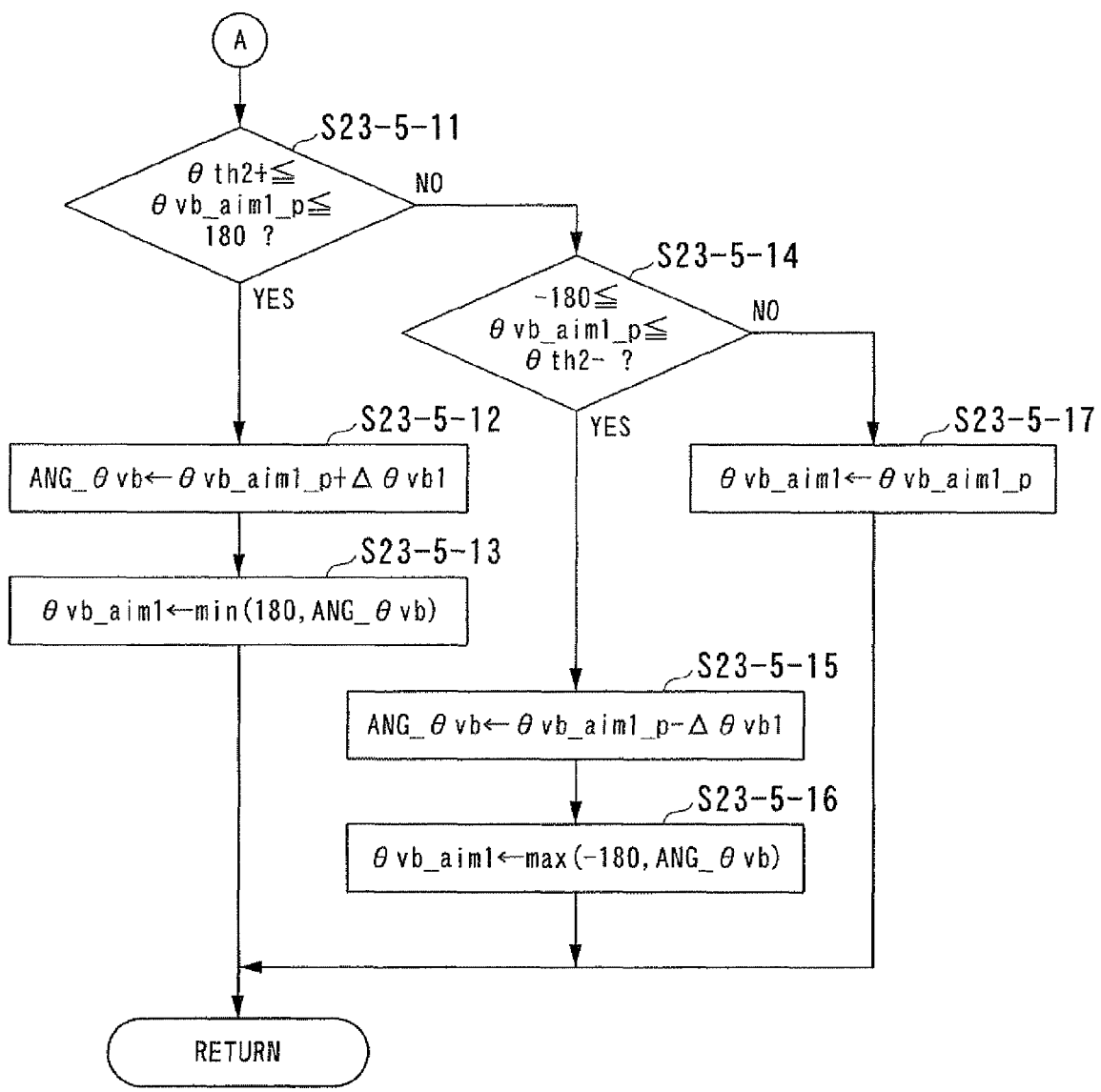
FIG. 17 is a flowchart showing a subroutine of a processing in step S23-5 shown in FIG. 15.

The first braking computational process of the step S23-5 is executed as shown in the flowcharts in FIG. 16 and FIG. 17.

According to this first braking computational process, when a deceleration requirement occurs, the required center-of-gravity point generator 74 outputs a value obtained by subtracting a predetermined positive value ΔVb1 from the previous value |↑Vb_aim_p| of the base required center-of-gravity point velocity vector absolute value |↑Vb_aim1| in step S23-5-1 as the candidate value ABS_Vb of |↑Vb_aim1|. ΔVb1 is a predetermined value prescribing the amount of decrease (and the temporal rate of change of |↑Vb_aim1|) of |↑Vb_aim1| for each control processing period.

Next, in the step S23-5-2, the required center-of-gravity point velocity generator 74 determines the greater value max (0, ABS_Vb) of the candidate value ABS_Vb and 0 as the current value of |↑Vb_aim1|. Therefore, when ABS_Vb≧0, ABS_Vb is determined as the current value of |↑Vb_aim1|. When ABS_Vb<0, the current value of |↑Vb_aim1| is set to be zero.

Next, in step S23-5-3, the required center-of-gravity point velocity generator 74 determines whether or not the |↑Vb_aim1| determined as described above is zero. When this determination result is positive, the required center-of-gravity point velocity generator 74 next sets the current value of θvb_aim1 to 0° in step S23-5-4, thereby completing the procedure in FIG. 16.

When the determination result of step S23-5-3 is negative, the required center-of-gravity point velocity generator 74 determines the current value of θvb_aim1 by the processing by step S23-5-5 according to whether or not the previous value θvb_aim1_p of θvb_aim1 is within either of the ranges of 0°<θvb_aim1_p≦θth1+, θth1−≦θvb_aim1_p<0°, θth2+≦θvb_aim1_p≦180°, −180°≦θvb_aim1_p≦θth2−, θth1+<θvb_aim1_p<θth2+, θth2−<θvb_aim1_p<θth1−.

Here, θth1+ is a predetermined positive directional angle threshold value between 0° and 90°. θth1− is a predetermined negative directional angle threshold value between 0° and −90°. θth2+ is a predetermined positive directional angle threshold value between 90° and 180°. θth2− is a predetermined positive directional angle threshold value between −90° and −180°. According to this example, θth1+ and θth1− are set so that the absolute values of θth1+ and θth1− is equal to be, for example, 45° or an angle close to 45°. Further, θth2+ and θth2− are set so that the absolute values of θth2+ and θth2− is equal to be, for example, 135° or an angle close to 135°. Incidentally, the difference between θth1+ and θth1− (=(θth1+)−(θth1−)) and the difference between θth2+ and θth2− (=(θth2+)−(θth2−)) need not be equal.

The procedure from step S23-5-5 is executed as described below. In other words, in step S23-5-5, the required center-of-gravity point velocity generator 74 determines whether or not the inequality 0°≦θvb_aim1_p≦θth1+ holds. When this determination result is positive, the required center-of-gravity point velocity generator 74 computes in step S23-5-6, a value obtained by subtracting a predetermined positive value Δθvb1 from the previous value θvb_aim1_p of θvb_aim1 as the candidate value ANG_Vb of θvb_aim1. Δθvb1 is a predetermined value prescribing the variation of θvb_aim1 (and the temporal rate of change of θvb_aim1) for each control processing period.

Further, in step S23-5-7, the required center-of-gravity point velocity generator 74 determines the greater angular value max (0, ANG_Vb) of the candidate value ANG_Vb and 0° as the current value of θvb_aim1, and thereby completes the processing shown in FIG. 16. Therefore, when ANG_Vb_≧0°, ANG_Vb is determined as the current value of θvb_aim1. Meanwhile, when ANG_Vb<0°, the current value of θvb_aim1 becomes 0°.

When the determination result of step S23-5-5 is negative, the required center-of-gravity point velocity generator 74 determines in step S23-5-8 whether or not the inequality θth1-≦θvb_aim1_p<0° holds. When this determination result is positive, the required center-of-gravity point velocity generator 74 computes in step S23-5-9 computes a value obtained by increasing the previous value θvb_aim1_p of θvb_aim 1 by the predetermined value Δθvb1 as the candidate value ANG_Vb of θvb_aim1.

Further, in step S23-5-10, the required center-of-gravity point velocity generator 74 determines the smaller angular value min (0, ANG_Vb) of the candidate value ANG_Vb and 0° as the current value of θvb_aim1, thereby completing the procedure shown in FIG. 16. Therefore, when ANG_Vb≦0°, ANG_Vb is determined as the current value of θvb_aim1. When AN_Vb>0°, the current value of θvb_aim1 is 0°.

When the determination result of step S23-5-8 is negative, the requesting center-of-gravity point velocity generator 74 determines in step S23-5-11 in FIG. 17 whether or not the inequality θth2+≦θvb_aim1_p≦180° holds. When the determination result is positive, the required center-of-gravity point velocity generator 74 computes in step S23-5-12 a value obtained by increasing the previous value θvb_aim1_p of θvb_aim1 by the predetermined value Δθvb1 as the candidate value ANG_Vb of θvb_aim1.

Further, in step S23-5-13, the required center-of-gravity point velocity generator 74 determines the smaller angular value min (180, ANG_Vb) of the candidate value ANG_Vb and 180° as the current value of θvb_aim1, thereby completing the procedure shown in FIG. 17. Therefore, when ANG_Vb≦180°, ANG_Vb is determined as the current value of θvb_aim1. When ANG_Vb>180°, the current value of θvb_aim1 is 180°.

When the determination result of step S23-5-11 is negative, the requesting center-of-gravity point velocity generator 74 next determines in step S23-5-14 whether or not the inequality -180°≦θvb_aim1_p≦θth2- holds. When the determination result is positive, the required center-of-gravity point velocity generator 74 computes in step S23-5-15 a value obtained by decreasing the previous value θvb_aim1_p of θvb_aim1 by the predetermined value Δθvb1 as the candidate value ANG_Vb of θvb_aim1.

Further, in step S23-5-16, the required center-of-gravity point velocity generator 74 determines the greater angular value max (180, ANG_Vb) of the candidate value ANG_Vb and -180° as the current value of θvb_aim1, and thereby completes the processing shown in FIG. 17. Therefore, when ANG_Vb≧-180°, ANG_Vb is determined as the current value of θvb_aim1. Meanwhile, when ANG_Vb<-180°, the current value of θvb_aim1 becomes -180°.

When the determination result of step S23-5-14 is negative, i.e., when the inequality θth1+<θvb_aim1_p<θth2+ or θth2-<θvb_aim1_p<θth1- holds, the required center-of-gravity point velocity generator 74 determines in step S23-5-17 the current value of θvb_aim1 as the same value as the previous value θvb_aim1_p, and thereby completes the processing shown in FIG. 17.

Above are the details of the first braking computational processing in step S23-5.

Figure 18:
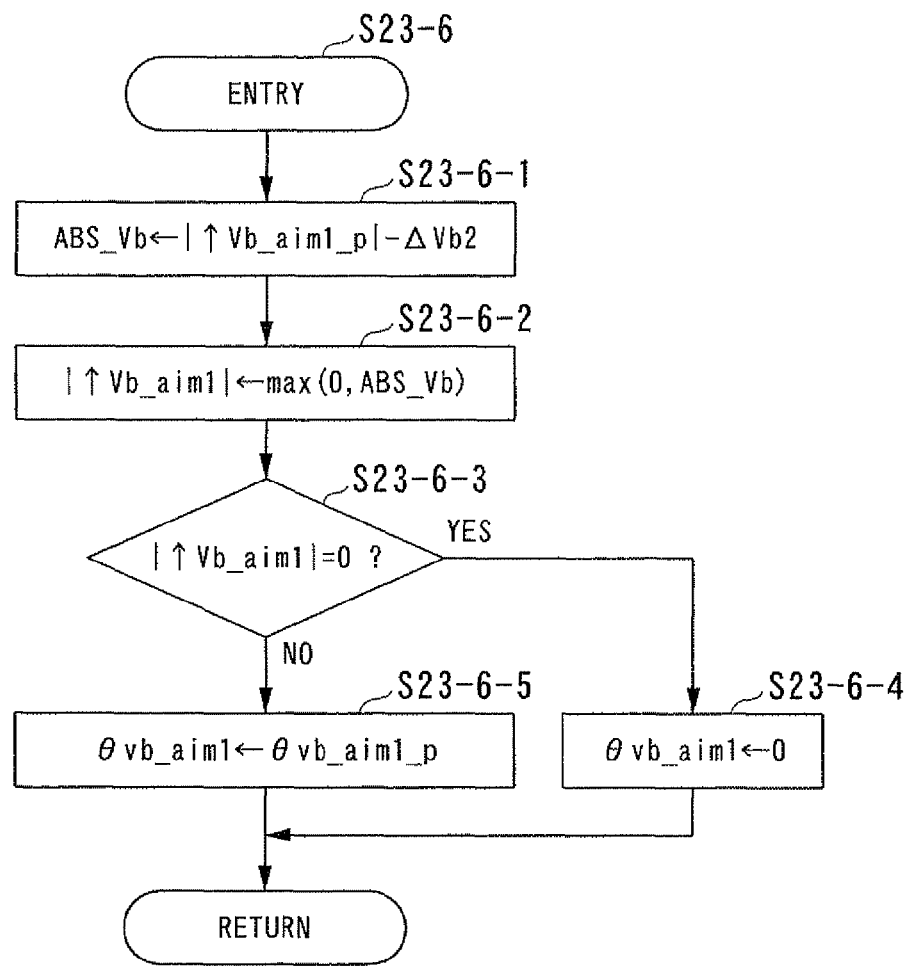
FIG. 18 is a flowchart showing a subroutine processing in step S23-6 shown in FIG. 15.

Meanwhile, the second braking computational processing in step S23-6 (when a deceleration requirement occurs), shown in FIG. 15, is executed as indicated in the flowchart shown in FIG. 18.

According to this second braking computational processing, the required center-of-gravity point velocity generator 74 first computes in step S23-6-1 a value obtained by subtracting a predetermined positive value ΔVb2 from the previous value |↑Vb_aim_p| of the base required center-of-gravity point velocity vector absolute value |↑Vb_aim1| as the candidate value ABS_Vb of |↑Vb_aim1|. ΔVb2 is a predetermined value prescribing the decrease amount of |↑Vb_aim1| (i.e., the temporal rate of change of |↑Vb_aim1|) for each control processing period in the second braking computational processing. In this case, ΔVb2 is set to be a value larger than the predetermined value ΔVb1 used in the first braking computational process.

Next, in step S23-6-2, the required center-of-gravity point velocity generator 74 executes the same processing as in step S23-5-2, and determines the greater value max (0, ABS_Vb) of the candidate value ABS_Vb and 0 computed in step S23-6-1 as the current value of |↑Vb_aim1|.

Next, the required center-of-gravity point velocity generator 74 determines in step S23-6-3 whether or not |↑Vb_aim1| determined as described above is zero. When this determination result is positive, the required center-of-gravity point velocity generator 74 next sets the current value of θvb_aim1 to zero in step S23-6-4, thereby completing the processing of FIG. 18.

Further, when the determination result of step S23-6-3 is negative, the required center-of-gravity point velocity generator 74 next sets the current value of θvb_aim1 to the same value as the previous value θvb_aim1_p in step S23-6-5, and thereby completes the processing in FIG. 18.

Above are details of the second braking computational processing in step S23-6. Returning to the description in FIG. 15, when the determination result of the step S23-1 is positive, i.e., when there is an acceleration request of the vehicle 1 in generally the fore-and-aft direction, the required center-of-gravity point velocity generator 74 determines in step S23-2, the base required center-of-gravity point velocity vector absolute value |↑Vb_aim1| and the base required center-of-gravity point velocity vector directional angle θvb_aim1. The required center-of-gravity point velocity generator 74 alters the computational processing mode in step S23-3 from the braking mode to the velocity following mode, thereby completing the processing of FIG. 15.

In step S23-2, in particular, the value obtained by multiplying the predetermined ratio γ to the magnitude |↑Vb_s| (=sqrt (Vb_x_s$^2$+Vb_y_s$^2$)) of the estimated center-of-gravity point velocity vector ↑Vb_s (current value) is determined as the base required center-of-gravity point velocity vector absolute value |↑Vb_aim1|. The ratio γ is set to be a positive value which is slightly smaller than "1" such as 0.8.

Further, in step S23-2, the directional angle θvb_s (=sin$^{-1}$ (Vb_x_s/|↑Vb_s|)) of the estimated center-of-gravity point velocity vector ↑Vb_s is determined to be the base required center-of-gravity point velocity vector directional angle θvb_aim1. Therefore, in step S23-2, consequently, a vector obtained by multiplying the ratio γ with the estimated center-of-gravity point velocity vector ↑Vb_s is determined as the base required center-of-gravity point velocity vector ↑Vb_aim1.

Such a processing in step S23-2 matches the way in which |↑Vb_x_aim1| and θvb_aim1 is determined with the velocity following mode which starts from the next controlling processing cycle.

Incidentally, it is not necessary that the ratio γ be slightly smaller than "1." For example, the ratio γ may be set to "1" or to a value slightly larger than "1." In this example, the value of the ratio γ is set to be a value slightly smaller than "1" in order to prevent the velocity of the vehicle 1 that the occupant physically feels (in a sensory aspect) is recognized as if it is larger than the actual velocity.

Above is the computational processing of the braking mode in step S23.

Incidentally, when the determination result of step S23-1 is negative, the computational processing mode is not altered. Therefore, in the next control processing cycle, the computational processing mode is maintained to be the braking mode.

Figure 19:
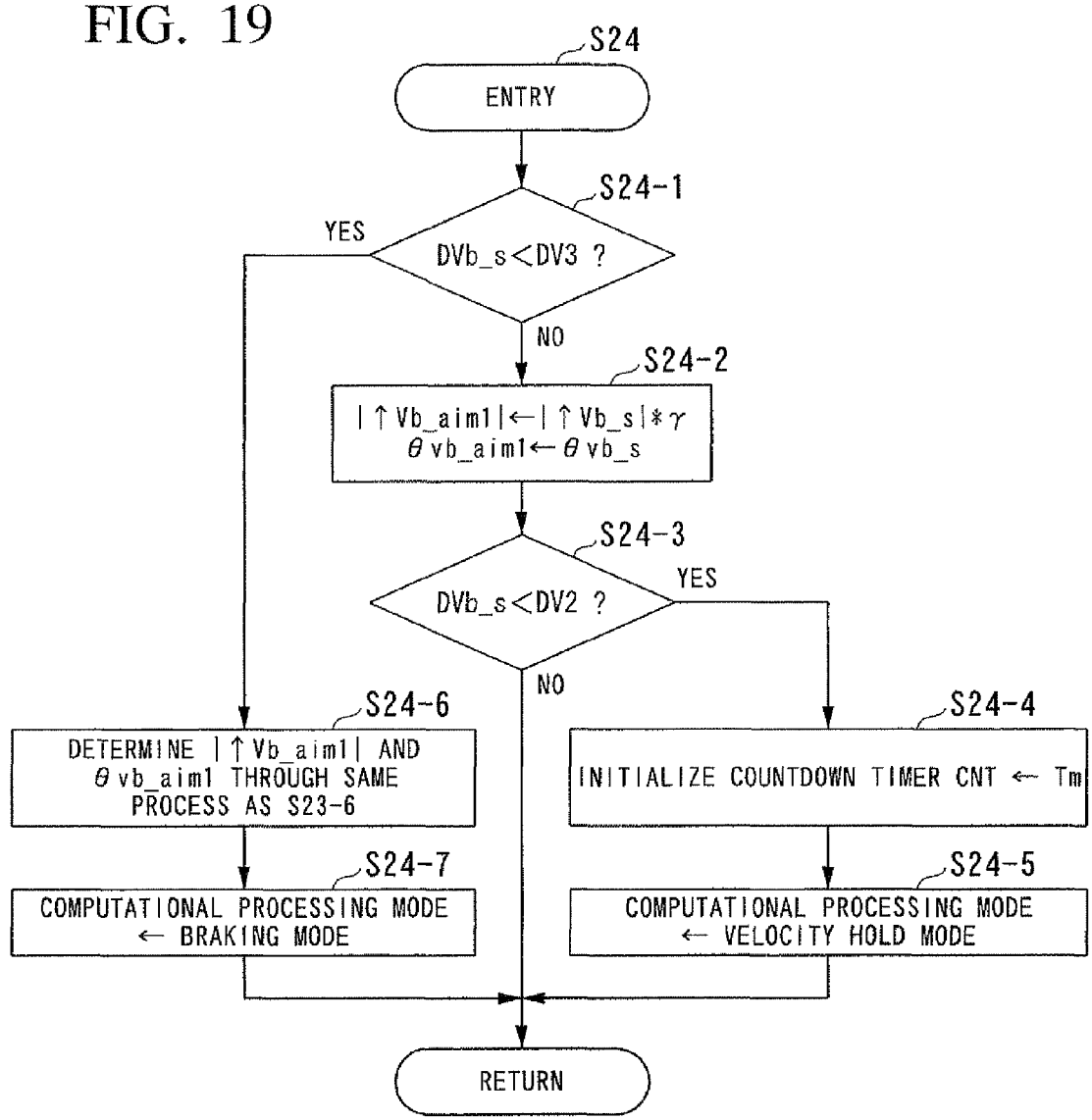
FIG. 19 is a flowchart showing a subroutine processing in step S24 shown in FIG. 14.

Next, the computational processing of the velocity following mode in step S24, shown in FIG. 14, is executed as indicated in the flowchart in FIG. 19. In particular, the required center-of-gravity point velocity generator 74 first performs in step S24-1, the same determination processing as step S23-4. In other words, the required center-of-gravity point velocity generator 74 executes a process determining whether or not a deceleration request of the vehicle 1 has been made.

When this determination result is positive, the required center-of-gravity point velocity generator 74 next executes in step S24-6, the same processing as step S23-6 (i.e., the processing shown in the flowchart in FIG. 18), thereby determining the base required center-of-gravity point velocity vector absolute value $|\uparrow Vb\_aim1|$ and the base required center-of-gravity point velocity vector directional angle $\theta vb\_aim1$. Further, the required center-of-gravity point velocity generator 74 changes, in step S24-7, the computational processing mode from the velocity following mode to the braking mode, thereby completing the processing in FIG. 19.

Meanwhile, when the determination result of the step S24-1 is negative, i.e., when the deceleration request of the vehicle 1 has not occurred, the required center-of-gravity point velocity generator 74 next executes the processing in step S24-2. In step S24-2, the required center-of-gravity point velocity generator 74 executes the same procedure as the step S23-2, and thereby determines the base required center-of-gravity point velocity vector absolute value $|\uparrow Vb\_aim1|$ and the base required center-of-gravity point velocity vector directional angle $\theta vb\_aim1$. In other words, $|\uparrow Vb\_x\_s|* \gamma$ is determined as $|\uparrow Vb\_aim1|$, and $\theta vb\_s$ is determined as $\theta vb\_aim1$.

Next, in step S24-3, the required center-of-gravity point velocity generator 74 determines whether or not the estimated center-of-gravity point velocity absolute value rate of change DVb_s (the value computed in step S21) is smaller than the second threshold value DV2, which is predetermined This second predetermined value DV2 is set to be a negative predetermined value which is larger than the third threshold value DV3 (i.e., being closer to 0 compared to DV3). Incidentally, the second threshold value DV2 may be set to be "0" or to a positive value slightly larger than "0." At the same time, however, DV2 is a value smaller than the first threshold value DV1.

The processing in step S24-3 determines the timing with which the velocity following mode is transferred to the velocity hold mode. Further, when the determination result of step S24-3 is negative, the required center-of-gravity point velocity generator 74 terminates the process shown in FIG. 19. In this case, the computational processing mode is not altered. Therefore, in the next control processing period, the computational processing mode is maintained to be the velocity following mode.

Further, when the determination result of step S24-3 is positive, the required center-of-gravity point velocity generator 74 regards the acceleration request of vehicle 1 to be met. Thus, the required center-of-gravity point velocity generator 74 initiates the countdown timer in step S24-4. Further, in step S24-5, the required center-of-gravity point velocity generator 74 changes the computational processing mode from the velocity following mode to the velocity hold mode, thereby completes the processing in FIG. 19.

The countdown timer is a timer measuring the amount of time that has passed since the start of the velocity hold mode beginning from the next control processing period. Further, in step S24-4, a predetermined initial value Tm is set to the measured time value CNT of this timer. The initial value Tm_x refers to a set value of time during which the velocity hold mode is to be continued.

Above is the computational processing of the velocity following mode in step S24.

Figure 20:
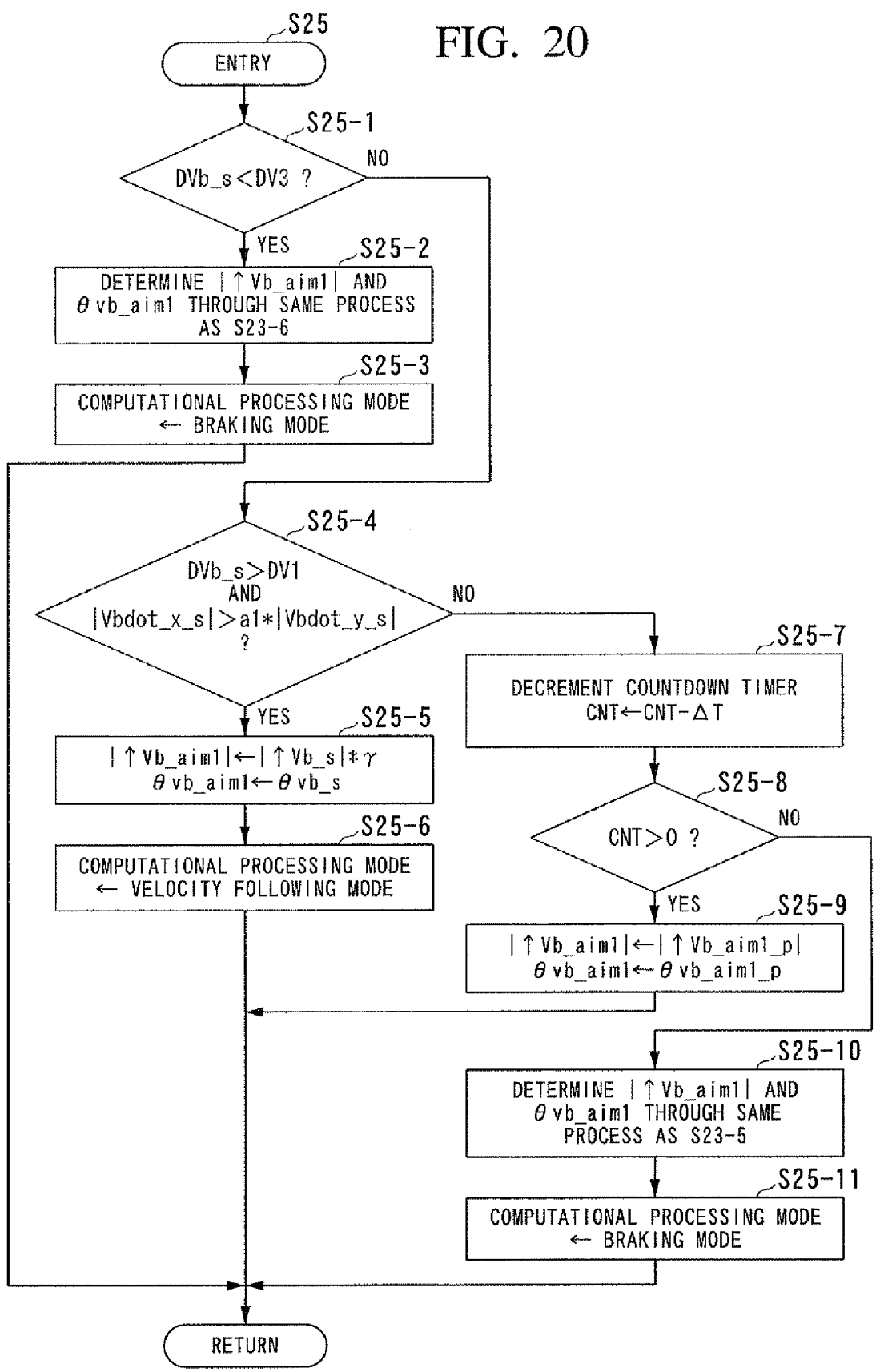
FIG. 20 is a flowchart showing a subroutine processing in step S25 shown in FIG. 14.

Next, the computational processing of the velocity hold mode in step S25, shown in FIG. 14, is executed as indicated in the flowchart shown in FIG. 20. In particular, in step S25-1, the required center-of-gravity point velocity generator 74 first performs the same decision process as in step S23-4. In other words, the required center-of-gravity point velocity generator 74 executes a process determining whether or not a deceleration request of the vehicle 1 has been made.

When the determination result of the step S25-1 is positive (i.e., when a deceleration request of the vehicle 1 has occurred), the required center-of-gravity point velocity generator 74 next executes, in step S25-2, the same procedure as in step S23-6 (i.e., the procedure shown in the flowchart in FIG. 18). As a result, the required center-of-gravity point velocity generator 74 determines the base required center-of-gravity point velocity vector absolute value $|\uparrow Vb\_aim1|$ and the base required center-of-gravity point velocity vector directional angle $\theta vb\_aim1$. Furthermore, the required center-of-gravity point velocity generator 74 changes, in step S25-3, the computational processing mode from the velocity hold mode to the braking mode, thereby completing the processing of FIG. 20.

Meanwhile, when the determination result of step S25-1 is negative (i.e., when a deceleration request of the vehicle 1 has not occurred), the required center-of-gravity point velocity generator 74 executes in step S25-4, the same determination process as step S23-1, determining whether or not there is an acceleration request of the vehicle 1 in roughly the fore-and-aft direction.

When the determination result of the step S25-4 is positive (i.e., when an acceleration request of the vehicle 1 has occurred again in generally the fore-and-aft direction), the required center-of-gravity point velocity generator 74 executes, in step S25-5, the same procedure as in step S23-2. As a result, the required center-of-gravity point velocity generator 74 determines the base required center-of-gravity point velocity vector absolute value $|\uparrow Vb\_aim1|$ and the base required center-of-gravity point velocity vector directional angle $\theta vb\_aim1$. Thus, $|\uparrow Vb\_x\_s|* \gamma$ is determined as $|\uparrow Vb\_aim1|$, and $\theta vb\_s$ is determined as $\theta vb\_aim1$.

Further, the required center-of-gravity point velocity generator 74 changes in step S25-6, the computational processing mode from the velocity hold mode to the velocity following mode, thereby completing the procedure shown in FIG. 20.

When the determination result of step S25-4 is negative (i.e., when there remains to be no acceleration request in generally the fore-and-aft direction), the required center-of-gravity point velocity generator 74 decrements in step S25-7, the measured time value CNT of the countdown timer. In other words, the required center-of-gravity point velocity generator 74 updates the measured time value CNT by subtracting a predetermined value $\Delta T$ (the time of the control processing period) from the present value of the measured time value CNT.

Next, the required center-of-gravity point velocity generator 74 determines in step S25-8 whether or not the measured time value CNT of the countdown timer is greater than zero, i.e., whether or not the time measurement by the countdown timer has completed.

When the determination result of step S25-8 is positive, the amount of time represented by the initial value Tm of the countdown timer has not yet passed since the velocity hold mode has started. In this case, the required center-of-gravity point velocity generator 74 maintains the computational processing mode to the velocity hold mode by determining the base required center-of-gravity point velocity vector absolute value |↑Vb_aim1| and the base required center-of-gravity point velocity directional angle θvb_aim1 in step S25-9, thereby completing the processing of FIG. 20.

In this case, in step S25-9, the current value of |↑Vb_aim1| is determined to be the same value as the previous value |↑Vb_aim1_p|. Further, the current value of θvb_aim1 is determined to be the same value as the previous value θvb_aim1_p. Therefore, the previous value of the base required center-of-gravity point vector ↑Vb_aim1_p is determined as the velocity vector of the current value of ↑Vb_aim1.

Incidentally, when the determination result of step S25-8 is positive, the computational processing mode is not renewed. Therefore, in the next control processing period, the computational processing mode is maintained to be the velocity hold mode.

When the determination result of the step S25-8 is negative, i.e., when a predetermined amount of time represented by the initial value Tm of the countdown timer has passed since the velocity hold mode has started, the required center-of-gravity point velocity generator 74 performs in step S25-10 the same processing as in step S23-5 (i.e., the processing shown in the flowchart of FIGS. 16 and 17), thereby determining the base required center-of-gravity point velocity vector absolute value |↑Vb_aim1| and the base required center-of-gravity point velocity directional angle θvb_aim1.

Further, the required center-of-gravity point velocity generator 74 changes in step S25, the computational processing mode from the velocity hold mode to the braking mode, thereby completing the processing shown in FIG. 20.

Above is the computational processing of the velocity hold mode in step S25.

Returning to the description in FIG. 14, the required center-of-gravity point velocity generator 74 executes one of the computational processes steps S23-25 as described above, and thereafter executes a process in step S26 (i.e., a filtering process) inputting each of the |↑Vb_aim1| and θvb_aim1 determined in the computational process.

Here, the filter inputting |↑Vb_aim1| and θvb_aim1 is a first delay characteristic low pass filter in order to prevent the magnitude |↑Vb_aim| of the required center-of-gravity point velocity vector ↑Vb_aim and the directional angle θvb_aim suddenly changes to a step form immediately after the computational processing mode is changed from the braking mode to the velocity following mode. In this case, the time constant of the filter inputting |↑Vb_aim| is set to a relatively short time constant. In a condition other than a sudden change in |↑Vb_aim1|, the output value of the filter matches or approximately coincides with |↑Vb_aim1|. This characteristic applies to a filter inputting θvb_aim1 as well.

Further, in step S26, the output value of the filter inputting θvb_aim1 is determined as the directional angle θvb_aim of the required center-of-gravity point velocity vector ↑Vb_aim (hereinafter, the required center-of-gravity point velocity vector directional angle θvb_aim).

Next, the procedure moves on to step S27. The required center-of-gravity point velocity generator 74 finally determines the value obtained by passing the output value of the filter inputted with |↑Vb_aim1| through the limiter as the magnitude |↑Vb_aim| (hereinafter referred to as the required center-of-gravity point velocity vector absolute value |↑Vb_aim|) of the required center-of-gravity point velocity vector ↑Vb_aim. In this case, the limiter prevents |↑Vb_aim| from being too large. When the output value of the filter inputted with |↑Vb_aim| is less than or equal to a predetermined upper limit value, the output value of this filter is outputted as |↑Vb_aim|. In addition, when the output value of the filter exceeds the upper limit value, the limiter outputs the upper limit value as |↑Vb_aim|. In other words, the limiter outputs the smaller value of the output value of the filter and the upper limit value as |↑Vb_aim|.

Next, the procedure moves on to step S28. From |↑Vb_aim| and θvb_aim determined as described above, the required center-of-gravity point velocity generator 74 computes the element of the required center-of-gravity point velocity vector ↑Vb_aim in the x axis direction Vb_x_aim (i.e. the required center-of-gravity point velocity in the x axis direction) and the element in the y axis direction Vb_y_aim (the required center-of-gravity point velocity in the y axis direction). In further detail, |↑Vb_aim|*sin(θvb_aim) is computed as Vb_x_aim, and |↑Vb_aim*cos(θvb_aim) is computed as Vb_y_aim.

Above are the details of the processing of the required center-of-gravity point velocity generator 74.

Due to the processing by the required center-of-gravity point velocity generator 74 described above, the required center-of-gravity point velocity vector ↑Vb_aim (thus, the required center-of-gravity point velocity Vb_x_aim, Vb_y_aim) is determined according to an embodiment described below.

In other words, for example, in order to increase the velocity of the vehicle 1, suppose an impellent force in the x axis direction (in particular, an impellent force such that the determination result of step S23-1 becomes positive) is applied to the vehicle 1 by the occupant kicking the floor with the back side of his or her foot or by a supporter and the like pushing the vehicle 1.

Incidentally, the computational processing mode before applying the impellent force is assumed to be the braking mode. In addition, to facilitate the reader's understanding in this case, the output value of the filter inputting |↑Vb_aim1| in step S26 in FIG. 14 is assumed to be a value contained within a range so that a compulsory limitation by the limiter in step S27 is not applied. In other words, the output value is assumed to be a value less than or equal to the upper limit of the limiter. As the same time, the center-of-gravity point velocity estimation values Vb_x_s and Vb_y_s are contained within a range such that a compulsory limitation is not applied to the output values V_x_lim2 and V_y_lim2 in the limiting processor 104.

In this case, when the determination result of step S23-1 becomes positive by applying an impellent force to the vehicle 1, the processing in step S23-3 shown in FIG. 15 changes the computational processing mode from the braking mode to the velocity following mode.

In the velocity following mode, in a condition such that a deceleration request does not occur (i.e., in a condition in which the determination result of step S24-1 is negative), a vector obtained by multiplying a predetermined ratio γ to the current value (i.e., present value) of the estimated center-of-gravity point velocity vector ↑Vb_s is determined as the base required center-of-gravity point velocity vector ↑Vb_aim1. This vector obtained by multiplying a predetermined ratio γ to the current value (i.e., present value) of the estimated center-of-gravity point velocity vector ↑Vb_s is a velocity vector such that the magnitude is slightly smaller than the magnitude of ↑Vb_s and the direction is the same as ↑Vb_s.

Therefore, the required center-of-gravity point velocity vector ↑Vb_aim determined successively by the required center-of-gravity point velocity generator 74 is determined so as to follow the velocity vector ↑Vb_aim1 (=γ*↑Vb_s) which matches approximately the actual center-of-gravity point velocity vector ↑Vb which increases in size due to the impellent force applied to the vehicle 1.

The element in the x axis direction and the element in the y axis direction of the required center-of-gravity point velocity vector ↑Vb_aim determined as described above is determined to be the target center-of-gravity point velocity for control Vb_x_mdfd and Vb_y_mdfd. Further, the manipulated variable elements u3_x and u3_y included respectively in each imaginary wheel rotational angular acceleration commands ωwdot_x_cmd and ωwdot_y_cmd are determined so that the center-of-gravity point velocity estimation value Vb_x_s and Vb_y_s are respectively converged to the target center-of-gravity point velocity for control Vb_x_mdfd and Vb_y_mdfd.

As a result, the velocity of the wheel assembly 5 is controlled so that the increase in the actual velocity of the vehicle system center of gravity due to the impellent force applied to the vehicle 1 by the occupant (i.e., the increase in velocity in generally the fore-and-aft direction) is swiftly executed in response to the request based on the impellent force. Therefore, the vehicle 1 accelerates smoothly due to the applied impellent force.

Further, in the velocity following mode, when the determination result of step S24-1 in FIG. 19 becomes positive (i.e., a deceleration request occurs) due to the application of the braking force to the vehicle 1, the computational processing mode changes to the braking mode. As a result, the velocity of the vehicle 1 decreases. in this case, while the deceleration request is occurring, |↑Vb_aim1| and θvb_aim1 are determined by the second braking computational processing (the processing in FIG. 18) of step S23-6. As a result, the base required center-of-gravity point velocity vector ↑Vb_aim1, or a required center-of-gravity point velocity vector ↑Vb_aim following ↑Vb_aim1 are determined so that the directions of ↑Vb_aim1 and ↑Vb_aim are held constant, and that the magnitude decreases at a constant temporal rate of change (the temporal rate of change prescribed by the predetermined value ΔVb2).

Next, in the velocity following mode, when the application of the impellent force on the vehicle 1 stops, and the estimated center-of-gravity point velocity absolute value rate of change DVb_s becomes smaller than the second threshold value DV2 (i.e., when the determination result of step S24-3 of FIG. 19 becomes positive), the computational processing mode changes from the velocity following mode to the velocity hold mode based on the processing in step S24-5 in FIG. 19.

According to this velocity hold mode, in a condition in which the acceleration request and the deceleration request are not made (i.e., in a condition in which the determination results of the steps S25-1 and 25-4 in FIG. 19 are both negative), the base required center-of-gravity point velocity vector ↑Vb_aim1 is set to be the same velocity vector as the velocity vector ↑Vb_aim1_p of the previous value until the time measurement of the countdown timer is completed.

Therefore, after the velocity hold mode starts, within a period of time until the time measurement of the countdown timer is completed (during the time of the initial value Tm of the countdown timer), the base required center-of-gravity point velocity vector ↑Vb_aim1 is maintained to be the same constant velocity vector as the velocity vector determined before the velocity hold mode starts.

Therefore, the required center-of-gravity point velocity vector ↑Vb_aim determined to follow ↑Vb_aim1 is determined to be maintained at a constant velocity vector (i.e., a velocity vector which matches or approximately matches with ↑Vb_aim which was determined immediately before the velocity hold mode started).

Further, the element in the x axis direction and the element in the y axis direction of the required center-of-gravity point velocity vector ↑Vb_aim determined as described above is determined to be the target center-of-gravity point velocity for control Vb_x_mdfd and Vb_y_mdfd. Moreover, the manipulated variable elements u3_x and u3_y included respectively in each imaginary wheel rotational angular acceleration commands ωwdot_x_cmd and ωwdot_y_cmd are determined so that the center-of-gravity point velocity estimation value Vb_x_s and Vb_y_s are respectively converged to the target center-of-gravity point velocity for control Vb_x_mdfd and Vb_y_mdfd.

As a result, after the vehicle 1 increases its velocity, during a period of time in which the time measurement by the countdown timer is completed (the period of time represented by the initial value Tm), the velocity of the wheel assembly 5 is controlled so that the magnitude and the direction of the actual velocity vector ↑Vb of the vehicle system center of gravity is maintained to be constant without requiring the posture of the upper body of the occupant to be adjusted frequently. Therefore, the actual driving condition of this vehicle under this situation is such that the vehicle 1 runs at an approximately constant velocity vector even if the occupant does not perform a maneuvering operation by actively moving his or her upper body.

Incidentally, in the velocity hold mode, when an impellent force in approximately the fore-and-aft direction is applied to the vehicle 1 again, thereby making the determination result of step S25-4 of FIG. 20 positive (i.e., an acceleration request occurring), the computational processing mode returns to the velocity following mode. Therefore, the vehicle 1 accelerates again in approximately the fore-and-aft direction.

In the velocity hold mode, when the determination result of step S25-1 of FIG. 20 becomes positive by adding a braking force to the vehicle 1 (i.e., when a deceleration request occurs), the computational processing mode changes to the braking mode. As a result, the velocity of the vehicle 1 decreases. In this case, similar to the case in which a deceleration request occurs in the velocity following mode, while the deceleration request is occurring, the |↑Vb_aim1| and θvb_aim1 is determined based on the second braking computational processing (i.e., the processing in FIG. 18) of step S23-6.

Next, in the velocity hold mode, when the condition in which neither the acceleration request nor the deceleration request occurs is maintained (i.e., the condition in which the determination results of the steps S25-1 and 25-4 in FIG. 20 are both negative), and the time measurement of the countdown timer is completed, the computational processing mode is altered from the velocity hold mode to the braking mode due to the processing of step S25-11 in FIG. 20.

In this braking mode, under a condition in which neither the acceleration request nor the deceleration request occurs (i.e., a condition in which the determination results of steps S23-1 and 23-4 in FIG. 15 are both negative), the processing of steps S23-5-1 and 23-5-2 in FIG. 16 are performed in each control processing period. As a result, the base required center-of-gravity point velocity vector absolute value

|↑Vb_aim1| decreases continuously to zero at a constant temporal rate of change (a temporal rate of change prescribed by ΔVb1 mentioned above). Further, after |↑Vb_aim1| decreases to zero, |↑Vb_aim1| is maintained to be zero.

Further, in the braking mode, in a condition in which neither the acceleration request nor the deceleration request has occurred, the processing after step S23-5-3 in FIG. 16 is executed in each control processing period. In this case, when the direction of the base required center-of-gravity point velocity vector ↑Vb_aim1 determined immediately before the transition from the velocity hold mode to the braking mode (i.e., the direction of ↑Vb_aim1 determined in a control processing period immediately preceding the control processing period in which the determination result of step S25-8 of FIG. 20 is negative) is different from the x axis direction and is relatively close to the x axis direction (in more precise terms, when the directional angle θvb_aim1 of ↑Vb_aim1 determined immediately before the transition is an angular value in either one of the ranges $0°<\theta vb\_aim1\_p \leq \theta th1+$, $\theta th1- \leq \theta vb\_aim1\_p \leq 0°$, $\theta th2+ \leq \theta vb\_aim\_p < 180°$, $-180° < \theta vb\_aim1\_p \leq \theta th2-$), during a period of time in which |↑Vb_aim1| decreases to zero, θvb_aim1 approaches the target conversion angle 0° or 180° or −180° at a constant temporal rate of change, and is finally maintained at the target conversion angle. Therefore, after the braking mode begins, and during the period of time in which the |↑Vb_aim1| decreases to zero, the direction of the base required center-of-gravity point velocity vector ↑Vb_aim continuously approaches the x axis. In other words, during this period of time, the ratio of the absolute value of the element Vb_y_aim1 in the y axis direction with respect to the absolute value of the element Vb_x_aim1 in the x axis direction of the base required center-of-gravity point velocity vector ↑Vb_aim approach zero. Further, when the direction of ↑Vb_aim1 reaches the same direction as the x axis direction (i.e., Vb_y_aim1=0) before |↑Vb_aim1| diminishes to zero, the direction of ↑Vb_aim1 is maintained to be equal to the direction of the x axis.

Therefore, ↑Vb_aim1 is determined so that its magnitude diminishes and that its direction approaches (converges) the direction of the x axis. When ↑Vb_aim1 is determined in this way, the required center-of-gravity point velocity vector ↑Vb_aim, determined to follow ↑Vb_aim1, also behaves so that its magnitude diminishes and that its direction approaches the direction of the x axis.

Further, when the direction of the base required center-of-gravity point velocity vector ↑Vb_aim1, determined immediately before the transition from the velocity hold mode to the braking mode, is different from the direction of the x axis, and is facing a direction relatively far apart from the direction of the x axis (in more precise terms, when the directional angle θvb_aim1 of ↑Vb_aim1 determined immediately before the transition is an angular value within either of the ranges of $\theta th1+ < \theta vb\_aim1\_p < \theta th2+$ and $\theta th2- < \theta vb\_aim1\_{ip} < \theta th1-$), θvb_aim1 is held constant held constant at the same angular value as the directional angle θvb_aim1 of ↑Vb_aim1 determined immediate before the transition, during the period in which |↑Vb_aim1| diminishes to zero.

Therefore, ↑Vb_aim1 is determined so that its magnitude diminishes and so that its direction is maintained to be constant. When ↑Vb_aim1 is determined in this manner, the required center-of-gravity point velocity vector ↑Vb_aim, which is determined to follow ↑Vb_aim1, is also determined so that its magnitude diminishes and so that its direction is maintained to be equal.

Further, in the velocity holding mode, the magnitude and the direction of ↑Vb_aim1 is maintained to be constant. As a result, the base required center-of-gravity point velocity vector ↑Vb_aim1, determined immediately before the transition from the velocity hold mode to the braking mode, consequently matches with ↑Vb_aim1 which was determined immediately before the transition from the velocity following mode to the velocity hold mode (i.e., ↑Vb_aim1 determined in the control processing period in which the determination result of step S24-3 of FIG. 19 is positive).

The element in the x axis direction and the element in the y axis direction of the required center-of-gravity point velocity vector ↑Vb_aim determined as described above in the braking mode is determined to be the target center-of-gravity point velocity for control Vb_x_mdfd and Vb_y_mdfd. Further, the manipulated variable elements u3_x and u3_y included respectively in each imaginary wheel rotational angular acceleration commands ωwdot_x_cmd and ωwdot_y_cmd are determined so that the center-of-gravity point velocity estimation value Vb_x_s and Vb_y_s are respectively converged to the target center-of-gravity point velocity for control Vb_x_mdfd and Vb_y_mdfd.

As a result, when the computational processing mode before the braking mode is a velocity hold mode, the velocity of the wheel assembly 5 is controlled so that the actual magnitude of the velocity vector of the center-of-gravity point of the vehicle system diminishes continuously from the magnitude in the velocity hold mode even when the occupant is not actively performing an active maneuvering operation with the movement of his or her upper body.

In this case, when ↑Vb_aim1, determined immediately before the transition from the velocity hold mode to the braking mode (i.e., ↑Vb_aim1 being determined immediately before the transition from the velocity following mode to the velocity hold mode) is different from the direction of the x axis and is relatively close to the direction of the x axis, the magnitude of the velocity vector of the vehicle system center of gravity diminishes, and the direction of this velocity vector automatically approaches the direction of the x axis (the fore-and-aft direction of the occupant), even when the occupant does not actively perform a maneuvering operation with the movement of his or her upper body. Therefore, the vehicle 1 runs straight to a greater degree with respect to the fore-and-aft direction of the occupant.

Here, when the vehicle 1 is to be accelerated, in most cases, it is required to accelerate the vehicle 1 in particularly the fore-and-aft direction of the occupant. In this case, the vehicle 1 according to the present invention runs straight to a greater degree with respect to the fore-and-aft direction, as described above. Therefore, even when the direction of the impellent force applied to the vehicle 1 is slightly deviated from the fore-and-aft direction, in the braking mode following the subsequent velocity hold mode, the velocity of the wheel assembly 5 is controlled so that the velocity vector of the vehicle system center of gravity automatically faces the fore-and-aft direction.

Therefore, a discrepancy of the moving direction of the vehicle 1 is not likely to occur. Further, the vehicle 1 may run straight to a greater degree with respect to the fore-and-aft direction of the occupant (the vehicle 1 may move more easily in the fore-and-aft direction of the occupant). Further, when the vehicle 1 is moved in the fore-and-aft direction, the vehicle 1 may be moved in the fore-and-aft direction even when the impellent force applied to the vehicle 1 is not precisely facing the fore-and-aft direction. As a result, the maneuvering operation of running the vehicle 1 in the fore-and-aft direction may be executed more easily.

In addition, when the direction of the base required center-of-gravity point velocity vector ↑Vb_aim1 determined immediately before the transition from the velocity hold mode to the braking mode (=↑Vb_aim1 determined immediately before transitioning from the velocity following mode to the velocity hold mode) is different from the direction of the x axis and is relatively far apart from the direction of the x axis, the magnitude of the velocity vector of the vehicle system center of gravity diminishes while the direction of the velocity vector is maintained approximately constant even when the occupant does not perform an active maneuvering operation with the movement of his or her upper body. In other words, when the direction of ↑Vb_aim1 determined immediately before the transition from the velocity hold mode to the braking mode is relatively far from the direction of the x axis, it is highly likely that the direction of the velocity vector of the vehicle system center of gravity which was finally intended by the occupant in the velocity following mode is the same direction as the x axis direction. Therefore, after the velocity following mode, it is possible to prevent the vehicle system center of gravity from moving in the direction different from a direction that the occupant intends.

[Explanation of a Basic Configuration and Movement of an Inverted Pendulum Type Vehicle to which the Present Invention is Applied]

Next, a variation of the inverted pendulum type vehicle 1 (example of a basic configuration), described above, is described with reference to FIG. 21. Incidentally, this variation differs from the basic configuration in that only a part of a processing in the velocity hold mode is different. Therefore, in the description of this variation, the same configuration and processing already described with regards to the inverted pendulum type vehicle 1 (example of a basic configuration) is not described here.

Figure 21:
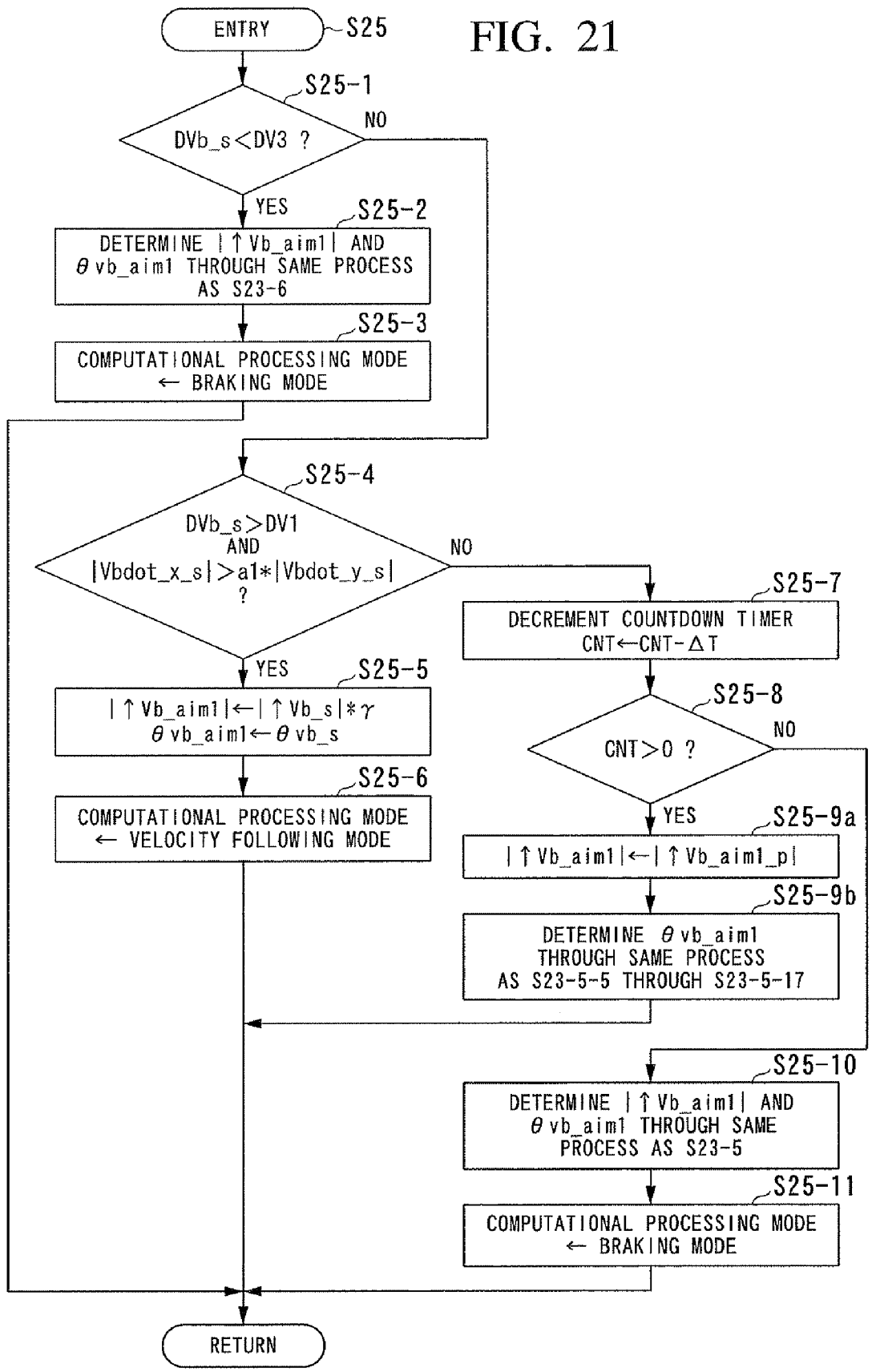
FIG. 21 is a flowchart showing a subroutine processing in step S25 shown in FIG. 14.

According to this variation, the computational processing of the velocity hold mode in step S25 shown in FIG. 14 is executed as indicated in the flowchart of FIG. 21. In this case, other than the processing in case the determination result of step S25-8 in FIG. 21 becomes positive, the processing is the same as that described above with regards to the inverted pendulum type vehicle 1 (i.e., the processing shown in FIG. 20).

Further, according to the present variation, when the determination result of step S25-8 in FIG. 21 is positive, i.e., when the predetermined amount of time indicated by the initial value Tm of the countdown timer has not yet passed, in a condition in which neither an acceleration requirement nor a deceleration requirement has occurred after the velocity hold mode has begun, the required center-of-gravity point velocity generator 74 determines the base required center-of-gravity point velocity vector absolute value |↑Vb_aim1| in step S25-9a. Further, the required center-of-gravity point velocity generator 74 determines the basic required center-of-gravity velocity vector directional angle θvb_aim1 in step S25-9i b.

In this case, in step S25-9a, the current value of |↑Vb_aim1| is determined to be the same value as the previous value |↑Vb_aim1_p|, in a manner similar to the example of the basic configuration described above.

Further, in step S25-9b, the current value of θvb_aim1 is determined by the same process as steps S25-5-5 to 25-5-17 shown in FIGS. 16 and 17 described above in the example of the basic configuration. Therefore, when the direction of the basic required center-of-gravity velocity vector ↑Vb_aim1, determined immediately before the transition from the velocity following mode to the velocity hold mode, is different from the x axis direction and is a direction relatively close to the x axis direction (in more precise terms, when the directional angle θvb_aim1 of ↑Vb_aim1 determined immediately before the transition is an angle satisfying either one of the following inequalities: 0°<θvb_aim1_p≦θth1+, θth1-≦θvb_aim1_p<0°, θth2+≦θvb_aim1_p<180°, -180°<θvb_aim1_p≦θth2-), during the continuation period of the velocity hold mode, θvb_aim1 approaches the conversion target angle 0° or 180° or -180° at a constant temporal rate of change. Finally, θvb_aim1 is determined so as to be maintained at 0° or 180° or -180°. Here, the direction of the vector ↑Vb_aim1 refers to a direction determined in the control processing period in which the determination result of step S24-3 in FIG. 19 is positive.

Therefore, during a period combining the velocity hold mode and the subsequent braking mode, θvb_aim1 approaches the conversion target angle (0° or 180° or -180°) at a certain temporal rate of change. Thus, θvb_aim1 is finally determined so as to be maintained at the conversion target angle.

Meanwhile, when the direction of the basic required center-of-gravity velocity vector ↑Vb_aim1, determined immediately before the transition from the velocity following mode to the velocity hold mode, is different from the x axis direction and is a direction relatively different from the x axis direction (in more precise terms, when the directional angle θvb_aim1 of ↑Vb_aim1 determined immediately before the transition is an angle satisfying either one of the following inequalities: θth1+<θvb_aim1_p<θth2+, θth2-<θvb_aim1_p<θth1-), during the continuation period of the velocity hold mode, θvb_aim1 is maintained to be constant at the same angular value as the directional angle θvb_aim1 of ↑Vb_aim1 determined immediately before the transition. Here, the direction of the vector ↑Vb_aim1 refers to a direction determined in the control processing period in which the determination result of step S24-3 in FIG. 19 is positive. Therefore, the determination process of the directional angle θvb_aim1 in this case is the same as the example of the basic configuration described above. Therefore, θvb_aim1 is maintained to be constant during the period combining the velocity hold mode and the subsequent braking mode.

Other than the processing described above, the processing of the present variation is the same as that of the example of the basic configuration.

According to the present variation, when the direction of the basic required center-of-gravity velocity vector ↑Vb_aim1, determined immediately before the transition from the velocity following mode to the velocity hold mode, is different from the x axis direction and is a direction relatively close to the x axis direction, the direction of the velocity vector of the vehicle system center-of-gravity automatically approaches the x axis direction (i.e., the fore-and-aft direction of the passenger), even when an active control operation is not performed with the movement of the upper body of the passenger in either the velocity hold mode or the subsequent braking mode. Therefore, the vehicle 1 is able to move straight in the fore-and-aft direction of the passenger to a greater degree.

[Explanation on a Configuration and an Operation of an Inverted Pendulum Type Vehicle Comprising a Pedal]

Next, an example of an inverted pendulum type vehicle comprising a pedal is described as an embodiment of an aspect of the present invention. According to this embodiment, the inverted pendulum type vehicle 1 shown in FIG. 1 comprises a pedal. The passenger stomps the pedal with his or her foot.

Figure 22:
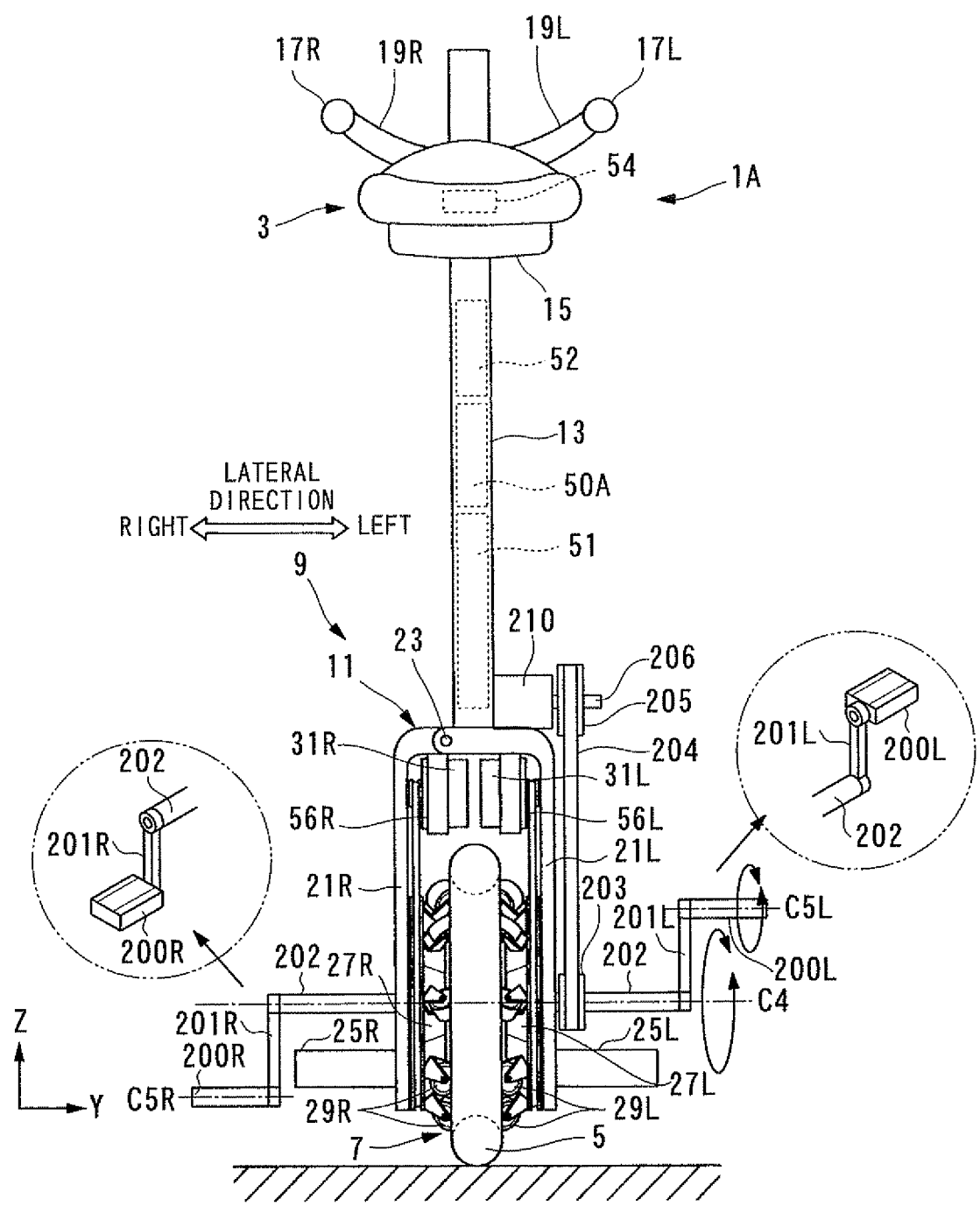
FIG. 22 is a configuration diagram of an inverted pendulum type vehicle comprising a pedal.

FIG. 22 is a diagram showing a configuration of an inverted pendulum type vehicle comprising a pedal according to the present embodiment. According to the inverted pendulum type vehicle 1A shown in FIG. 22, the inverted pendulum type vehicle 1 shown in FIG. 1 is regarded as the basic configuration. Pedals 200L and 200R are newly added to this inverted pendulum type vehicle 1. According to the inverted pendulum type vehicle 1A, a support axis 202 is added so that the support axis 202 can rotate with the shaft center C4 at the center. Here, the support axis 202 is supported while penetrating the cover members 21R and 21L. By rotating this support axis 202 with the pedals 200L and 200R, the electric motor 210 for a pedal is rotated via a rotation transmission mechanism described later.

According to the inverted pendulum type vehicle 1A, the support axis 202 rotates as the passenger operates the pedals 200L and 200R by stomping his or her foot on the pedals. Further, the inverted pendulum type vehicle 1A is configured so that the electric motor 210 is rotated according to the rotational velocity of the support axis 202, and so that the target velocity of the inverted pendulum type vehicle 1A in the fore-and-aft direction (i.e., x axis direction) is determined by the signal of the rotational velocity of the electric motor 210. Further, a control mechanism is added to the control unit 50A inside the supporting frame 13 so that a reaction force (i.e., a brake torque) is provided when the pedals 200L, 200R are operated (i.e., stomped on with the passenger's foot). Further, the motor driver unit 51 comprises a motor driver for driving the wheel assembly, described later, and a pedal motor driver, which drives the pedal electric motor. Other configurations are the same as the inverted pendulum type vehicle 1 shown in FIG. 1. Therefore, the same components are referred to using the same reference numeral. Overlapping explanations are omitted.

In FIG. 22, an arm 201L is fixed to the end part of the left side (L side) of the support axis 202 in a direction perpendicular to the shaft center C4 of the supporting axis 202. The pedal 200L is provided so that the pedal 200L is perpendicular to the longitudinal direction of the arm 201L at the tip portion (the end portion at a side opposite to the support axis 202) of the arm 201L, and so that the pedal 200L extends in a direction opposite to the cover part 21L. This pedal 200L is attached so that the pedal 200L can rotate around the central axis C5L. In this way, the pedal 200L is attached to the support axis 202 via the arm 201L.

Similarly, an arm 201R is fixed to the end part of the right side (R side) of the support axis 202 in a direction perpendicular to the shaft center C4 of the supporting axis 202. The pedal 200R is provided so that the pedal 200R is perpendicular to the longitudinal direction of the arm 201R at the tip portion (the end portion at a side opposite to the support axis 202) of the arm 201R, and so that the pedal 200R extends in a direction opposite to the cover part 21R. This pedal 200R is attached so that the pedal 200R can rotate around the central axis C5R. In this way, the pedal 200R is attached to the support axis 202 via the arm 201R. Further, the arms 201L and 201R are provided along a straight line seen from a y axis direction (as a perspective view). In addition, the arms 201L and 201R are provided so that the arms 201L and 201R face opposite directions with respect to the central shaft C4 of the support axis 202.

The central shaft C4 of the support axis 202 is coaxial with the central shaft C2 (orthogonal to the diameter direction of the wheel assembly 5 overall) of the support axes 33L, 33R (see FIG. 3) of the rotation members 27L, 27R used to drive the wheel assembly 5. In addition, the supporting axes 33L, 33R are configured to be a cylindrical shape. The supporting axis 202 is rotatably supported to the inner side of the support axes 33L, 33R so as to be inserted inside the support axes 33L, 33R. Further, the support axis 202 and the support axes 33L, 33R are configured to rotate independently of one another.

Further, the support axis 202 is connected to the output axis (rotation axis) 206 of the electric motor 210 via a power transmission mechanism comprising a rotation transmission mechanism (such as a mechanism decreasing or increasing the rotational velocity/number of rotations of the pedal). The electric motor 210 is driven by being rotated by a rotational force (torque) transmitted from the side of the support axis 202. An example of this power transmission mechanism is a pulley and belt system. In other words, as shown in FIG. 22, the rotation of the support axis 202 is transmitted to the output axis 206 of the electric motor 210 via the pulley 203, the belt 204, and the pulley 205. Incidentally, the power transmission mechanism may be configured, for example, with a sprocket and a link chain, or may be configured with a plurality of gears.

According to the above configuration, when the passenger operates the pedals 200L, 200R, the support axis 202 rotates round the central shaft C4. Accordingly, the output axis 206 of the electric motor 210 rotates. In other words, the output axis 206 of the electric motor 210 rotates according to the velocity with which the passenger operates the pedals 200L, 200R.

Figure 23:
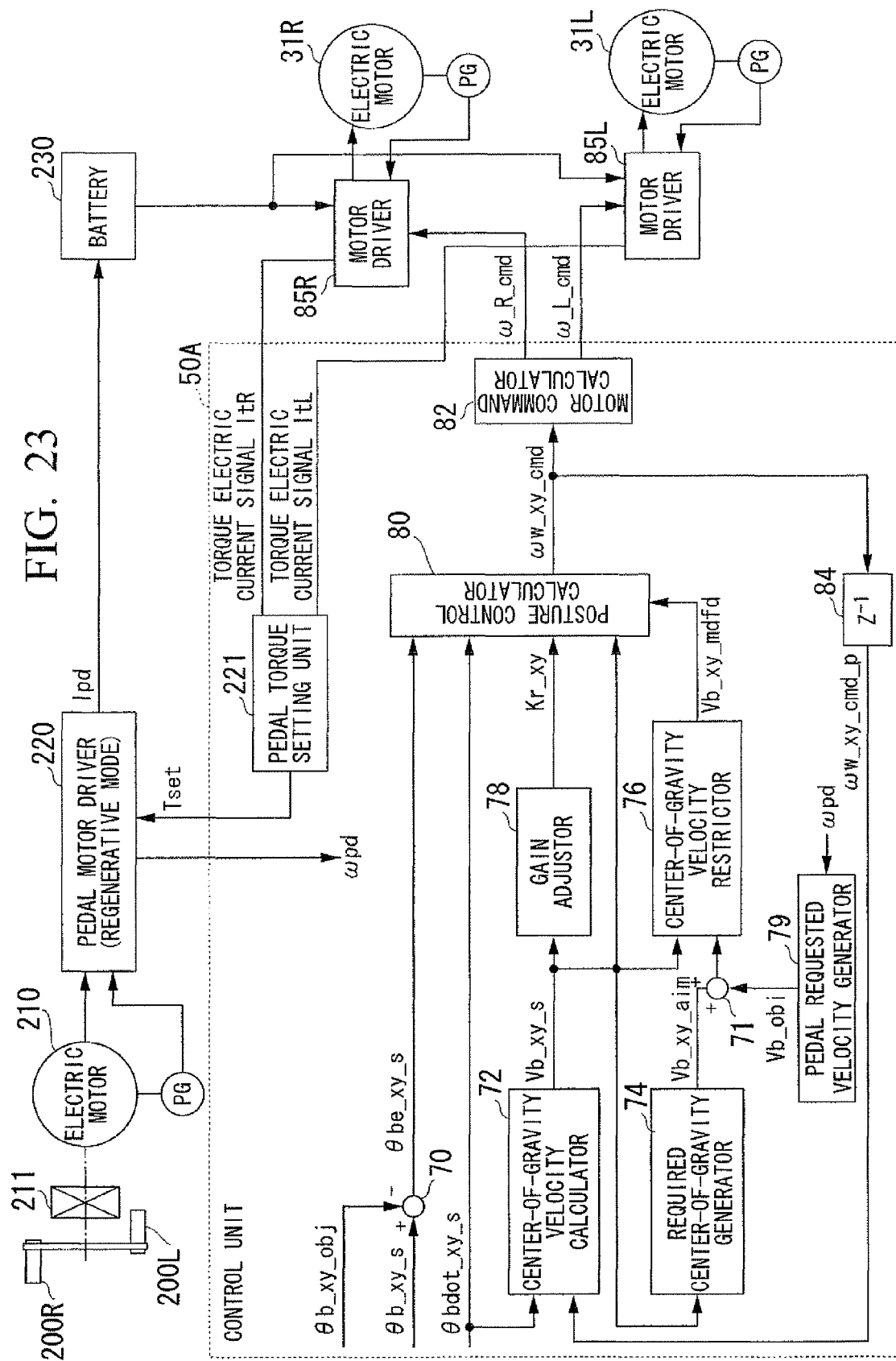
FIG. 23 is a diagram showing a first setting method of a brake torque (reaction force) of a pedal.

FIG. 23 is a diagram showing a first setting method of a brake torque (reaction force) of the pedal. In more precise terms, FIG. 23 is a block diagram indicating a processing of a calculation for controlling the vehicle (a processing determining the velocity command of a motor) inside the control unit 50A. The configuration of the control unit 50A shown in FIG. 23 is different from the configuration of the control unit 50 shown in FIG. 9 in that, compared to the configuration shown in FIG. 9, the pedal torque setting unit 221, the pedal required velocity generator 79, and the calculator 71, shown in FIG. 23, is added. Another difference is that the electric motor 210, which is driven by the pedals 200L and 200R, and a pedal motor driver 220 are added as a peripheral circuit of the control unit 50A. Another difference is that the electric motors 31L, 31R for driving the wheel assembly 5, the motor drivers 85L, 85R, and the battery 230 are clearly shown. Other aspects of the configuration are the same as the configuration shown in FIG. 9. Therefore, the same components are referred to using the same reference numeral. Overlapping explanations are omitted.

According to FIG. 23, the motor driver 85R for driving the wheel assembly 5 is a driver which drives and rotates the electric motor 31R at the right side according to the rotational angular velocity command ω_R_cmd inputted by the motor command calculator 82. When the electric motor 31R is an AC servo motor, for example, the motor driver 85R is a PWM inverter of a vector controlling type. When the vehicle is running on a flat ground or is running up a hill, the motor driver 85R executes a control so that the electric motor 31R is driven and rotated at a power running mode.

Further, when the vehicle is running down a hill, the motor driver 85R for a wheel operates in a regenerative mode (braking mode) when the electric motor 31R is rotated from a load side (a side of the wheel assembly 5) (i.e., when the electric motor 31R is about to be rotated at a velocity greater than or equal to the rotational angular velocity command ω_R_cmd). In this way, the motor driver 85R operates so that the battery 230 is charged by the energy (regenerative electric current) regenerated by the electric motor 31R.

According to the motor driver 85R, a torque electric current element of the motor electric current of the electric motor 31R is extracted, and is outputted as a motor torque electric current signal ItR towards the pedal torque setting unit 221 inside the control unit 50A.

Similarly, the motor driver 85L for driving the wheel assembly 5 is a driver which drives and rotates the electric motor 31L at the left side according to the rotational angular velocity command ω_L_cmd inputted by the motor command calculator 82. When the electric motor 31L is an AC servo motor, for example, the motor driver 85R is a PWM inverter of a vector controlling type. When the vehicle is running on a flat ground or is running up a hill, the motor driver 85L executes a control so that the electric motor 31L is driven and rotated at a power running mode.

Further, when the vehicle is running down a hill, the motor driver 85L for a wheel operates in a regenerative mode (braking mode) when the electric motor 31L is rotated from a load side (a side of the wheel assembly 5) (i.e., when the electric motor 31L is about to be rotated at a velocity greater than or equal to the rotational angular velocity command ω_L_cmd). In this way, the motor driver 85L operates so that the battery 230 is charged by the energy (regenerative electric current) regenerated by the electric motor 31L.

According to the motor driver 85L, a torque electric current element of the motor electric current of the electric motor 31L is extracted, and is outputted as a motor torque electric current signal ItL towards the pedal torque setting unit 221 inside the control unit 50A.

Figure 24:
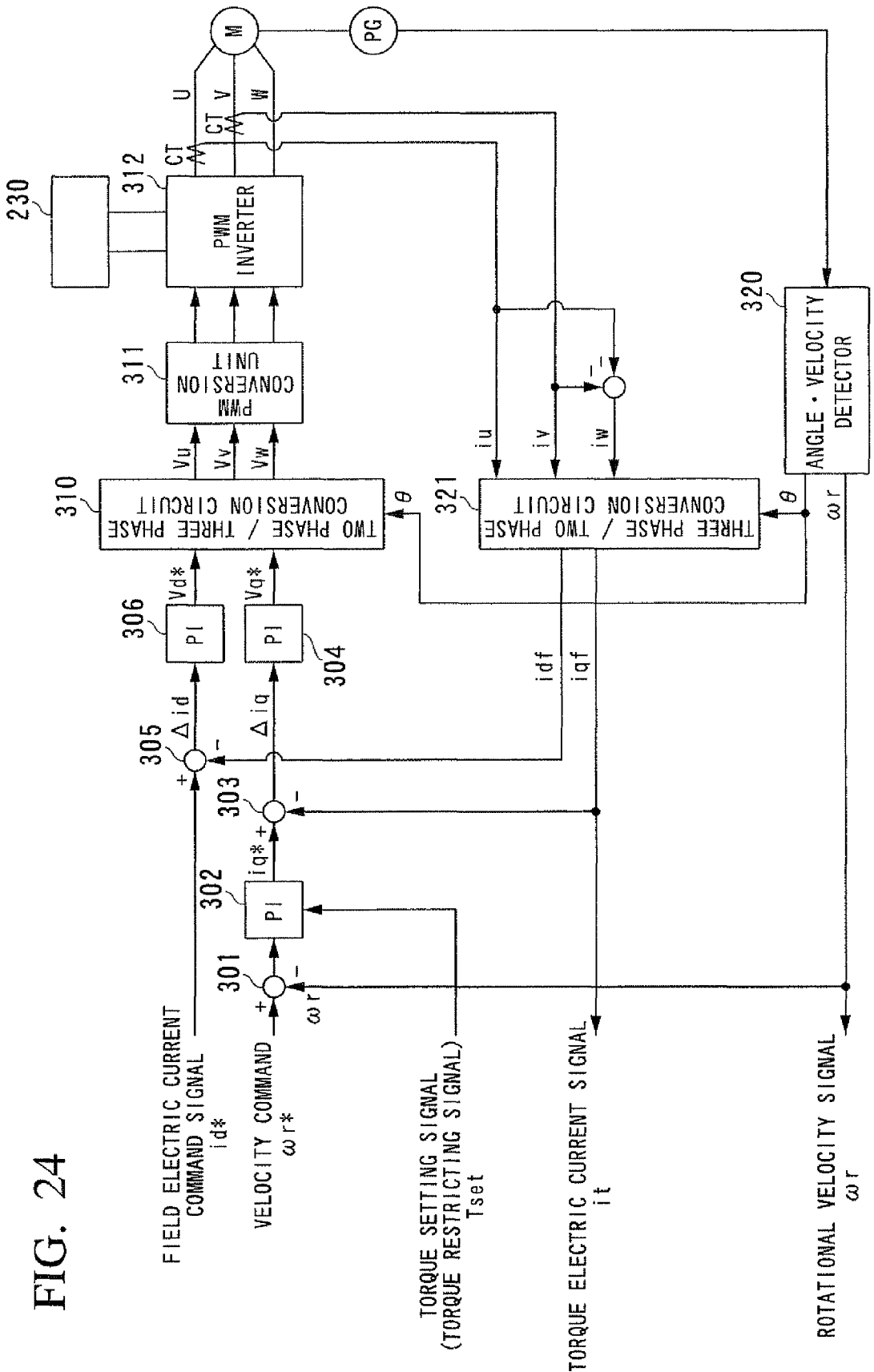
FIG. 24 is a diagram showing a configuration of a motor driver.

FIG. 24 shows an example of a configuration of the motor drivers 85R, 85L when the electric motors 31R, 31L for driving the vehicle wheel are AC servo motors (three-phase induction motor). The motor driver shown in FIG. 24 is a motor driver which rotates the AC motor M at a desired velocity according to an input of the velocity command signal ωr*. A configuration of the motor driver is described below briefly.

According to the motor driver shown in FIG. 24, a pulse signal (a two phase pulse signal used to determine the direction of rotation) outputted by the rotary encoder (hereinafter, also referred to), provided on the rotational axis of the AC motor M and rotates in conjunction with this rotational axis, is inputted into the angle/velocity detector 320. At the angle/velocity detector 320, the rotational velocity (or of the rotational axis of the AC motor M and the position θ of the rotator are computed and outputted according to the pulse signal inputted by the pulse generator PG of the AC motor M.

Further, the velocity command signal ωr*, which is the rotational velocity command of the AC motor M, is compared with the velocity feedback signal ωr at the calculator 301. The velocity feedback signal (or is generated by the pulse signal outputted by the pulse generator PG. Further, the calculator generates the deviation signal (ωr*−ωr) between the velocity command signal ωr* and the velocity feedback signal ωr. This deviation signal is amplified by the PI (proportional/integral) circuit 302 for controlling the velocity, thereby generating the torque command signal iq*.

Meanwhile, the three phase electric current iu, iv, and iw running through the AC motor M is converted by the three phase/two phase conversion circuit 321 into a torque electric current component iqf on a d-q orthogonal axis (a coordinate axis rotating in synchrony with the rotator) and a field current component idf, and is outputted as an electric current feedback signal.

Further, a torque command signal iq* outputted by the PI (proportional/integral) circuit 302 for controlling the velocity is compared by the calculator 303 with the torque electric current component iqf outputted by the three phase/two phase conversion circuit 321. The deviation signal (iq*−iqf) between this torque command signal iq* and the torque electric current component iqf are amplified by the PI (proportional/integral) circuit 304 for controlling the electric voltage for the q axis. In this way, the electric voltage command signal Vd* of the q axis is generated. Further, the field command signal id* and the signal of the field current component idf outputted by the three phase/two phase conversion circuit 321 are compared by the calculator 305. The deviation signal (id*−idf) between this torque command signal id* and the torque electric current component idf are amplified by the PI (proportional/integral) circuit 306 for controlling the electric voltage for the d axis. In this way, the electric voltage command signal Vd* of the d axis is generated.

Further, the two phase/three phase conversion circuit 310 generates the three phase alternate current electric voltage command Vu*, Vv*, Vw* and outputs to the PWM conversion unit 311, based on the electric voltage command signal Vd* outputted by the PI circuit 304 for controlling the electric voltage for the q axis and the electric voltage command signal Vd* outputted by the PI circuit 306 for controlling the electric voltage for the d axis. The PWM conversion unit 311 generates the PWM signal by comparing each of the three phase alternate current voltage command Vu*, Vv*, Vw* with a triangular wave signal and the like. According to this PWM signal, the switching element (for example, the three phase bridge circuit of the IGBT) inside the PWM inverter 312 is controlled to be turned on or off, the three phase electric voltage U, V, and W are generated, and are applied to the AC motor M.

The motor driver described above is usually configured so that, a field current command signal id* for setting the field current element flowing through the AC motor M may be inputted from the outside. In addition, the motor driver is configured so that a torque setting signal Tset for restricting (setting) the maximum value of the torque command signal iq* outputted by the PI (proportional/integral) circuit 302 for controlling the velocity may be inputted from the outside. In other words, the motor driver comprises a torque setting component (torque electric current restricting component) which restricts the output signal of the PI (proportional/integral) circuit 302 with the torque setting signal Tset. The motor driver also comprises a control component which controls the output torque according to the torque setting component. Further, the motor driver is configured so that the torque electric current component iqf outputted by the three phase/two phase conversion circuit 321 is outputted to the outside as a torque electric current signal it. In addition, the motor driver is configured so that the signal of the motor rotational velocity (or is outputted to the outside).

Returning to FIG. 23, a motor driver 220 for a pedal is connected to the electric motor 210, which is driven and rotated by the pedals 200L, 200R and the deceleration 211. When the electric motor 210 is an AC servo motor, for example, the motor driver 220 for the pedal is a PWM inverter of a vector control type. The motor driver 220 is configured in a similar manner as the motor driver shown in FIG. 27 described above.

In this case, the electric motor 210 is set to be operated constantly in the regenerative mode. In other words, the electric motor 210 is controlled so that a reaction force (brake torque) is constantly applied to the rotation of the pedals 200L, 200R. Further, when the electric motor 210 is rotated by the pedals 200L, 200R, the electric motor 210 operates as an electric generator, and charges the battery 230 by the regenerative electric current Ipd flowing out through the motor driver 220.

The magnitude of the brake torque is controlled to be proportional to the torque component electric current of the electric motors 31L, 31R for the wheel. In other words, when the vehicle is running up a hill, the brake torque of the pedals 200L, 200R becomes large as the hill becomes steeper, thereby making it difficult to rotate the pedals 200L, 200R (i.e., restricting the acceleration). Further, when the rotational velocity of the pedals 200L, 200R is increased, for example, the brake torque is increased as well. Incidentally, when the vehicle is running down a hill, for safety purposes, the brake torque of the pedals 200L, 200R increases as the hill becomes steeper, thereby making it difficult to rotate the pedals 200L, 200R (i.e., limiting the acceleration).

In this way the control of the brake torque of the pedals 200L, 200R by the motor driver 220 for the pedal is performed by operating the motor driver 220 for the pedal in a regenerative mode. In this case, in order to control the magnitude of the brake torque, it is possible to use a torque setting component (torque electric current restriction component) described above, which is provided in the motor driver 220 for the pedal. Incidentally, some generic motor driver may comprise, as a normal component, a component which restricts the magnitude of the torque electric current (i.e., the torque electric current at the power running side and the regenerative side) according to the torque setting signal.

According to the motor driver shown in FIG. 24, the velocity command $\omega r^*$ is set to zero, and the motor rotational velocity $\omega r$ generated from the output signal of the pulse generator PG is set to be the velocity feedback signal. Thus, when the electric motor 210 is rotated by the pedals 200L, 200R, the output value of the PI circuit 302 for controlling the velocity, the output value of the PI circuit 302 for controlling the velocity becomes a torque command signal $iq^*$ in a direction in which the regenerative electric current is applied, and the output value of the PI circuit 302 (i.e., the torque command signal $iq^*$) becomes a saturated output value according to an operation by the integral element. Thus, the value of the saturated electric voltage is controlled (restricted) by the torque setting signal Tset. In other words, by restricting the value of the torque command signal $iq^*$ with the torque setting signal Tset, it is possible to supply a regenerative electric current according to the torque setting signal Tset from the electric motor 210 to the side of the battery 230.

In this case, for example, the torque setting signal Tset is generated so as to be proportional to the sum of the torque electric current ItL of the electric motor 31L and the torque electric current ItR of the electric motor 31R.

$$T\,set = Kt(ItR + ItL) \quad \text{(equation 10)}$$

Here, Kt is a predetermined gain constant.

As a result, it is possible to control the brake torque of the pedals 200L, 200R so as to be proportional to the torque electric current of the electric motors 31L, 31R driving the wheel assembly 5.

Further, a signal of the motor rotational angular velocity $\omega pd$ generated by the output signal of the pulse generator PG of the electric motor 210 for a pedal is outputted by the motor driver 220 for the pedal. The signal of the motor rotational velocity $\omega pd$ of the electric motor 210 for the pedal is inputted to the pedal required velocity generator 79 inside the control unit 50A as a signal showing the rotational velocity of the pedals 200L, 200R.

The pedal required velocity generator 79 generates a target value of the center-of-gravity point velocity (the center-of-gravity velocity target value Vb_obj) based on the signal of the rotational angular velocity $\omega pd$ of the electric motor 210 for the pedal. For example, the pedal required velocity generator 79 outputs a value (Kpd·$\omega pd$) obtained by multiplying the rotational angular velocity $\omega pd$ with a predetermined gain coefficient Kpd as the pedal center-of-gravity velocity target value Vb_obj (Vb_obj=Kpd·$\omega pd$). Further, the pedal required velocity generator 79 adds the required center-of-gravity velocity Vb_x_aim, outputted by the required center-of-velocity generator 74 and the pedal center-of-gravity point velocity target value Vb_obj with the calculator 71. In this way, the pedal required velocity generator 79 generates a new required center-of-gravity velocity Vb_x_aim' and outputs to the center-of-gravity point velocity restrictor 76.

$$Vb\_x\_aim' = Vb\_obj + Vb\_x\_aim \quad \text{(equation 11)}$$

The center-of-gravity point velocity restrictor 76 generates the target center-of-gravity point velocity Vb_x_mdfd based on the required center-of-gravity velocity Vb_x_aim'. As described above, the third term of the right side of equation 07x refers to a feedback operation amount component for converging the deviation between the center-of-gravity point velocity estimation value Vb_x_s and the target center-of-gravity point velocity Vb_x_mdfd to zero based on a proportionality law as a feedback control law. Thus, a target center-of-gravity velocity Vb_x_mdfd is generated by adding the pedal center-of-gravity velocity target value Vb_obj being added. In this way, a control is performed so that the center-of-gravity point velocity estimation value Vb_x_s matches Vb_x_aim'. As a result, it is possible to control the velocity of the inverted pendulum type vehicle 1A in the fore-and-aft direction by the rotation of the pedals 200L, 200R.

Incidentally, the configuration of the circuit and the operation of each of the processing shown in FIGS. 10 to 13 in regards to the inverted pendulum type vehicle 1 described above is similar to the configuration and operation with regards to the inverted pendulum type vehicle 1A comprising a pedal. Further, the processing of the flowchart shown in FIGS. 7, 14-21 is similar as well.

For example, according to the inverted pendulum type vehicle 1A comprising a pedal, when the vehicle is moved towards a desired direction by tilting the base body 9 and by an operation of the vehicle system center-of-gravity point, a computation for controlling the vehicle is performed in the same manner as in the inverted pendulum type vehicle 1.

Incidentally, when the inverted pendulum type vehicle 1A is operated in the fore-and-aft direction using the pedal, and, for example, when the vehicle accelerates in the x direction (the fore-and-aft direction) by the pedal being operated, and when a change occurs in the tilt angle $\theta b$ of the vehicle system center-of-gravity point Vb_x_s, a computational processing for controlling the vehicle is executed as in the inverted pendulum type vehicle. As a result, the posture is controlled.

Incidentally, when an acceleration in the fore-and-aft direction is applied by the pedals 200L, 200R, the wheel assembly 5 is accelerated in the fore-and-aft direction. As a result, the center-of-gravity point velocity estimation value Vb_x_s of the vehicle system center-of-gravity point increases. Consequently, a processing is performed similar to the processing in the velocity following mode shown in the flowchart in FIG. 19.

In other words, an instance in which an acceleration is applied by the passenger pushing the inverted pendulum type vehicle A1 (i.e., and acceleration in the fore-and-aft direction) is similar to an instance in which the inverted pendulum type vehicle 1A is accelerated in the fore-and-aft direction by an operation of the pedal in that the center-of-gravity point velocity estimation value Vb_x_s of the vehicle system center-of-gravity point is increased. According to the change in this center-of-gravity point velocity estimation value Vb_x_s, the required center-of-gravity point velocity vector ↑Vb_aim is computed. In this case, as shown in the flowchart of FIG. 19, the pedaling operation is halted (i.e., the required acceleration is cancelled), then the magnitude of the required center-of-gravity point velocity vector ↑Vb_aim is maintained to be constant for a predetermined amount of time. Thereafter, the magnitude of the required center-of-gravity point velocity vector ↑Vb_aim is continuously diminished to zero.

Incidentally, the above description concerned an instance in which the pedals 200L, 200R rotates the electric motor 210 in a direction such that the inverted pendulum type vehicle 1A is accelerated in the x axis direction (i.e., the direction in which the inverted pendulum type vehicle 1A moves). It is also possible to rotate the electric motor 210 in an opposite direction (i.e., a direction opposite to the direction in which an acceleration is applied) with the pedals 200L, 200R.

When the pedals 200L, 200R rotate the electric motor 210 in an opposite direction (i.e., a direction opposite to the direction in which an acceleration is applied) various kinds of controls may be used. For example, similar to a normal bicycle, when the pedals 200L, 200R are rotated in an opposite direction, it is possible to set the brake torque to zero, thereby creating a condition in which neither an acceleration nor a deceleration is applied (i.e., the vehicle is idling).

Further, for example, the magnitude of the brake torque when the pedals 200L, 200R are rotated in an opposite direction may be controlled so as to be inversely related with the torque component electric current (i.e., a torque electric current at a side of the power running side) of the electric motors 31L, 31R for the wheel. In other words, when the vehicle is running up a hill, the brake torque of the pedals 200L, 200R in the opposite direction becomes small as the hill becomes steeper. Thus, it becomes easier to rotate the pedals 200L, 200R (i.e., it becomes easier to decelerate).

Further, according to the embodiment of the control unit 50A shown in FIG. 23, an explanation has been provided regarding an example in which the reaction force applied to the pedals 200L, 200R has been set based on the motor electric current (the torque electric current ItR, ItL) flowing through the electric motors 31R, 31L which drives the wheel assembly 5. However, the present invention is not limited to this embodiment, and other various methods may be used as well.

Figure 25:
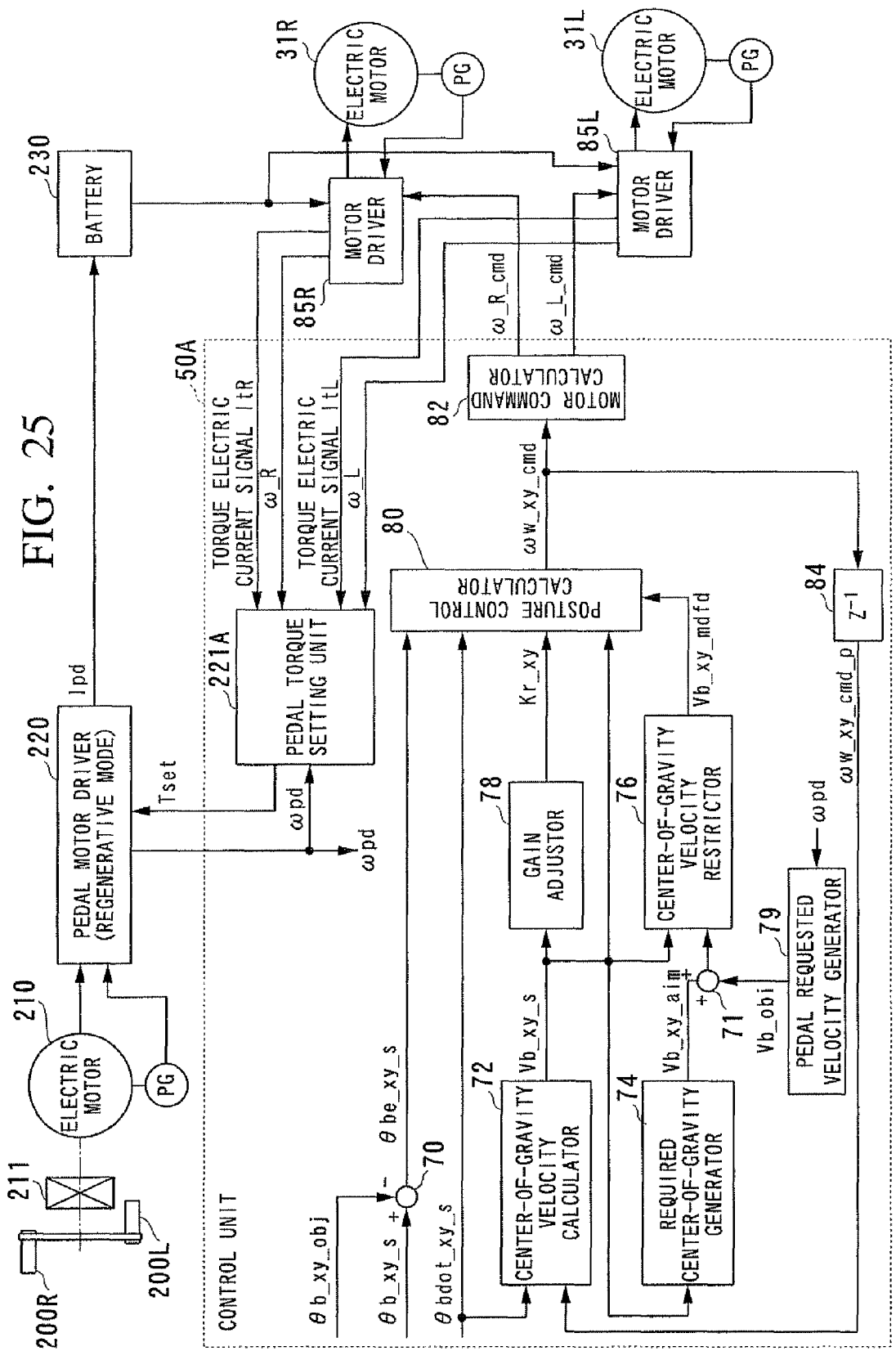
FIG. 25 is a diagram showing a second setting method of a brake torque of a pedal.

FIG. 25 is a diagram showing a second setting method of the brake torque of the pedal. As shown in FIG. 25, the reaction force applied to the pedals 200L, 200R may be set based on the output power of the electric motors 31R, 31L driving the wheel assembly 5. in this case, the pedal torque setting unit 221A determines the output power of the electric motors 31R, 31L based on the motor electric current (i.e., the torque electric current ItR, ItL) running through the electric motors 31R, 31L and the rotational velocity ($\omega\_R$, $\omega\_L$) of the electric motors 31R, 31L. Accordingly, the torque setting signal Tset of the pedal is computed based on the equation 12 below.

$$Tset = Kpd1 \cdot (ItR \cdot \omega\_R + ItL \cdot \omega\_L)/(\omega pd + \alpha) \quad \text{(equation 12)}$$

Here, Kpd1 is a predetermined gain coefficient. $\omega pd$ is a rotational velocity (rotational angular velocity) of the electric motor 210 for the pedal. $\alpha$ is a predetermined optional constant.

In this way, the brake torque of the pedals 200L, 200R may be set based on the output power of the electric motors 31R, 31L for the wheel.

Figure 26:
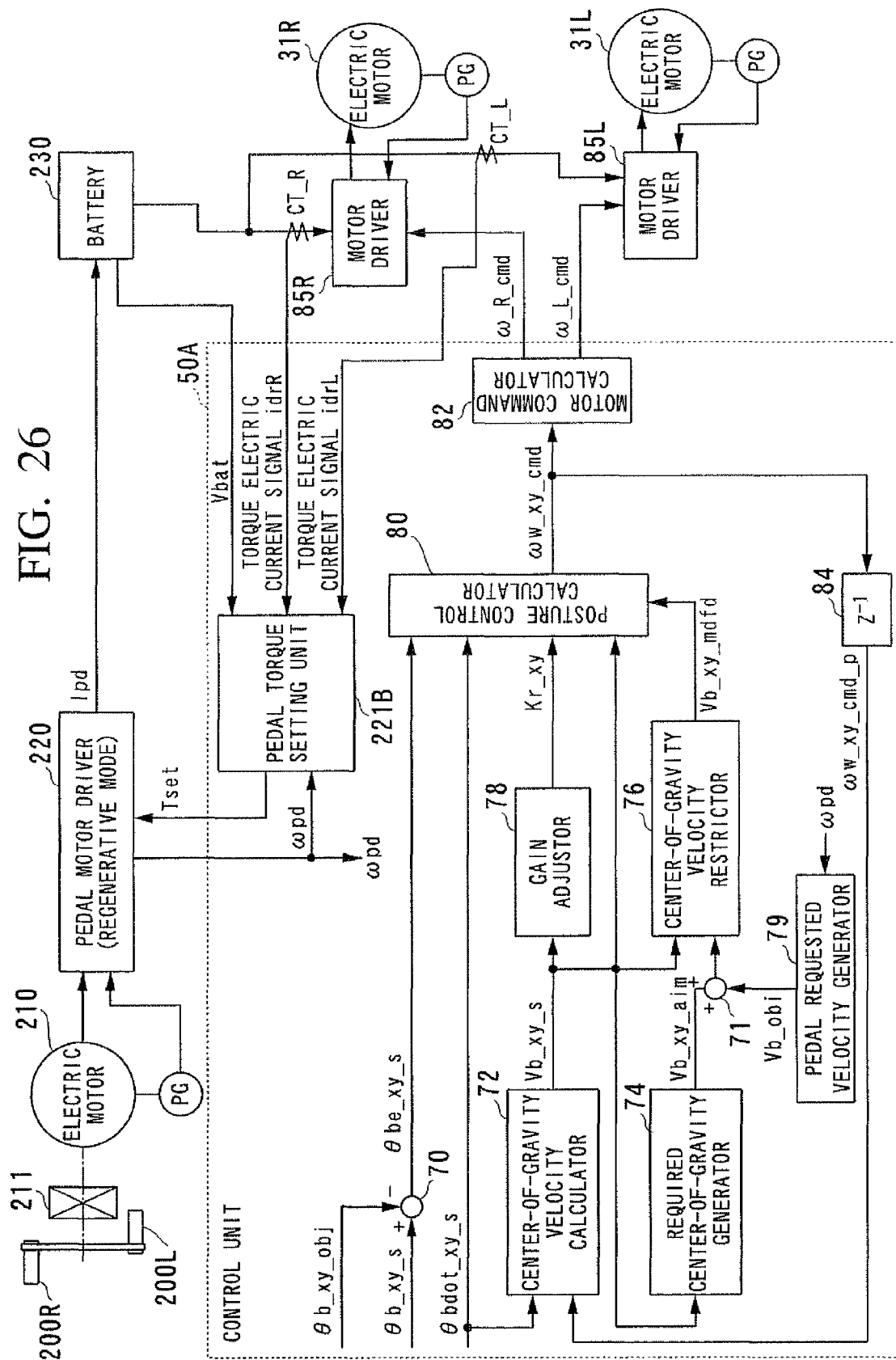
FIG. 26 is a diagram showing a third setting method of a brake torque of a pedal.

Further, FIG. 26 is a diagram showing the third setting method of the brake torque (reaction force) of the pedal. As shown in FIG. 26, the brake torque of the pedals 200L, 200R may be set based on the consumed power of the motor drivers 85L, 85R.

In this case, the pedal torque setting unit 221B obtains the consumed power of the motor drivers 85L, 85R based on the electric voltage Vbat of the battery 230, the motor driver electric current idrR which is an input electric current to the motor driver 85R detected by the electric current sensor CT_R, and a motor driver electric current idrL which is an input electric current of the motor driver 85L detected by the electric current sensor CT_L. Furthermore, the torque setting signal Tset of the pedal is computed based on the equation 13 below.

$$Tset = Kpd2 \cdot (idrR \cdot Vbat + idrL \cdot Vbat)/(\omega pd + \alpha) \quad \text{(equation 13)}$$

Here, Kpd2 is a predetermined gain coefficient. Vbat is an electric voltage of the battery 230, $\omega pd$ is a rotational velocity (rotational angular velocity) of the electric motor 210 for the pedal, and a is a predetermined optional constant.

In this way, the brake torque of the pedals 200L, 200R may be set based on the consumed power of the motor drivers 85L, 85R.

Incidentally, when the battery is likely to become overcharged due to the regenerative electric current, it is possible to change the brake torque of the pedals 200L, 200R so that the amount of electric energy generated by the rotation of the pedals 200L, 200R is reduced (i.e., the amount of regenerative electric current is reduced).

Figure 27:
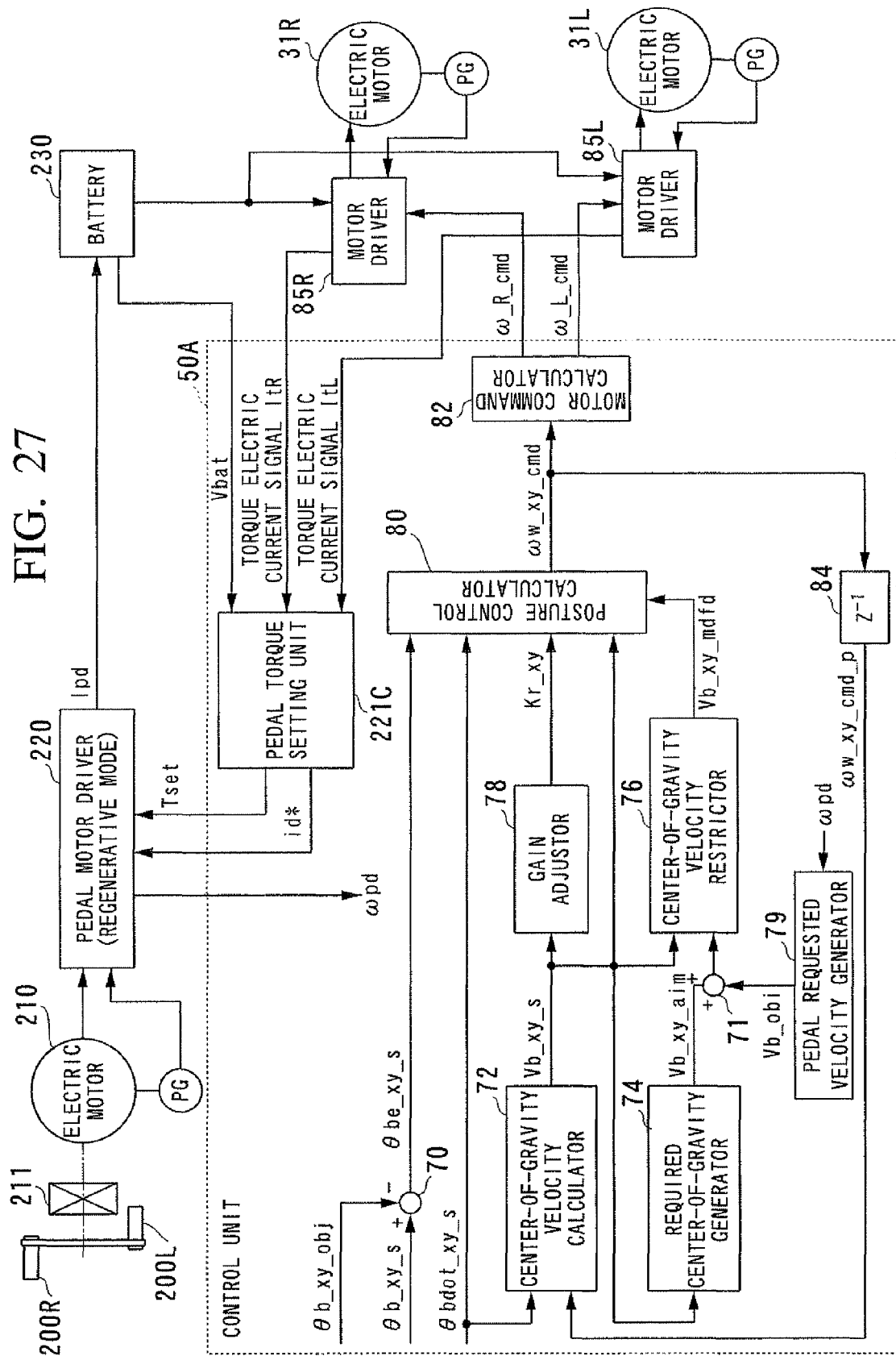
FIG. 27 is a diagram showing a fourth setting method of a brake torque of a pedal.

FIG. 27 is a diagram showing a fourth setting method of the brake torque (reaction force) of the pedal. As shown in FIG. 27, the pedal torque setting unit 221C detects the electric voltage Vbat of the battery 230. When the electric voltage Vbat of the battery exceeds a predetermined threshold value, the torque setting signal Tset may be reduced according to the amount of increase in the electric voltage Vbat of the battery. Thus, the brake torque of the pedals 200L, 200R may be reduced (i.e., the amount of regenerative electric current may be reduced). Further, when the electric voltage Vbat of the battery 230 exceeds a predetermined value, it is possible to operate the electric motor 210 of the pedal in the power running mode.

Alternatively, it is also possible to prevent an overcharge to the battery 230 by setting the torque setting signal Tset to zero, increasing the field electric current (reactive current component) by increasing the field current command signal id*. Due to a resistance component of the field current circuit, the energy may be consumed, thereby preventing a surcharge to the battery 230.

Figure 28A:
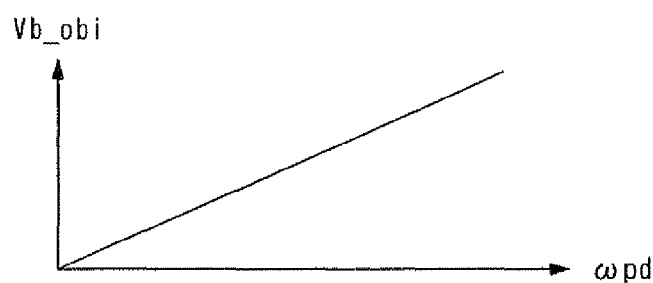
FIG. 28A is a diagram showing an example of a setting of a gain coefficient Kpd with respect to a rotational velocity of the pedal.

In the example described above, the pedal required velocity generator 79 generates a center-of-gravity point velocity target value Vb_obj (Vb_obj=Kpd·$\omega pd$) as shown in FIG. 28A by multiplying the rotational velocities of the pedals 200L, 200R (the rotational angular velocity $\omega pd$ of the electric motor 210 for the pedal). However, the present invention is not limited to this embodiment.

Figure 28B:
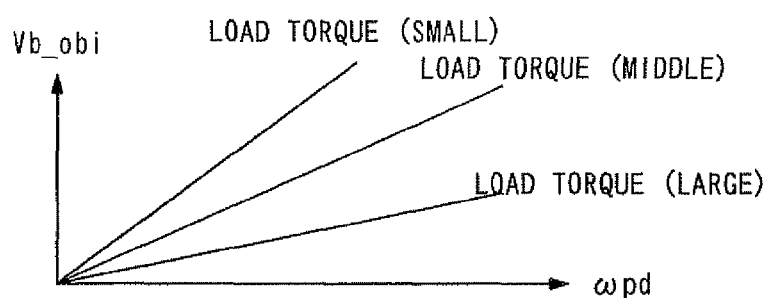
FIG. 28B is a diagram showing an example of a setting of a gain coefficient Kpd with respect to a rotational velocity of the pedal.

For example, as shown in FIG. 28B, the gain coefficient Kpd may be changed based on the magnitude of the load torque of the electric motors 31R, 31L for the wheel. In this case, the pedal required velocity generator 79 receives an input of the rotational velocity signal $\omega pd$ of the pedal, the electric current signal ItL from the motor driver 85L, and the electric current signal ItR from the motor driver 85R.

As a result, when the vehicles is running up a hill, for example, the increase in the velocity of the inverted pendulum type vehicle may be suppressed, even when the pedals 200L, 200R is operated in a quick manner (i.e., even if the electric motor 210 for the pedal is rotated quickly.). Therefore, it is possible to imitate an automatic switching operation of the shift gear. Thus, it is possible to enhance the comfort level of riding operation of the vehicle due to the pedals 200L, 200R.

As described above, according to the inverted pendulum type vehicle comprising the pedal according to an aspect of the present invention, it is possible to provide an inverted pendulum type vehicle with enhanced operability. In other words, it is possible to maintain a stability in the posture in the fore-and-aft and lateral directions while moving forward and using the rotation of the pedal to adjust the velocity in the fore-and-aft direction. Further, when the passenger operates the pedal, it is possible to enhance the comfort level with which the passenger operates the vehicle, by enabling an operation in accordance with the actual perception of the passenger. For example, a brake torque is returned in accordance with the load torque of the electric motor driving the wheel assembly 5. Moreover, it is possible to generate electricity by the rotation of the pedal. Thus, the battery may be charged.

In the example described above, an AC servo motor (three-phase induction motor) was used as the electric motor 210 for the pedal and the electric motors 31R, 31L for driving the wheel assembly 5. However, the present invention is not limited to this configuration. An AC servo motor of a synchronous type may be used. In addition, a DC servo motor may be used. In other words, a motor may be used as long as the motor can apply a brake torque to the pedals 200L, 200R. Further, according to the example described above, a pedal was used. However, the present invention is not limited to this configuration. For example, a stepper with a foot treadle may be used.

Heretofore, an inverted pendulum type vehicle 1A comprising a pedal according to the present invention has been described. The control unit 50A described above comprises a computer system in its interior. Further, the series of processing relating to the process described above is stored in the form of a program into a recording medium which can be read by the computer. The above processing is executed by the program being read by the computer and being executed by the computer.

In other words, each of the processing performed in the center-of-gravity velocity calculator 72, the required center-of-gravity point velocity generator 74, the center-of-gravity point velocity restrictor 76, the gain adjustor 78, the pedal required velocity generator 79, the posture control calculator 80, the motor command calculator 82, and the pedal torque setting unit 221 is executed by a central processing unit such as a CPU reading out the program to a main memory device such as a ROM or a RAM, and performing a processing of the information, and by performing a calculation. Here, a recording medium which can be read by a computer refers to, for example, a magnetic disc, a magnetic optical disc, a CD-ROM, a DVD-ROM, and a semiconductor memory.

Here, a description regarding the correlation between the present invention and the embodiment of the inverted pendulum type vehicle comprising the pedal described with reference to FIGS. 22 to 28 is provided as a supplementary description.

According to the present embodiment, the fore-and-aft direction (x axis direction) and the lateral direction (y axis direction) of the passenger of the inverted pendulum type vehicle 1A each corresponds to the first direction and the second direction according to the present invention. Further, the drive unit according to the present invention corresponds primarily to the wheel assembly 5. In more precise terms, the drive unit corresponds to a portion comprised by the wheel assembly 5, a driving mechanism (an actuator 7) of the wheel assembly 5, the electric motors 31L, 31R, and the motor drivers 85L, 85R. Further, the control unit according to the present invention corresponds to the control unit 50A. Further, the periodic movement unit and the pedal according to the present invention corresponds to the pedals 200L, 200R.

The periodic detector and the electric motor for the pedal according to the present invention correspond to the electric motor 210 for the pedal. Further, the pedal rotational velocity detector according to the present invention corresponds to the pulse generator PG (rotary encoder), which rotates in conjunction with the rotational axis of the electric motor 210 for the pedal, and the motor driver 220 for the pedal, which receives the pulse signal outputted from the pulse generator PG and generates a signal corresponding to the rotational velocity of the pedals 200L, 200R. Further, the pedal torque control unit according to the present invention corresponds to the pedal torque setting unit 221 inside the control unit 50A and the motor driver 220 for the pedal.

Further, according to the inverted pendulum type vehicle 1A based on the present embodiment, the pedals 200L, 200R are provided on the base body 9. Further, the pedal rotational velocity detector (the pulse generator PG of the electric motor 210 for the pedal and the motor driver 220 for the pedal), which is provided on the base body 9, detects the rotational velocity of the pedals 200L, 200R. Further, the control unit 50A controls the drive unit (the wheel assembly 5 and the like) based on the signal of the rotational velocity outputted by the motor driver 220 for the pedal (the signal representing the rotational velocity of the pedal).

As a result, it is possible to provide an omnidirectional vehicle (inverted pendulum type vehicle) which can operated easily. For example, it is possible to maintain a stability in the posture in the fore-and-aft and lateral directions while moving forward and using the rotation of the pedal to adjust the velocity in the fore-and-aft direction.

Further, according to the inverted pendulum type vehicle 1A, the control unit 50A (in more precise terms, the pedal required velocity generator 79) controls the target center-of-gravity point velocity of the vehicle system center-of-gravity point (the overall center-of-gravity point of the vehicle and the passenger) in the fore-and-aft direction according to the rotational velocity of the pedals 200L, 200R.

As a result, it is possible to maintain a stability in the posture in the fore-and-aft and lateral directions while moving forward and using the rotation of the pedal to adjust the velocity in the fore-and-aft direction.

Further, according to the inverted pendulum type vehicle 1A, the pedal torque control unit (the pedal torque setting unit 221 and the motor driver 220 for the pedal) inside the control unit 50A controls the brake torque of the electric motor 210 for the pedal, which is driven and rotated by the pedals 200L, 200R, according to the signal of the torque electric current of the electric motors 31R, 31L driving the wheel assembly 5.

As a result, for example, when the vehicle is running up a hill, the brake torque of the pedal may be controlled according to the load torque of the electric motor driving the drive unit. In this way, it is possible to enhance the comfort level with which the vehicle is operated. At the same time, the battery may be charged with the regenerative energy obtained by rotating the pedal.

Further, according to the inverted pendulum type vehicle 1A, the pedal required velocity generator 79 inside the control unit 50A, variably sets the target center-of-gravity point velocity according to the driving condition of the electric motors 31L, 31R of the drive unit according to the rotational velocity of the pedals 200L, 200R when the target center-of-gravity velocity of the vehicle system center-of-gravity point in the fore-and-aft direction is set.

As a result, when the vehicle is running up a hill, for example, the velocity in the fore-and-aft direction, which is set according to the rotational velocity of the pedal, may be reduced. Furthermore, the electric motor, which drives the drive unit, may be prevented from being overloaded.

While a preferred embodiment of the present invention has been described above, it should be understood that these are exemplary of the invention and are not to be considered as limiting the present invention. Additions, omissions, substitutions, and other modifications can be made without departing from the scope of the present invention. The invention is not to be considered as being limited by the foregoing description, and is only limited by the scope of the appended claims.

What is claimed is:

1. A control device of an inverted pendulum type vehicle comprising:
    a drive unit driving a vehicle that is omni directionally movable on a floor surface including in a fore-and-aft direction and a
    lateral direction, the fore-and-aft direction being substantially orthogonal to the lateral direction;
    a base body comprising a payload supporting part receiving a load of the drive unit and a passenger; and
    a control unit controlling the drive unit so that an inverted pendulum control is performed with respect to a vehicle system center-of-gravity point, the vehicle system center-of-gravity point being an overall center-of-gravity point of the vehicle and the passenger, wherein
the inverted pendulum type vehicle comprises
    a periodic moving unit being comprised in the base body and receiving a predetermined periodic movement by the passenger, and
    a periodic detector detecting a rotational velocity period of the periodic moving unit; and the control unit controls the drive unit according to the rotational velocity period of the periodic moving unit.

2. The control device of the inverted pendulum type vehicle according to claim 1, wherein the base body includes a passenger seat disposed above the periodic moving unit.

3. The control device of the inverted pendulum type vehicle according to claim 1, the drive unit comprises a single road-engaging wheel and multiple drive wheels which drive the road-engaging wheel.

4. A control device of an inverted pendulum type vehicle comprising:
    a drive unit driving a vehicle that is omni directionally movable on a floor surface including in a fore-and-aft direction and a
    lateral direction, the fore-and-aft direction being substantially orthogonal to the lateral direction;
    a base body comprising a payload supporting part receiving a load of the drive unit and a passenger; and
    a control unit controlling the drive unit so that an inverted pendulum control is performed with respect to a vehicle system center-of-gravity point, the vehicle system center-of-gravity point being an overall center-of-gravity point of the vehicle and the passenger, wherein the inverted pendulum type vehicle comprises
    a pedal being comprised in the base body and is rotated by a rowing movement of the passenger's foot, and
    a pedal rotational velocity detector detecting a rotational velocity of the pedal; and
    the control unit controls the drive unit according to the rotational velocity of the pedal.

5. The control device of the inverted pendulum type vehicle according to claim 4, wherein the control unit controls a target center-of-gravity point velocity according to the rotational velocity of the pedal, the target center-of-gravity point velocity being a target value of a velocity of the vehicle system center-of-gravity point in the fore-and-aft direction.

6. The control device of the inverted pendulum type vehicle according to claim 5, wherein, when the control unit sets the target center-of-gravity point velocity of the vehicle system center-of-gravity point in the fore-and-aft direction according to a rotational velocity of the pedal, the control unit variably sets the target center-of-gravity point velocity according to an operating condition of an electric motor driving the drive unit.

7. The control device of the inverted pendulum type vehicle according to claim 4, further comprising:
    a pedal electric motor, being driven and rotated by the pedal; and
    a pedal torque control unit applying a brake torque to the pedal electric motor, wherein
    the pedal torque control unit controls the brake torque of the pedal electric motor according to a signal of a torque electric current of an electric motor driving the drive unit.

8. The control device of the inverted pendulum type vehicle according to claim 4, further comprising:
    a pedal electric motor, being driven and rotated by the pedal; and
    a pedal torque control unit applying a brake torque to the pedal electric motor, wherein
    the pedal torque control unit controls the brake torque of the pedal electric motor according to an electric voltage of a battery supplying electric power to an electric motor driving the drive unit.

* * * * *